US 12,379,133 B1

(12) United States Patent
McDonnell

(10) Patent No.: US 12,379,133 B1
(45) Date of Patent: *Aug. 5, 2025

(54) CONDUIT ACCESS ADAPTOR DEVICES AND METHODS

(71) Applicant: JOEY MAC INVENTIONS LLC, Miramar, FL (US)

(72) Inventor: Joseph McDonnell, Miramar, FL (US)

(73) Assignee: JOEY MAC INVENTIONS LLC, Miramar, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/913,596

(22) Filed: Oct. 11, 2024

Related U.S. Application Data

(63) Continuation of application No. 18/617,028, filed on Mar. 26, 2024, now Pat. No. 12,140,337.

(51) Int. Cl.
    *F24F 13/22* (2006.01)
    *F16L 41/08* (2006.01)

(52) U.S. Cl.
    CPC ............ *F24F 13/222* (2013.01); *F16L 41/08* (2013.01)

(58) Field of Classification Search
    CPC ......... F16L 55/07; F16L 41/04; F16L 41/045; F16L 41/06; F16L 41/065
    See application file for complete search history.

(56) References Cited

U.S. PATENT DOCUMENTS 3,495,615 A    2/1970 Weiner et al.
4,811,753 A    3/1989 Bethune
5,474,351 A   12/1995 Ligh
5,671,952 A    9/1997 Ligh
(Continued)

FOREIGN PATENT DOCUMENTS

CA    2565512 A1    6/2007
CN   106499905 A    3/2017
(Continued)

OTHER PUBLICATIONS

"IFLO—Apple App Store," webpage <https://apps.apple.com/US/app/iflo/id6446085127>, 3 pages, available on Internet as of Sep. 15, 2023, retrieved from Internet on Feb. 29, 2024.
(Continued)

*Primary Examiner* — Matthew Troutman
*Assistant Examiner* — Fannie Kee
(74) *Attorney, Agent, or Firm* — Harness, Dickey & Pierce, P.L.C.

(57) ABSTRACT

An adaptor device configured to provide a fluid connection into an interior of a conduit section through an access point opening through a sidewall thickness of the conduit section may include an adaptor conduit structure defining a base conduit extending from an adaptor inlet to a base conduit outlet, a conduit connector configured to couple with the conduit section, and an elbow nozzle defining an elbow conduit extending to an adaptor outlet at a distal end and further configured to expose the elbow conduit at a proximate end to the base conduit to collectively define an adaptor conduit extending between the adaptor inlet and outlet. The elbow nozzle is configured to extend through the access point opening in a first direction into the interior and to further extend to the distal end within the interior in a second direction that is different from the first direction.

20 Claims, 37 Drawing Sheets

(56) References Cited

U.S. PATENT DOCUMENTS

| | | |
|---|---|---|
| 8,277,745 B2 | 10/2012 | Mehus et al. |
| 9,587,778 B2 | 3/2017 | Nourian |
| 9,943,778 B1 | 4/2018 | Gutierrez et al. |
| 12,083,238 B1 | 9/2024 | Thompson |
| 2006/0237806 A1 | 10/2006 | Martin et al. |
| 2007/0224050 A1 | 9/2007 | Ward |
| 2009/0064698 A1 | 3/2009 | Spanger |
| 2010/0147876 A1 | 6/2010 | Mehus et al. |
| 2016/0252072 A1 | 9/2016 | Peleg |
| 2017/0122474 A1 | 5/2017 | Borawski et al. |
| 2018/0195657 A1 | 7/2018 | Hafele et al. |

FOREIGN PATENT DOCUMENTS

| | | |
|---|---|---|
| DE | 202004017497 U1 | 1/2005 |
| DE | 102018004060 A1 | 11/2019 |
| EP | 0439090 A1 | 7/1991 |
| KR | 20150004021 U | 11/2015 |
| NL | 1042149 B1 | 5/2018 |
| WO | 2011/075324 A1 | 6/2011 |
| WO | 2012/164289 A1 | 12/2012 |
| WO | 2015/089410 A2 | 6/2015 |

OTHER PUBLICATIONS

"IFLO® Smart Automated AC Drain Line Cleaner," webpage <https://iflo.com>, 6 pages, available on Internet as of Aug. 17, 2023, retrieved from Internet on Feb. 29, 2024.

"IFLO Smart Automated AC Drain Line Cleaning System, Includes 36oz Cleaner Cartridge," webpage <https://iflo.com/products/iflo®-device-starter-kit>, 9 pages, available on Internet as of Dec. 7, 2023, retrieved from Internet on Mar. 20, 2024.

"FAQ—iFLO," webpage <https://iflo.com/pages/faq>, 22 pages, available on Internet as of Dec. 19, 2023, retrieved from Internet on Feb. 29, 2024.

Screen captures of animated video entitled "iFLO—Closed Drain Line Installation Video," 10 pages, retrieved from Internet: <https://cdn.shopify.com/videos/c/o/v/5d1d5d15ffe447cbb31718f246086bdb.mp4>, available on Internet as of Dec. 19, 2023, retrieved from Internet on Feb. 29, 2024.

Screen captures of animated video entitled "iFLO—Open Drain Line Installation Video," 6 pages, retrieved from Internet: <https://cdn.shopify.com/videos/c/o/v/ff6be7a49c6e4943ab0e3a069fc5b209.mp4>, available on Internet as of Dec. 19, 2023, retrieved from Internet on Feb. 29, 2024.

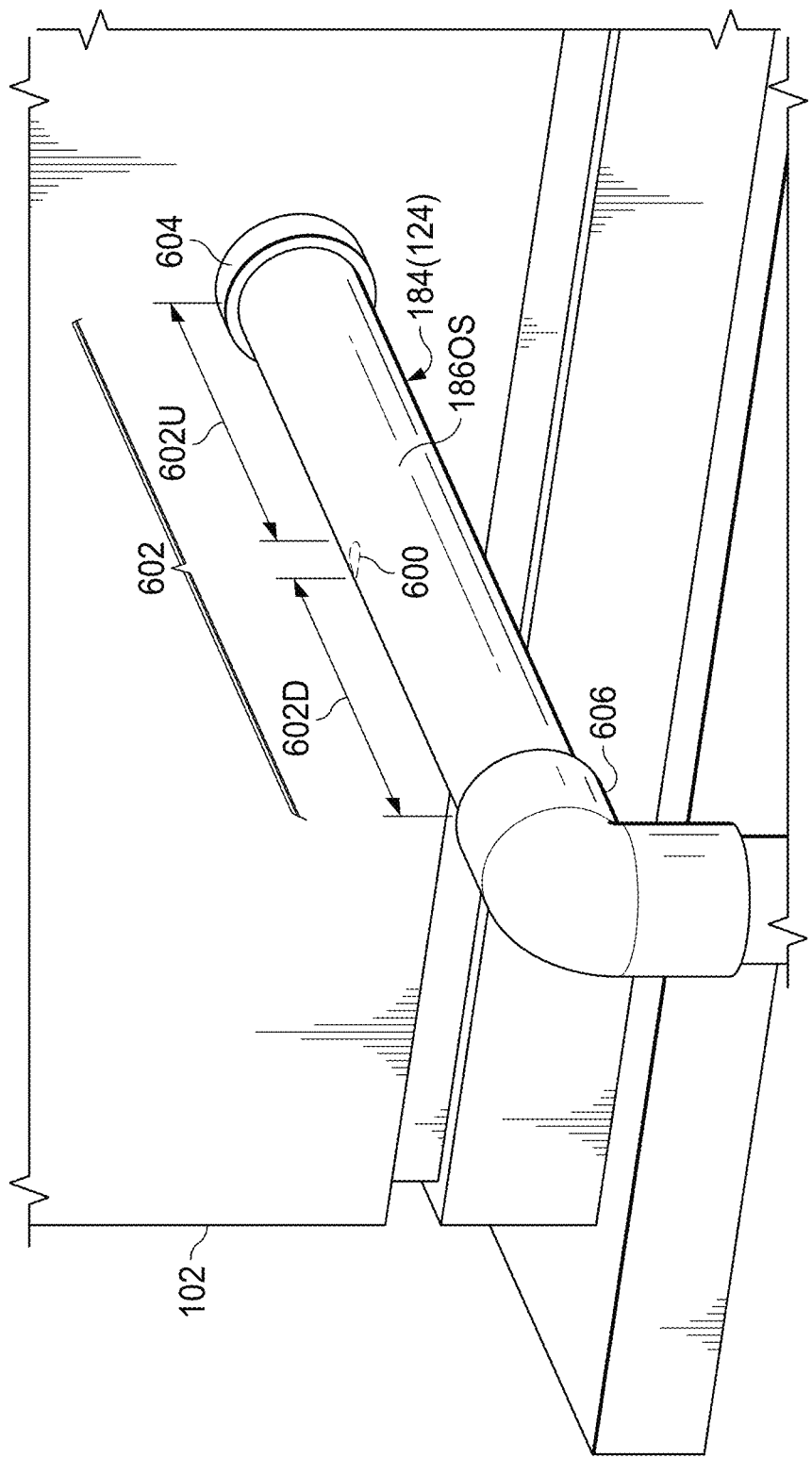

CONDUIT ACCESS ADAPTOR DEVICES AND METHODS

CROSS-REFERENCE TO RELATED APPLICATION

This application claims priority to and the benefit of U.S. patent application Ser. No. 18/617,028 filed in the United States Patent and Trademark Office on Mar. 26, 2024, the entire contents of which are incorporated herein by reference.

BACKGROUND

Field

The present inventive concepts relate generally to systems, devices, and methods to supply fluids, including for example cleaning compositions, into conduits, including for example condensate drain lines of air conditioning systems, for example via access point openings of said conduits, and more particularly to systems, devices, and methods for providing a fluid connection into a conduit section interior of a conduit section of a conduit through an access point opening into the conduit section interior such that the fluid is further directed to flow within the conduit section interior at least partially along a longitudinal axis of the conduit section interior.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

In some cases, cooling air due to the heat exchanger absorbing heat from the air may result in condensation of moisture (e.g., condensate) out of the cooled air at the heat exchanger. The condensate may be collected and discharged from the air handler via a condensate drain line.

SUMMARY

According to some example embodiments, an adaptor device may be configured to establish a fluid connection between a fluid supply source and a conduit section of a conduit through an access point opening into a conduit section interior of the conduit section, the access point opening extending through a sidewall thickness of a conduit section sidewall of the conduit section. The adaptor device may comprise an adaptor conduit structure having an upper end and a lower end. The adaptor conduit structure may at least partially define a base conduit extending from an adaptor inlet to a base conduit outlet. The adaptor device may comprise a conduit connector configured to engage at least a portion of the conduit section to couple the adaptor device to the conduit section such that the lower end of the adaptor conduit structure is proximate to an outer sidewall surface of the conduit section sidewall and the upper end of the adaptor conduit structure is distal from the outer sidewall surface of the conduit section sidewall. The adaptor device may comprise an elbow nozzle configured to extend to a distal end from the lower end of the adaptor conduit structure. The elbow nozzle may define defining an adaptor outlet at the distal end. The elbow nozzle may further define an elbow conduit extending to the adaptor outlet. The elbow nozzle may be configured to expose the elbow conduit to the base conduit to collectively define an adaptor conduit extending between the adaptor inlet and the adaptor outlet. The elbow nozzle may be configured to at least partially extend through the access point opening in a first direction into the conduit section interior and to further extend to the distal end within the conduit section interior in a second direction that is different from the first direction and at least partially paraxial to a longitudinal axis of the conduit section such that a central axis of the adaptor outlet extends in the second direction within the conduit section interior.

The conduit may include a condensate drain line of an air conditioning system and is configured to direct condensate from a drip pan of an air handler of the air conditioning system to a condensate drain outlet through at least the conduit section interior. The fluid supply source may include a cleaner dispensing system configured to dispense a cleaning composition. The adaptor device may be configured to, based on being coupled to both the conduit section and the fluid supply source, receive the cleaning composition at the adaptor inlet from the cleaner dispensing system based on the cleaner dispensing system dispensing the cleaning composition through an outlet thereof, and direct the received cleaning composition through the adaptor conduit and into the conduit section interior to be supplied into the condensate drain line to cause at least some biological material to be removed from at least a portion of the condensate drain line.

The first direction may be perpendicular to the longitudinal axis of the conduit section. The second direction may be perpendicular to the first direction and is paraxial to the longitudinal axis of the conduit section.

The elbow nozzle may include a proximate nozzle section defining a proximate conduit section extending from an elbow conduit inlet in the first direction, a distal nozzle section defining the distal end of the elbow nozzle, further defining the adaptor outlet, and further defining a distal conduit section extending to the adaptor outlet in the second direction, and an elbow joint connecting the proximate nozzle section and the distal nozzle section, the elbow joint defining an elbow joint conduit section extending between the proximate conduit section and the distal conduit section such that the proximate conduit section, the elbow joint conduit section, and the distal conduit section collectively define the elbow conduit.

The elbow nozzle may be configured to extend through the access point opening and to further extend within the conduit section interior such that the distal nozzle section is between the longitudinal axis of the conduit section and an inner sidewall surface of the conduit section sidewall.

The elbow nozzle and the adaptor conduit structure may comprise separate pieces of material. The elbow nozzle may be configured to be coupled to the adaptor conduit structure to connect the base conduit and the elbow conduit to collectively define the adaptor conduit.

The elbow nozzle may comprise silicone.

The adaptor device may further comprise an inlet connector configured to couple with the fluid supply source externally to the conduit to cause the adaptor inlet to be in fluid communication with the fluid supply source.

The inlet connector may include a fitting configured to engage an inner surface of a fluid supply conduit based on being inserted into the fluid supply conduit.

The conduit connector may include a clamp that is configured to directly engage and clamp the outer sidewall surface to couple the adaptor device to the conduit.

The adaptor conduit structure may include an outlet nozzle extending from the lower end of the adaptor conduit structure, the outlet nozzle configured to extend into at least a portion of the elbow nozzle.

The outlet nozzle may define an opening that is angled in relation to a longitudinal axis of the outlet nozzle.

The adaptor device may further include a sealing member configured to seal at least an outer edge of the access point opening based on the conduit connector coupling the adaptor device to the conduit.

The sealing member may be coupled to the elbow nozzle.

According to some example embodiments, a system may comprise the adaptor device and an installation guide device configured to form the access point opening through the sidewall thickness of the conduit section sidewall. The installation guide device may include a drill bit device configured to drill through the sidewall thickness of the conduit section sidewall, a guide conduit having at least a lower guide opening, the installation guide device configured to enable longitudinal movement of the drill bit device at least partially through the guide conduit and at least partially through the lower guide opening, and a protrusion stop structure configured to limit longitudinal protrusion of the drill bit device from the lower guide opening to a particular protrusion distance.

According to some example embodiments, a method to provide a fluid connection into a conduit section interior of a conduit section of a conduit through a sidewall thickness of a conduit section sidewall of the conduit section may comprise inserting an elbow nozzle through an access point opening through the sidewall thickness and into the conduit section interior. The elbow nozzle may define an elbow conduit extending to an adaptor outlet at a distal end of the elbow nozzle. The inserting may cause the elbow nozzle to extend through the access point opening in a first direction into the conduit section interior and to further extend to the distal end within the conduit section interior in a second direction that is different from the first direction and at least partially paraxial to a longitudinal axis of the conduit section such that a central axis of the adaptor outlet extends in the second direction within the conduit section interior. The method may include coupling an adaptor conduit structure to the conduit section, the adaptor conduit structure having an upper end and a lower end, the adaptor conduit structure defining a base conduit extending from an adaptor inlet, the coupling including engaging a conduit connector with at least a portion of the conduit section such that the lower end of the adaptor conduit structure is proximate to an outer sidewall surface of the conduit section sidewall and the upper end of the adaptor conduit structure is distal from the outer sidewall surface of the conduit section sidewall and the adaptor conduit structure and the elbow nozzle collectively define an adaptor conduit that includes the base conduit and the elbow conduit and extends from the adaptor inlet external to the conduit section to the adaptor outlet facing in the second direction within the conduit section interior.

The method may further include forming the access point opening prior to inserting the elbow nozzle through the access point opening. The forming the access point opening may include coupling an installation guide device to the conduit. The installation guide device may include a drill bit device configured to drill through the sidewall thickness of the conduit. The installation guide device may include a guide conduit having at least a lower guide opening. The installation guide device may be configured to enable longitudinal movement of the drill bit device at least partially through the guide conduit and at least partially through the lower guide opening. The installation guide device may include a protrusion stop structure configured to limit longitudinal protrusion of the drill bit device from the lower guide opening to a particular protrusion distance. The coupling the installation guide device to the conduit may align the lower guide opening with an access point location on the outer sidewall surface of the conduit. The forming the access point opening may include operating the drill bit device while the installation guide device is coupled to the conduit to cause the drill bit device to move longitudinally at least partially through the lower guide opening to a protrusion distance that is equal to or less than the particular protrusion distance, such that the drill bit device drills through the sidewall thickness of the conduit from the access point location to form the access point opening. The forming the access point opening may include decoupling the installation guide device from the conduit to expose the access point opening.

The first direction may be perpendicular to the longitudinal axis of the conduit section. The second direction may be perpendicular to the first direction and paraxial to the longitudinal axis of the conduit section.

The elbow nozzle may include a proximate nozzle section defining a proximate conduit section extending from an elbow conduit inlet in the first direction, a distal nozzle section defining the distal end of the elbow nozzle, further defining the adaptor outlet, and further defining a distal conduit section extending to the adaptor outlet in the second direction, and an elbow joint connecting the proximate nozzle section and the distal nozzle section, the elbow joint defining an elbow joint conduit section extending between the proximate conduit section and the distal conduit section such that the proximate conduit section, the elbow joint conduit section, and the distal conduit section collectively define the elbow conduit.

The inserting the elbow nozzle through the access point opening may cause the elbow nozzle to extend through the access point opening and to further extend within the conduit section interior such that the distal nozzle section is between the longitudinal axis of the conduit section and an inner sidewall surface of the conduit section sidewall.

The elbow nozzle and the adaptor conduit structure may comprise separate pieces of material. The coupling the adaptor conduit structure to the conduit section may include coupling the adaptor conduit structure to a proximate end of the elbow nozzle such that the conduit connector holds at least the proximate end of the elbow nozzle in place between a portion of the adaptor conduit structure and the outer sidewall surface of the conduit section, and the elbow conduit is connected with the base conduit to define the adaptor conduit.

The adaptor conduit structure may include an outlet nozzle extending from the lower end of the adaptor conduit structure. The coupling the adaptor conduit structure to the conduit section may include inserting the outlet nozzle into the elbow conduit.

The outlet nozzle may define an opening that is angled in relation to a longitudinal axis of the outlet nozzle.

The elbow nozzle may comprise silicone.

The adaptor conduit structure may include an inlet connector that is configured to couple with a fluid supply source to cause the adaptor inlet to be in fluid communication with the fluid supply source. The method may further include coupling the inlet connector to the fluid supply source to establish fluid communication between the fluid supply source and the conduit section interior through at least the adaptor conduit and the access point opening.

The conduit may include a condensate drain line of an air conditioning system and is configured to direct condensate from a drip pan of an air handler of the air conditioning system to a condensate drain outlet through at least the conduit section interior. The fluid supply source may include a cleaner dispensing system configured to dispense a cleaning composition. The method may further include operating the cleaner dispensing system to dispense the cleaning composition, such that the cleaning composition dispensed by the cleaner dispensing system is directed through the adaptor conduit and into the conduit section interior to be supplied into the condensate drain line to cause at least some biological material to be removed from at least a portion of the condensate drain line.

The conduit connector may include a clamp, and the coupling the adaptor conduit structure to the conduit may include causing the clamp to directly engage and clamp the outer sidewall surface of the conduit section.

The coupling the adaptor conduit structure to the conduit may include causing a sealing member to seal at least an outer edge of the access point opening.

The sealing member may be coupled to the elbow nozzle, such that the inserting the elbow nozzle into the access point opening causes the sealing member to cover at least the outer edge of the access point opening, and the coupling the adaptor conduit structure to the conduit section causes the sealing member to be at least partially compressed towards the outer sidewall surface of the conduit section.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 7A, 7B, 7C, 7D, 7E, 7F, and 7G are perspective views of separate operations of the method shown in FIG. 6, according to some example embodiments.

DETAILED DESCRIPTION

Figure 1:
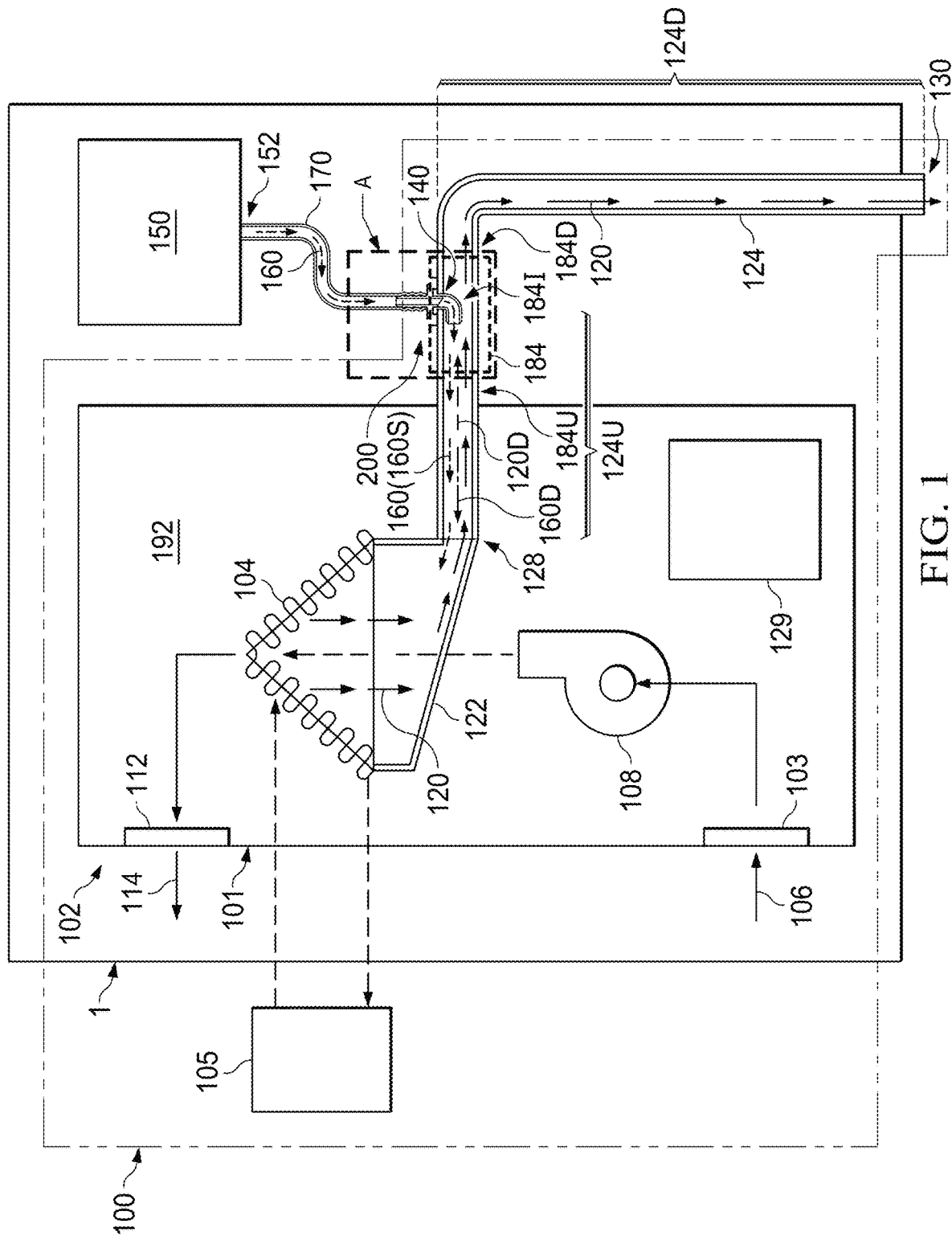
FIG. 1 is a schematic diagram of a system including a fluid supply source, a system including a conduit supported by the fluid supply source, and an adaptor device configured to provide fluid dispensed by the fluid supply source into a conduit section of the conduit through an access point opening of the conduit section, according to some example embodiments.

Reference will now be made in detail to example embodiments, some of which are illustrated in the accompanying drawings, wherein like reference labels refer to like elements throughout. However, specific structural and functional details disclosed herein are merely representative for purposes of describing example embodiments. Example embodiments may be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "paraxial," "flush," or the like with regard to other elements and/or properties thereof (e.g., structures, surfaces, directions, or the like) may be "perpendicular," "parallel," "paraxial," "flush," or the like or may be "substantially perpendicular," "substantially parallel," "substantially paraxial," or "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially paraxial" with regard to other elements and/or properties thereof will be understood to be "paraxial" with regard to the other elements and/or properties thereof within manufacturing tolerances and/or material tolerances and/or have a deviation in magnitude and/or angle from "paraxial," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof (e.g., "perpendicular," "parallel," "paraxial," "flush," or the like) are modified as "substantially," it will be understood that these elements and/or properties thereof (e.g., "perpendicular," "parallel," "paraxial," "flush," or the like) should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of +10% around the stated numerical value. When ranges are specified, the range includes all values therebetween such as increments of 0.1%.

FIG. 1 is a schematic diagram of a system including a fluid supply source 150, a system 100 including a conduit 124 supported by the fluid supply source 150, and an adaptor device 200 configured to provide fluid 160 dispensed by the fluid supply source 150 into a conduit section 184 of the conduit 124 through an access point opening 140 of the conduit section 184, according to some example embodiments.

Referring to FIG. 1, a fluid supply source 150 may be configured to supply ("dispense," "provide," "discharge," "output," etc.) a controlled amount of a fluid 160 via an outlet 152 thereof to at least a portion of a conduit 124. The portion of the conduit 124 to which the fluid 160 may be supplied may include a conduit section 184 of the conduit 124. The conduit 124 may be included in a system 100 that includes a process unit 102, where the conduit 124 is configured to direct a separate fluid 120 through the conduit 124 from a conduit inlet 128 to a conduit outlet 130 at opposite ends of the conduit 124 to be discharged from the system 100 and/or a structure 1 at least partially enclosing the system 100.

In some example embodiments, a conduit 124 may comprise multiple conduit sections (e.g., pipe segments) and/or fittings that are separate pieces that are coupled together to define the conduit 124, and the conduit section 184 may be a particular conduit section (e.g., a particular length of pipe) coupled to at least one other conduit section and/or fitting to at least partially define the conduit 124. For example, in some example embodiments the conduit 124 may comprise polyvinyl chloride (PVC) conduit sections and/or fittings, and the conduit section 184 may be a length of PVC pipe segment. However, it will be understood that example embodiments are not limited thereto, and the conduit 124 and/or any conduit sections thereof 184 may include any material and may have any dimensions.

In some example embodiments, including the example embodiments shown in FIG. 1, the system 100 includes a process unit 102 that is configured to discharge a fluid 120 through the conduit 124, such that the conduit 124 extends from a conduit inlet 128 that is coupled to the process unit 102 to a conduit outlet 130 at an opposite end of the conduit 124 and is configured to direct the fluid 120 therethrough from the conduit inlet 128 to the conduit outlet 130, which may be a conduit outlet 130 that directs the fluid 120 out of the system 100. As a result, and as shown in FIG. 1, the conduit 124 may be configured to direct the fluid 120 to flow through the conduit 124 in a flow direction 120D from the conduit inlet 128 to the conduit outlet 130. The fluid supply source 150 may be configured to supply (e.g., dispense, discharge, provide, output, etc.) a fluid 160 to be directed into at least a conduit section 184 of the conduit 124 (e.g., independently of either the conduit inlet 128 or the conduit outlet 130).

In some example embodiments, a fluid connection is established between the fluid supply source 150 and the conduit 124 independently of the conduit inlet 128 or the conduit outlet 130, such that the fluid 160 that is supplied from the fluid supply source 150 is directed into the conduit 124 via an opening that is separate from the conduit inlet 128 or the conduit outlet 130. Such an opening is referred to herein as an access point opening 140. An access point opening 140 may serve as an opening to access at least a portion of the conduit 124 for cleaning, maintenance, or the like independently of the conduit inlet 128 or the conduit outlet 130.

Referring to FIG. 1, in some example embodiments a fluid supply source 150 may be configured to supply (e.g., dispense, discharge, output, provide, etc.) a fluid 160 into at least a portion of the system 100 and/or one or more structures or conduits associated therewith (e.g., into the conduit 124) to enable the fluid 160 to interact with a portion of the system 100 and/or one or more structures or conduits associated therewith, for example to clean, break down, remove, etc. various substances that may be accumulated in the portion of the system 100 and/or one or more structures or conduits (e.g., conduit 124) associated therewith. As shown, a fluid supply source 150 may be configured to provide fluid 160 to one or more locations associated with the system 100 (e.g., an interior of the conduit 124) via an outlet 152 of the fluid supply source 150, including for example providing a fluid 160 to the interior of the conduit 124 via an access point opening 140 into said interior at a conduit section 184 of the conduit 124. Such a fluid supply source 150 may be understood to be "serving," "servicing," and/or "supporting" the system 100, the conduit 124, the conduit section 184, the process unit 102 to which the conduit inlet 128 of the conduit 124 is coupled and from which the conduit 124 is configured to receive a separate fluid 120, any combination thereof, or the like.

The fluid supply source 150 may include a dispenser device that is configured to operate to dispense (e.g., controllably dispense) a fluid 160 (e.g., via an outlet 152, also referred to herein as a dispensing outlet, of the fluid supply source 150). As described herein, "dispensing" a fluid 160 may include supplying (e.g., discharging, outputting, etc.) the fluid 160 via operating a pump (e.g., "pumping") of the fluid supply source 150, actuating one or more actuators and/or valves of the fluid supply source 150, or any combination thereof. A conduit, also referred to herein as a fluid supply conduit 170, may extend from one end coupled to the fluid supply source 150 (e.g., the outlet 152) to a location at, in, and/or associated with the 100, such as the conduit 124 through an access point opening 140 thereof. As shown in FIG. 1, for example, the fluid supply conduit 170 to direct fluid 160 from the outlet 152 may extend to an opening of the conduit 124. The fluid supply conduit 170 may comprise any material, including any flexible or rigid material (e.g., any metal material, any plastic and/or rubber material, or the like). The fluid supply conduit 170 may comprise any known tubing having any dimensions. For example, the fluid supply conduit 170 may comprise PVC tubing that may be transparent, opaque, and/or translucent.

The fluid supply source 150 may include a dispenser device that is configured to operate (e.g., actuate as a valve, operate as a pump, etc.) to dispense an amount of a fluid 160 (e.g., through the outlet 152) and a dispenser controller that is configured to operate the dispenser device to dispense the amount of the fluid 160. The fluid supply source 150 may include a fluid source that may be in fluid communication with an inlet of the dispenser device, such that the dispenser device may be configured to dispense fluid 160 received from the fluid source to the outlet 152 of the fluid supply source 150 and thus to a location external to the fluid supply source 150 via the outlet 152. In some example embodiments, the fluid source may be a detachable cartridge that is separate from a base (also referred to herein interchangeably as a base device, a base structure, a base apparatus, a fluid supply source base, or the like) that includes the dispenser device and the dispenser controller, where the cartridge may be detachably coupled to the base to reversibly establish flow communication between the cartridge interior (e.g., cartridge reservoir) and the inlet of the dispenser device. However, it will be understood that example embodiments are not limited thereto. For example, in some example embodiments the fluid source may be a fixed reservoir that is integral to (e.g., not removable from) the base of the fluid supply source 150. In another example, the fluid source may be a fluid port that is configured to receive the fluid 160 from an external supply source via a conduit coupled to the fluid port.

The dispenser device of the fluid supply source 150 may include any device configured to be controlled to control a flow of an amount of fluid 160. In some example embodiments, the dispenser device may include at least one valve that is configured to be actuated to be selectively opened (e.g., to selectively open a flow path through the at least one valve) based on a control signal generated by the dispenser controller to establish a flow path through the at least one valve and through which the fluid 160 may flow (e.g., a flow path from the fluid supply source to the outlet 152). For example, a valve of the dispenser device as described herein may include an electromechanically operated valve, including a solenoid valve, which may be selectively actuated based on a control signal from the dispenser controller. In some example embodiments, the dispenser device may include any known pump, including any known positive displacement pump, rotary pump, worm pump, gear pump, or the like that is configured to operate for a particular period of time to move the amount of the fluid 160 from an inlet of the dispenser device which is in fluid communication with the cleaning composition supply source to an outlet of the dispenser device which is in fluid communication with the outlet 152, based on a control signal generated by the dispenser controller.

The dispenser controller may, in some example embodiments, include a memory (e.g., a solid state drive, or SSD), also referred to herein as a dispenser memory, storing a program of instructions (referred to herein as a program of dispenser instructions) and a processor (e.g., a central processing unit, or CPU), also referred to herein as a dispenser processor, configured to execute the program of instructions to implement the functionality of the dispenser controller as described herein. Accordingly, where a dispenser controller and/or a fluid supply source 150 is described herein to perform or be configured to perform any functionality, function, operation, method, or the like, it will be understood that the dispenser controller may include a dispenser memory storing a program of dispenser instructions and a dispenser processor configured to execute the program of dispenser instructions to perform (or to configure the dispenser controller and/or the fluid supply source 150 to perform) the functionality, function, operation, method, or the like of the dispenser controller and/or of the fluid supply source 150.

In some example embodiments, the operation of the dispenser device by the dispenser controller may include operating the dispenser device to dispense the fluid 160 (e.g., move the fluid 160 from an inlet of the dispenser device that is in fluid communication with the fluid supply source to an outlet of the dispenser device that is in fluid communication with the outlet 152 of the fluid supply source 150) for a particular duration of time. Such a particular duration of time may be, for example 3 seconds, 5 seconds, or the like, but example embodiments are not limited thereto. In some example embodiments, the operation of the dispenser device by the dispenser controller may include operating the dispenser device 206 of the dispensing duration in response to an elapse of a particular time interval since a previous operation of the dispenser device (e.g., since the beginning or end of the previous operation). Such a time interval may be, for example, 7 days, 168 hours, or the like, but example embodiments are not limited thereto. For example, in some example embodiments, the fluid supply source may be configured to hold a total volume of 36 oz of fluid 160, so that, in some example embodiments where the one or more dispenser parameters includes a dispensing time interval that is 7 days and a dispensing duration that corresponds to causing the dispenser device to dispense 3 oz of fluid 160, the fluid supply source 150 may be configured to operate the dispenser device thereof according to one or more parameter values of the one or more dispenser parameters to dispense 3 oz of fluid 160 (e.g., cleaning composition) through the outlet 152 every 7 days for a period of 12 weeks (84 days).

As shown in FIG. 1, in some example embodiments the system 100 includes an air conditioning system, the process unit 102 includes an air handler unit (AHU), also referred to as an "air handler," and the conduit 124 includes a condensate drain line that is configured to direct a separate fluid 120 that includes condensate in a flow direction 120D from the air handler to a conduit outlet 130 to be discharged from the air conditioning system and/or a structure 1 containing at least a portion thereof. In some example embodiments, including example embodiments where the system 100 includes an air conditioning system, the fluid supply source 150 may include a cleaner dispensing system that is configured to supply a fluid 160 that includes a cleaning composition that is configured to mitigate (e.g., break down, remove, clean, etc.) biological material. The cleaning composition (as fluid 160) may be supplied into at least the conduit section 184 of the condensate drain line (as conduit 124) via the access point opening 140 to mitigate (e.g., break down, clean, remove, etc.) biological material (e.g., biological substances) that may be located within the interior of the condensate drain line in order to mitigate (e.g., remove, clean, break down, etc.) biological material accumulation within the condensate drain line and thus reduce the likelihood of condensate backflow through the condensate drain line due to a blockage in the condensate drain line due to such biological material accumulation.

However, it will be understood that example embodiments are not limited to such example embodiments where the system 100 includes an air conditioning system, the fluid supply source 150 includes a cleaner dispensing system, the fluid 160 includes a cleaning composition, and the conduit 124 includes a condensate drain line. Accordingly, it will be understood that the system 100 as described herein according to any of the example embodiments may be an air conditioning system for example as shown with regard to system 100 in FIG. 1, the process unit 102 as described herein according to any of the example embodiments may be an air handler that may include at least the drip pan 122 as shown with regard to process unit 102 in FIG. 1, the conduit 124 as described herein according to any of the example embodiments may be a condensate drain line having a condensate drain inlet (conduit inlet 128) and a condensate drain line outlet (conduit outlet 130), the fluid supply source 150 as described herein according to any of the example embodiments may be a cleaner dispensing system configured to dispense a fluid 160 that is or includes a cleaning composition as shown with regard to the fluid supply source 150 in FIG. 1, the fluid 160 as described herein according to any of the example embodiments may be a cleaning composition.

Referring to some example embodiments, including the example embodiments shown in FIG. 1, a system 100 that includes an air conditioning system, which may be interchangeably referred to as an air conditioner system, air conditioner, or the like, may be configured to provide cooling of air within an interior of a structure 1 and may be at least partially located within the structure 1, but example embodiments are not limited thereto. The air conditioning system may be included as a part of a heating, ventilation, and air conditioning (HVAC) system, but example embodiments are not limited thereto, and in some example embodiments the air conditioning system may be separate from any heating system.

Referring to some example embodiments, including the example embodiments shown in FIG. 1, where the system 100 includes an air conditioning system, the system 100 may include a process unit 102 that includes an air handler and a condenser assembly 105 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler may include, within a housing 101 that may at least partially comprise metal (e.g., steel) and at least define an interior 192 space, an air intake 103, an air mover 108 (e.g., fan, blower, etc.), a heat exchanger 104, a drip pan 122, a conduit 124 that includes a condensate drain line (also referred to herein as a condensate drain conduit, condensate drain pipe, etc.), a controller 129, and an air outlet 112. The condenser assembly 105 may include a compressor, a second heat exchanger (e.g., condenser coil), and an air mover (e.g., fan, blower, etc.).

It will be understood that example embodiments of an air conditioning system, air handler, condenser assembly, or the like may have different arrangements of devices therein and may omit or add to the aforementioned elements of the air conditioning system as shown in FIG. 1. It will be understood, for example, that elements shown as being included in the air handler may in some example embodiments be located in the condenser assembly 105 (e.g., the controller 129 may be located in the condenser assembly 105 instead of the air handler). As shown, the condenser assembly 105 may be located external to the structure 1 while the air handler is located internal to the structure 1, but example embodiments are not limited thereto.

In some example embodiments, the air conditioning system (system 100) may draw return air 106 into the air handler (process unit 102) via the air intake 103. The air mover 108 (e.g., blower) may induce the flow of air into, through, and out of, the air handler. The air mover 108 may move (e.g., blow) the return air 106 to the heat exchanger 104. The return air 106 may flow in thermal communication with (e.g., in contact with outer surfaces of) one or more coils of the heat exchanger 104 so that heat is removed from the return air 106 to cool the return air 106 into conditioned air 114. The air handler may move the conditioned air 114 out of the air handler and back into an interior space of the structure 1 via the air outlet 112.

An air conditioning system (system 100) may circulate a working fluid (e.g., a refrigerant, including known R22 refrigerant, R410A refrigerant, or any known refrigerant) between the heat exchanger 104 and a heat exchanger of the condenser assembly 105 to remove heat from the return air 106 based on the return air 106 flowing in thermal communication (e.g., through, across, over, and/or in contact with one or more outer surfaces of) the heat exchanger 104. The heat exchanger 104 may include any known heat exchanger used for an air conditioning system, for example an evaporator coil exchanger that includes one or more coils of one or more tubes through which the working fluid flows (e.g., as a cooled liquid). The heat exchanger 104 may cause heat to be transferred from the return air 106 and into the working fluid when the return air 106 is caused to flow across (e.g., in contact with, in thermal communication with, etc.) the one or more coils (e.g., one or more outer surfaces thereof), thereby resulting in the working fluid becoming heated (e.g., heated into a low-pressure gas). The heated working fluid may be drawn, via a fluid line (e.g., fluid conduit, pipe, etc.) into the condenser assembly 105.

As further shown, the air conditioning system may include a controller 129 that is configured to control elements of the air conditioning system, including for example controlling operation of the air handler, condenser assembly 105, or any part thereof. The controller 129, and any functionality thereof, may be implemented by a computing device, including a memory storing a program of instructions (e.g., a solid state drive (SSD) memory or storage device) and a processor (e.g., a central processing unit (CPU)) configured to execute the program of instructions. While the controller 129 is shown as being included within the housing 101 of the air handler, it will be understood that the controller 129 may be located external to the housing 101 and, in some example embodiments, may be located within the condenser assembly 105 or may be attached to an exterior of the air handler for ease of manual access.

Still referring to FIG. 1, when heat is removed from the return air 106 based on the return air 106 passing in thermal communication with the heat exchanger 104, water may condense out of the cooled conditioned air 114 as a fluid 120 that may be a condensate at the heat exchanger 104, for example on one or more outer surfaces thereof. The air handler (process unit 102) may include a drip pan 122 located beneath the heat exchanger 104, and the condensate (fluid 120) may fall under gravity from the one or more outer surfaces of the heat exchanger 104 to collect in the drip pan 122.

In some example embodiments, including the example embodiments shown in FIG. 1 where the system 100 is an air conditioning system and the process unit 102 includes an air handler that includes a drip pan 122, the system 100 may include a conduit 124 that includes a condensate drain line having an inlet opening (conduit inlet 128) coupled to the drip pan 122 of the air handler (e.g., a bottom surface or a side surface of the drip pan 122), for example a side surface proximate to a lowest level of a bottom surface of the drip pan 122 where the bottom surface may or may not be at least partially inclined to be angled downwards towards the inlet opening (conduit inlet 128) of the conduit 124. The conduit 124 may include an outlet opening (conduit outlet 130) that is external to the system 100 and open to the ambient environment, as shown. Condensate (e.g., fluid 120) collected in the drip pan 122 may pass to the inlet opening (conduit inlet 128) of the condensate drain line (conduit 124) to exit the drip pan 122, and the condensate drain line may direct the condensate to flow in the flow direction 120D out of the air handler (process unit 102) and out of the structure 1 and system 100 to the ambient environment via the outlet opening (conduit outlet 130) of the condensate drain line (conduit 124).

In some example embodiments, various substances may accumulate in one or more portions of a system 100 (e.g., in an air conditioning system, the drip pan 122, the condensate drain line conduit 124, etc.), which may clog one or more portions of condensate removal elements thereof (e.g., drip pan 122, condensate drain line conduit 124, etc.). Such substances, referred to herein as biological materials, biological substances, or the like, may include, for example, mold, algae, mildew, bacteria, and/or fungi. Such biological material accumulation may obstruct the flow of fluid 120 (e.g., condensate) through the conduit 124 to the outlet opening (conduit outlet 130) to exit the system 100 and thus cause accumulation of fluid 120 (e.g., condensate) in the conduit 124 (e.g., condensate backflow). Such accumulation of fluid 120 in the conduit 124 may potentially result in condensate accumulation (backflow) from the conduit 124 (e.g., condensate drain line) into the process unit 102 (e.g., drip pan 122 of an air handler). Biological material accumulation may occur in a portion of the process unit 102 (e.g., in the drip pan 122) and may cause accumulation of fluid (e.g., condensate) in the process unit 102. Such accumulation of fluid 120 in the conduit 124 and/or the drip pan 122 may cause damage to the process unit 102 (e.g., air handler), system 100 (e.g., air conditioning system) and/or to a structure 1 in which the process unit 102 is included, including water damage which may occur due to accumulation of fluid 120 therein due to clogging of the conduit 124, drip pan 122, or the like by the biological materials.

Referring to FIG. 1, in some example embodiments a fluid supply source 150 may be configured to supply (e.g., dispense, discharge, output, provide, etc.) a fluid 160 that includes a cleaning composition into at least a portion of the system 100 and/or one or more structures or conduits associated therewith (e.g., into the conduit 124) to clean, break down, remove, etc. various substances (e.g., mold, algae, mildew, bacteria, and/or fungi) that may be accumulated in the portion of the system 100 and/or one or more structures or conduits associated therewith (e.g., within an interior of the conduit 124). As described herein, a fluid 160 that includes a cleaning composition may be any known chemical composition (e.g., solution, liquid, fluid, etc.) that may be configured to clean (e.g., remove, break down, etc.) potential buildup substances, also referred to herein as biological substances (e.g., mold, algae, mildew, bacteria, and/or fungi), from a surface of the system 100, including for example an inner surface of the conduit 124, any combination thereof, or the like. In some example embodiments, the fluid 160 may include a cleaning composition that may be a chemical substance that is or includes a chelating agent (e.g., chelant) including, for example, sodium hexametaphosphate, that is configured to remove potential buildup substances from one or more portions of the air conditioning system based on chelation upon contact with the potential buildup substances. For example, the fluid 160 may include a cleaning composition that may be a liquid solution that includes 3%-7% sodium hexametaphosphate, by weight of the total weight of the cleaning composition.

As shown in FIG. 1, and as further shown in at least FIGS. 2 and 10, an adaptor device 200, which may be referred to herein interchangeably as a "conduit access adaptor device," may be coupled to the conduit 124 (e.g., condensate drain line) at a particular portion thereof, said portion herein being referred to as a conduit section 184, to establish fluid communication between an interior of the conduit 124 at the conduit section (herein, the conduit section interior 184I) and an exterior environment that is external to the conduit 124 via an adaptor conduit 220C that extends from an adaptor inlet 220I to an adaptor outlet 220O. The adaptor device 200 is configured to, based on being coupled to the conduit 124 and/or the conduit section thereof 184, provide the adaptor outlet 220O to be exposed to (e.g., located within) the conduit section interior 184I through an access point opening 140 into the conduit section interior 184I and to further provide the adaptor inlet 220I to be exposed to the exterior environment external to the conduit 124. The adaptor device 200 may be further configured to be coupled with the fluid supply source 150 (e.g., via coupling with one end of a fluid supply conduit 170 that is coupled at an opposite end thereof to the outlet 152 of the fluid supply source 150) to establish fluid communication between the adaptor inlet 220I and the outlet 152 of the fluid supply source 150. As a result, the adaptor device 200 may be coupled to the conduit section 184 and further coupled to the fluid supply source 150 (e.g., via fluid supply conduit 170) to enable the adaptor device 200 to fluid 160 dispensed by the fluid supply source 150 to flow into the conduit section interior 184I of the conduit section 184 of the conduit 124 via the adaptor conduit 220C of the adaptor device 200. and any fluid supply conduit 170 that may connect the adaptor inlet 220I to the outlet 152 of the fluid supply source 150. The adaptor device 200 may be considered to be part of the system 100 or separate from the system 100.

Accordingly, fluid 160 (e.g., cleaning composition) that is dispensed by the fluid supply source 150 (e.g., cleaner dispensing system) may be directed (e.g., by at least the fluid supply conduit 170 and the adaptor device 200) into an interior of at least a portion (e.g., conduit section interior 184I of conduit section 184) of the conduit 124, where such fluid 160 may include cleaning composition and thus may mitigate (e.g., clean, break down, remove, etc.) various substances (e.g., biological material, including mold, algae, mildew, bacteria, and/or fungi) that may be accumulated in the interior of the conduit 124. As a result, the adaptor device 200 may be configured to direct the fluid 160 into one or more portions of the system 100 to reduce the risk of backflow of fluid 120 (e.g., condensate) in the system 100 (e.g., backflow in a conduit 124 that includes a condensate drain line which may further accumulate back into a drip pan 122 of a process unit 102 that includes an air handler via conduit inlet 128, etc.) which might cause overflow of fluid 120 (e.g., condensate) in the system 100, process unit 102, and/or structure 1. Thus, the adaptor device 200, based on enabling supply of fluid 160 (e.g., cleaning composition) into the interior of the conduit 124, may improve operational performance of the system 100 and reduce the risk for damage to the system 100, process unit 102, and/or structure 1 due to backflow of fluid 120 (e.g., condensate) in the conduit 124 (e.g., condensate drain line).

In some example embodiments, and as shown in at least FIG. 1, the conduit section 184 to which the adaptor device 200 is coupled (and which, for example, may be a segment of pipe, for example a segment of PVC pipe) has an upstream end 184U that is coupled (directly or indirectly) to the conduit inlet 128 of the conduit 124, and the conduit section 184 further has a downstream end 184D that is coupled (directly or indirectly) to the conduit outlet 130. The upstream end 184U may be understood to be proximate to the conduit inlet 128 in relation to the downstream end 184D and the downstream end 184D may be understood to be proximate to the conduit outlet 130 in relation to the upstream end 184U.

Figure 2A:
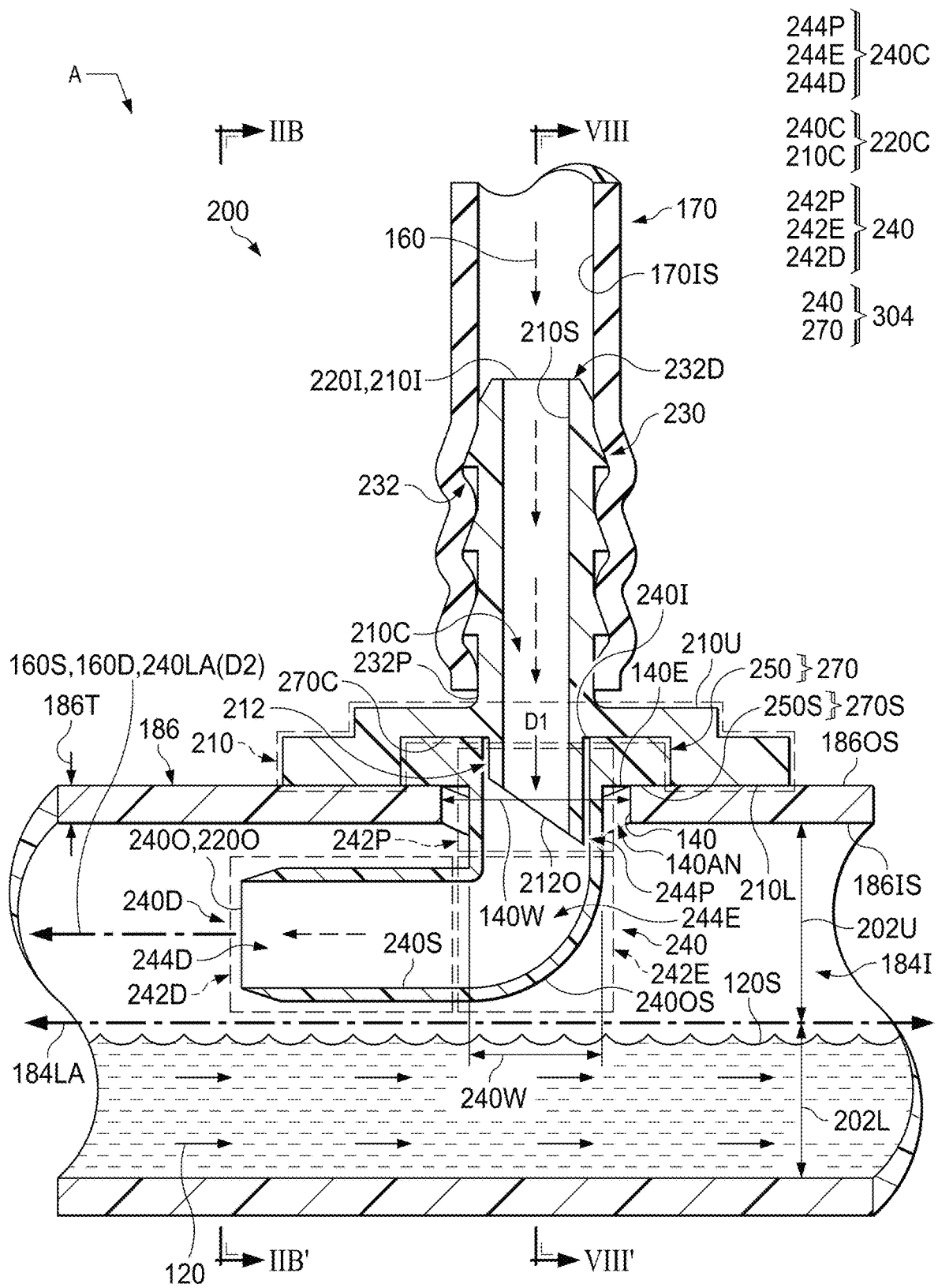
FIG. 2A is an expanded cross-sectional view of region A of FIG. 1, showing an adaptor device providing a fluid connection into a conduit section interior of a closed conduit section of a through a sidewall thickness of a conduit section sidewall of the conduit section, according to some example embodiments.
Figure 2B:
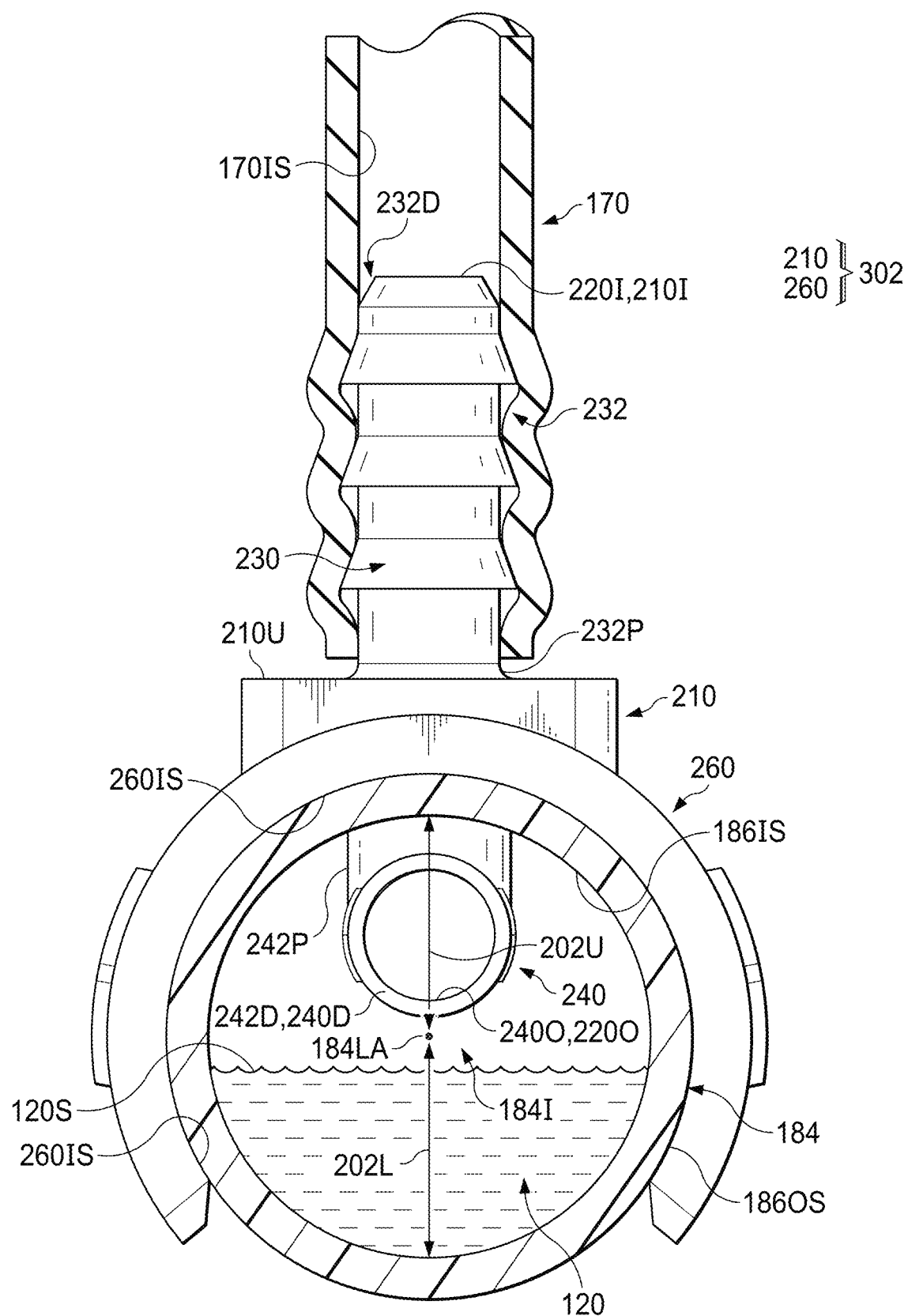
FIG. 2B is a cross-sectional view along view line IIB-IIB' in FIG. 2A, according to some example embodiments.

As shown in at least FIG. 1 and further shown in FIGS. 2A-2B, the adaptor device 200 may be configured to direct a fluid stream 160S of the fluid 160 out of an adaptor outlet 220O of the adaptor device 200 to flow through at least a portion of the conduit section interior 184I in an "upstream" flow direction 160D against (e.g., opposite to) the fluid flow direction 120D of fluid 120 through at least a portion of the conduit section 184 and through the upstream end 184U of the conduit section 184. As a result, the adaptor device 200 is configured to direct the fluid stream 160S of the fluid 160 to flow through at least a portion of the interior of the conduit 124 towards the conduit inlet 128 at the "upstream" end of the conduit 124 and thus to flow through at least a portion of an "upstream" portion 124U of the conduit 124 that extends between the access point opening 140 and the conduit inlet 128. The adaptor device 200 may thus be configured to direct the fluid 160 into the conduit 124 to flow in a 160S directed in a particular flow direction 160D to reach, and thus interact with (e.g., contact, affect, etc.) one or more portions of the upstream conduit portion 124U of the conduit 124 that are "upstream" of the access point opening 140 within the conduit 124 (e.g., between the access point opening 140 and the conduit inlet 128). The fluid 160, having interacted with at least a portion of the upstream conduit portion 124U of the conduit 124 upstream of the access point opening 140, may then flow along the flow direction 120D (separately or in combination with the separate fluid 120) through the conduit 124 to flow through a downstream conduit portion 124D of the conduit 124 that is defined between the access point opening 140 and the conduit outlet 130, such that the fluid 160 may thereby interact with both upstream and downstream conduit portions 124U and 124D of the conduit 124 in relation to a single access point opening 140 located between the upstream and downstream conduit portions in the conduit 124.

In some example embodiments, including example embodiments where the conduit inlet 128 at the "upstream" end of the conduit 124 is coupled to a process unit 102 such that the conduit 124 is configured to receive a fluid 120 from the process unit 102 via the conduit inlet 128 and direct the fluid 120 through the conduit 124 from the conduit inlet 128 to the conduit outlet 130 in a flow direction 120D through at least the conduit section 184, the adaptor device 200 may be configured to direct a fluid stream 160S of the fluid 160 to flow through at least a portion of the conduit section interior 184I in an "upstream" flow direction 160D against the flow direction 120D of fluid 120 through the conduit section 184 and further through the upstream conduit portion 124U and through the conduit inlet 128 into at least a portion of the process unit 102. The adaptor device 200 may thus be configured to direct the fluid 160 into the conduit 124 to flow in a 160S directed in a particular flow direction 160D to reach, and thus interact with (e.g., contact, affect, etc.) one or more portions of both the process unit 102 upstream of the conduit 124 and an upstream conduit portion 124U of the conduit 124 that are "upstream" of the access point opening 140. The fluid 160, having interacted with at least a portion of the process unit 102 upstream of the conduit 124, may then flow along the flow direction 120D (separately or in combination with the separate fluid 120) through the conduit inlet 128 to flow through the conduit 124 (e.g., the entirety of the flow path defined by the conduit 124 between the conduit inlet 128 and the conduit outlet 130) and thus flow through both the upstream and downstream conduit portions 124U and 124D, thereby subsequently interacting with both upstream and downstream conduit portions 124U and 124D of the conduit 124 in addition to at least a portion of the process unit 102 based on the fluid 160 being directed into the conduit section interior 184I via the adaptor device 200. As a result, the adaptor device 200 may be configured to provide the fluid 160 into the process unit 102, to affect one or more portions of the process unit 102, without requiring a separate access point opening into the process unit 102 independently of the conduit 124 (e.g., an access point opening into the process unit 102 upstream of the conduit inlet 128).

In some example embodiments, where the system 100 includes an air conditioning system, the process unit 102 includes an air handler having a drip pan 122 to which the conduit 124 includes a condensate drain line coupled at the conduit inlet 128 to the drip pan 122, and further where the fluid 160 includes a cleaning composition that may be any known chemical composition (e.g., solution, liquid, fluid, etc.) that may be configured to clean (e.g., remove, break down, etc.) potential buildup substances, also referred to herein as biological substances (e.g., mold, algae, mildew, bacteria, and/or fungi), from a surface of the system 100, including for example an inner surface of the conduit 124, the drip pan 122 any combination thereof, or the like, the adaptor device 200 may be configured to direct a fluid stream 160S of the fluid 160 to flow through at least a portion of the conduit section interior 184I in an "upstream" flow direction 160D against the flow direction 120D of fluid 120 through the conduit section 184 and further through the upstream conduit portion 124U and through the conduit inlet 128 into at least a portion of the drip pan 122, where the cleaning composition may mitigate (e.g., break down, remove, clean, etc.) biological materials that may be present in at least a portion of the drip pan 122. The cleaning composition fluid 160 may then pass (independently or in combination with condensate fluid 120) out of the drip pan 122 into the conduit 124 via the conduit inlet 128 and further flow along the flow direction 120D (e.g., in the fluid flow direction 120D) through the conduit 124 (e.g., the entirety of the flow path defined by the conduit 124 between the conduit inlet 128 and the conduit outlet 130) and thus flow through both the upstream and downstream conduit portions 124U and 124D such that the cleaning composition fluid 160 may contact and mitigate (e.g., break down, remove, clean, etc.) biological materials in both the upstream and downstream conduit portions 124U and 124D of the conduit 124 in addition to at least a portion of the drip pan 122 based on the fluid 160 being directed into the conduit section interior 184I via the adaptor device 200.

As a result, the adaptor device 200 may be configured to provide a cleaning composition fluid 160 into at least the drip pan 122 of an air handler process unit 102 from a downstream location of a conduit section 184 in a condensate drain line conduit 124 and further enable the cleaning composition fluid 160 to flow from the drip pan 122 and through the entire length of the conduit 124 between the conduit inlet 128 and the conduit outlet 130 to at least partially mitigate (e.g., break down, remove, clean, etc.) biological materials from both the drip pan 122 and the entire length of the conduit 124 between the conduit inlet 128 and the conduit outlet 130 without requiring a separate access point opening into the process unit 102 independently of an access point opening 140 into the conduit 124 at a conduit section 184 that is located between the conduit inlet 128 and the conduit outlet 130 along the length of the conduit (e.g., without being required to provide an access port opening into the drip pan 122 independently of the conduit 124 and upstream of the conduit inlet 128), thereby reducing costs and complexity associated with providing fluid 160 into one or more portions of the system 100.

The adaptor device 200 may be thus configured to enable at least partial mitigation (e.g., removal, breakdown, cleaning, etc.) of potential buildup substances (e.g., mold, algae, mildew, bacteria, and/or fungi) from one or more portions of the system 100 (e.g., the interior of at least a portion of the conduit 124 upstream and/or downstream of the access point opening 140, the drip pan 122 of the air handler process unit 102, etc.) based on directing the fluid stream 160S into the interior of the conduit 124 (e.g., at least the conduit section interior 184I) in a flow direction 160D directed at least partially paraxial to a longitudinal axis of the conduit section 184 and which may be directed at least partially in an upstream direction toward the conduit inlet 128 and opposite to the flow direction 120D of fluid passing through the conduit 124 from the conduit inlet 128 (which may be coupled to the process unit 102) to the conduit outlet 130 (which may be exposed to an exterior of the system 100 and/or structure 1). Such at least partial mitigation provided by the fluid stream 160S directed by the adaptor device 200 may thereby reduce or prevent the occurrence of backflow and/or overflow of fluid 120 in the system 100 (e.g., backflow and/or overflow of the condensate drain line conduit 124 and/or drip pan 122 due to clogging, reduce or prevent the reduction in heat transfer performance of the heat exchanger 104 due to the potential buildup substances, any combination thereof, or the like), thereby improving performance of the system 100 and without requiring the expense or complexity of a separate access point opening into the process unit 102 to provide fluid 160 into the drip pan 122 at a point upstream of the drip pan 122.

In some example embodiments, and as shown in at least FIGS. 2A and 2B, the adaptor device 200 may be configured to direct the fluid stream 160S through an upper portion 202U of at least the conduit section 184 such that the fluid stream 160S may be at least partially vertically spaced apart (in a vertical direction opposite to the direction of gravity) from a separate, lower portion 202L (e.g., a lower portion in the direction of gravity) of the conduit 124 through which the separate fluid 120 (e.g., condensate) may flow, thereby vertically spacing the elbow nozzle 240 from an upper surface 120S of fluid 120 flowing through the conduit 124 and thus reducing, minimizing, or preventing any clogging of the adaptor device 200 by the separate fluid 120 and/or any biological materials therein and further reducing, minimizing, or preventing any restriction of the fluid flow path of the separate fluid 120 through the conduit 124.

In some example embodiments, the fluid supply source 150 may be configured to dispense (e.g., pump, spray, etc.) the fluid 160 into at least a portion of the system 100 without human intervention (e.g., automatically), for example to dispense discrete amounts (e.g., a particular amount, which may be a particular volume and/or particular mass) of the fluid 160 at a particular (or, alternatively, predetermined) fixed time interval, thereby reducing or preventing accumulation of the various substances in one or more portions of the system 100 while reducing or minimizing human intervention and/or effort expended to implement the dispensing. Because the fluid supply source 150 is configured to dispense the fluid 160 (e.g., repeatedly at a fixed time interval, also referred to herein as a dispensing time interval) without human intervention, the accumulation of potential substances (e.g., biological materials including mold, algae, mildew, bacteria, and/or fungi) in one or more portions of the system 100 (e.g., in the condensate drain line) may be reduced, removed, or prevented, based on the fluid 160 (e.g., cleaning composition) being directed into at least a conduit section 184 of the conduit 124 by the adaptor device 200. Such reduction, removal, or prevention of substance (e.g. biological material) accumulation in the system 100 may thereby improve overall efficiency and/or performance of the system 100 for example at least with regard to cooling the return air 106 in example embodiments where the system 100 includes an air conditioning system as shown in FIG. 1, and may further reduce or prevent the likelihood of fluid 120 (e.g., condensate) backup and/or overflow which might otherwise result in shutdown of at least the process unit 102 (e.g., air handler) and/or system 100, flooding damage to the process unit 102 and/or structure in which the process unit 102 is located, or the like. Because human intervention is not required to implement the dispensing (of the cleaning composition, particularly dispensing of a fluid 160 that includes a cleaning composition repeatedly at a fixed time interval, the likelihood of such accumulation resulting in significant reduction in system 100 (e.g., air conditioning system) performance and/or efficiency, and/or resulting in damage to at least one of the system 100, the process unit 102, or the structure 1, due to a missed or forgotten manual dispensing of cleaning composition by a human operator is reduced or prevented, thereby improving operational performance and/or efficiency of the system 100 and reducing workload by a human operator.

Still referring to FIG. 1, and further referring to FIGS. 2A-2B and 3A-3H, in some example embodiments an adaptor device 200 may be coupled to at least a conduit section 184 of the conduit 124 to establish a fluid connection between an external environment external to the conduit 124 (including for example a fluid supply source 150) and a conduit section interior 184I of at least the conduit section 184 of the conduit 124 through an access point opening 140 in the conduit section 184. The adaptor device 200 may be further configured to be coupled to the fluid supply source 150 (e.g., the outlet 152 thereof) to establish a fluid connection between the fluid supply source 150 (e.g., via connection with an end of a fluid supply conduit 170 that is connected at an opposite end to the outlet 152 of the fluid supply source 150) and the conduit section interior 184I of at least the conduit section 184 through an access point opening 140 into the conduit section interior 184I, thereby enabling the fluid 160 supplied by the fluid supply source 150 to be directed into at least a portion of the conduit 124. For example, in example embodiments where the conduit 124 is a condensate drain line and the fluid supply source 150 is a cleaner dispensing system that dispenses a fluid 160 that includes a cleaning composition, the adaptor device 200 may be configured to enable such cleaner composition that is supplied from the cleaner dispensing system to be directed into the interior of the condensate drain line via the access point opening 140 to mitigate (e.g., remove, clean, break down, etc.) biological materials within the condensate drain line to mitigate or prevent condensate backflow therein.

In some example embodiments, and as described further below with reference to at least FIGS. 2A-11B, the access point opening 140 may be a conduit that extends through a sidewall thickness 186T of a conduit section sidewall 186 of at least the conduit section 184 of the conduit 124 to establish fluid communication between the conduit section interior 184I and the exterior of the conduit 124 through the sidewall thickness 186T. In some example embodiments, such an access point opening 140 may be initially absent from the conduit section 184, such that the conduit section 184 (and in some example embodiments the entirety of the conduit 124 between the conduit inlet 128 and the conduit outlet 130) may be a "closed" conduit extending between opposite ends and defined by an inner sidewall surface 186IS of a conduit section sidewall 186 of the conduit section 184 that does not include any access point opening 140 extending into the conduit section interior 184I from an exterior of the conduit 124 independently of the conduit inlet 128 and the conduit outlet 130 (e.g., extending through a thickness direction of the sidewall thickness 186T that extends perpendicular to the longitudinal axis 184LA of the conduit section 184), such that the conduit section 184 initially omits any opening via which the adaptor device 200 may establish fluid communication with the adaptor conduit thereof (and through which the adaptor device may establish fluid communication between the conduit section interior 184I and the fluid supply source 150). The access point opening 140 may, in some example embodiments, be formed (e.g., based on drilling through the sidewall thickness 186T of the conduit section) and the adaptor device 200 may be coupled with the conduit 124 (e.g., coupled with at least the conduit section 184) to align an adaptor outlet 220O of an adaptor conduit 220C extending through the adaptor device 200 to be exposed to the conduit section interior 184I through the access point opening 140 through the sidewall thickness 186T of the conduit section 184, and a fluid connection between an adaptor inlet 220I of the adaptor conduit 220C and the fluid supply source 150 may be established to establish the fluid connection between the fluid supply source 150 and the conduit section interior 184I via the adaptor device 200 and the access point opening 140 through the sidewall thickness 186T of the conduit section 184.

As a result, the adaptor device 200 may be configured to provide fluid 160 (e.g., cleaning composition) from a fluid supply source 150 into the interior of the conduit 124 even when the conduit 124 initially does not include a preexisting "open" access point opening into the conduit 124 independently of the conduit inlet 128 and the conduit outlet 130 at opposite ends of the conduit 124 (e.g., at opposite ends of a flow path from the process unit 102 to an exterior of the system 100 through the entire length of the conduit 124) and/or the adaptor device 200 may be enabled to provide fluid 160 (e.g., cleaning composition) from a fluid supply source 150 into the interior of the conduit 124 via an access point opening 140 that extends through a sidewall thickness 186T of the conduit section sidewall 186 extending between (e.g., entirely between as shown in at least FIGS. 2A) the outer sidewall surface 186OS and the inner sidewall surface 186IS of the conduit section 184. Such an adaptor device 200, including for example the adaptor device 200 shown and/or described with reference to FIGS. 2A-11B, may be referred to herein as a closed conduit adaptor device.

However, it will be understood that the adaptor device 200 according to some example embodiments is not limited to coupling with a conduit section 184 of a "closed" conduit 124. In some example embodiments, the conduit 124 includes an "open" conduit section 184 which may have a conduit segment that may extend from the conduit section sidewall 186 to define the access point opening as a conduit extending from an open end opening of the conduit segment that is exposed to an exterior of the conduit 124 to an opposite end opening of the conduit segment that is exposed to the conduit section interior 184I.

As described further below, in some example embodiments, the adaptor device 200 may include an adaptor conduit structure at least partially defining a base conduit extending from an adaptor inlet, a conduit connector configured to engage at least a portion of the conduit section 184 to couple the adaptor device 200 to the conduit section 184, and an elbow nozzle configured to extend to a distal end from the lower end of the adaptor conduit structure, the elbow nozzle defining an adaptor outlet at the distal end, the elbow nozzle further defining an elbow conduit extending to the adaptor outlet, the elbow nozzle configured to expose the elbow conduit to the base conduit to collectively define an adaptor conduit extending between the adaptor inlet and the adaptor outlet, wherein the elbow nozzle is configured to extend through the access point opening 140 in a first direction D1 (e.g., a vertical downwards direction) into the conduit section interior 184I and to further extend to the distal end within the conduit section interior 184I in a second direction D2 that is different from the first direction and at least partially paraxial to a longitudinal axis of the conduit section 184 such that a central axis of the adaptor outlet extends in the second direction within the conduit section interior and thus extends at least partially paraxial to the longitudinal axis of the conduit section 184, such that the elbow nozzle is configured to direct fluid 160 that passes through the adaptor conduit 220C and through the adaptor outlet 220O to flow in a flow direction 160D that is at least partially in the second direction (e.g., at least partially in the direction of the central axis 240LA) and thus is at least partially paraxial with the longitudinal axis of the conduit section 184 . . . . The central axis of the adaptor outlet and/or a longitudinal axis (e.g., central longitudinal axis) of at least a distal portion of the elbow nozzle may at least partially define the flow direction 160D in which a fluid stream 160S of fluid 160 directed through the adaptor conduit may flow based on being directed through the adaptor outlet 220O of the adaptor device 200, such that the adaptor device 200 is configured to direct a fluid 160 received at an adaptor inlet to flow through the adaptor conduit and to be directed to flow into the conduit section interior 184I via the adaptor outlet 220O in a particular flow direction 160D that is at least partially paraxial to the longitudinal axis of the conduit section interior 184I and/or which may be at least partially extending along a longitudinal axis of a flow pathway through the conduit section 184 between the upstream and downstream ends 184U and 184D of the conduit section 184.

While example embodiments herein describe a fluid supply source 150 that may include a cleaner dispensing system that dispenses a fluid 160 that may include a cleaner composition into a conduit section 184 of a conduit 124 that may include a condensate drain line of a system 100 that may include an air conditioning system, it will be understood that example embodiments are not limited thereto. For example, the conduit section 184 may be a conduit section of a conduit 124 that is configured to direct any fluid (e.g., any liquid) along a flow path extending from the conduit inlet 128 at one end of the conduit 124 to a conduit outlet 130 at an opposite end of the conduit 124, and the description herein of any example embodiments including the conduit 124 and the conduit section 184 thereof may be applied to any example embodiments including at least one conduit (e.g., any fluid conduit) that is configured to direct any fluid (e.g., any liquid) and any conduit section thereof. For example, the conduit section 184 may be a pipe, tube, tubing, or the like that defines a conduit section interior 184I therein and is configured to direct any fluid through the conduit section interior 184I thereof, and the description herein of any example embodiments including the conduit section 184 may apply to example embodiments including any conduit section, segment, piece, or the like of any conduit. For example, the system 100 may be understood to be an example of a process, machinery, equipment or the like which is configured to cause a fluid to flow through a conduit (e.g., a pipe) that includes the conduit section 184 as a section of such conduit, and any descriptions of any example embodiments including the system 100 and the conduit 124 thereof may be applied to example embodiments including any process, machinery, equipment or the like which is configured to cause a fluid to flow through a conduit (e.g., a pipe) that includes the conduit section 184 as a section of such conduit. For example, a cleaner composition may be an example of a fluid 160 (e.g., any liquid) that may be supplied from a fluid supply source 150 into a conduit 124 via an adaptor device 200, and any descriptions herein of any example embodiments including a fluid 160 may apply to example embodiments including any fluid (e.g., any liquid). For example, the fluid supply source 150 that is configured to dispense a fluid 160 via an outlet 152 may be an example of a fluid supply source that is configured to provide a fluid (e.g., any fluid) via an outlet and which may be coupled to the adaptor device 200 (e.g., via a fluid supply conduit 170) to establish fluid communication between the fluid supply source 150 and the conduit section interior 184I of a conduit section 184 to which the adaptor device 200 is coupled such that the fluid supply source may dispense a fluid 160 that may be directed by the adaptor device 200 into the conduit section interior 184I of the conduit section 184, and any descriptions herein of example embodiments including a fluid supply source 150 that is configured to dispense a fluid 160 via an outlet 152 may be applied to any example embodiments including any fluid supply source that is configured to provide a fluid (e.g., any fluid) via an outlet and which may be coupled to the adaptor device 200 (e.g., via a fluid supply conduit 170) to establish fluid communication between the fluid supply source and the conduit section interior 184I of a conduit section 184 to which the adaptor device 200 is coupled.

Figure 3A:
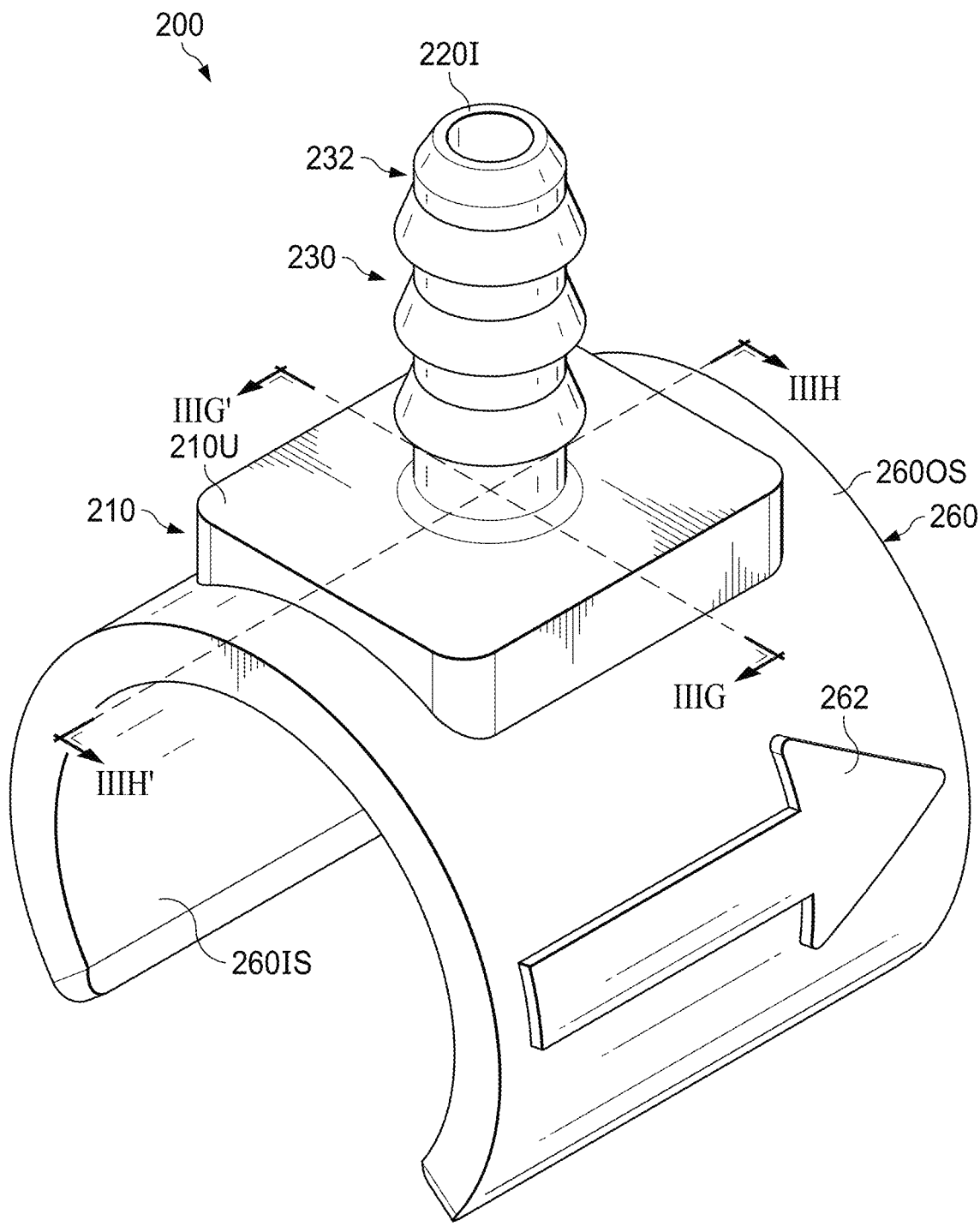
FIGS. 3A, 3B, 3C, 3D, 3E, and 3F are views of an adaptor device, according to some example embodiments.
Figure 3B:
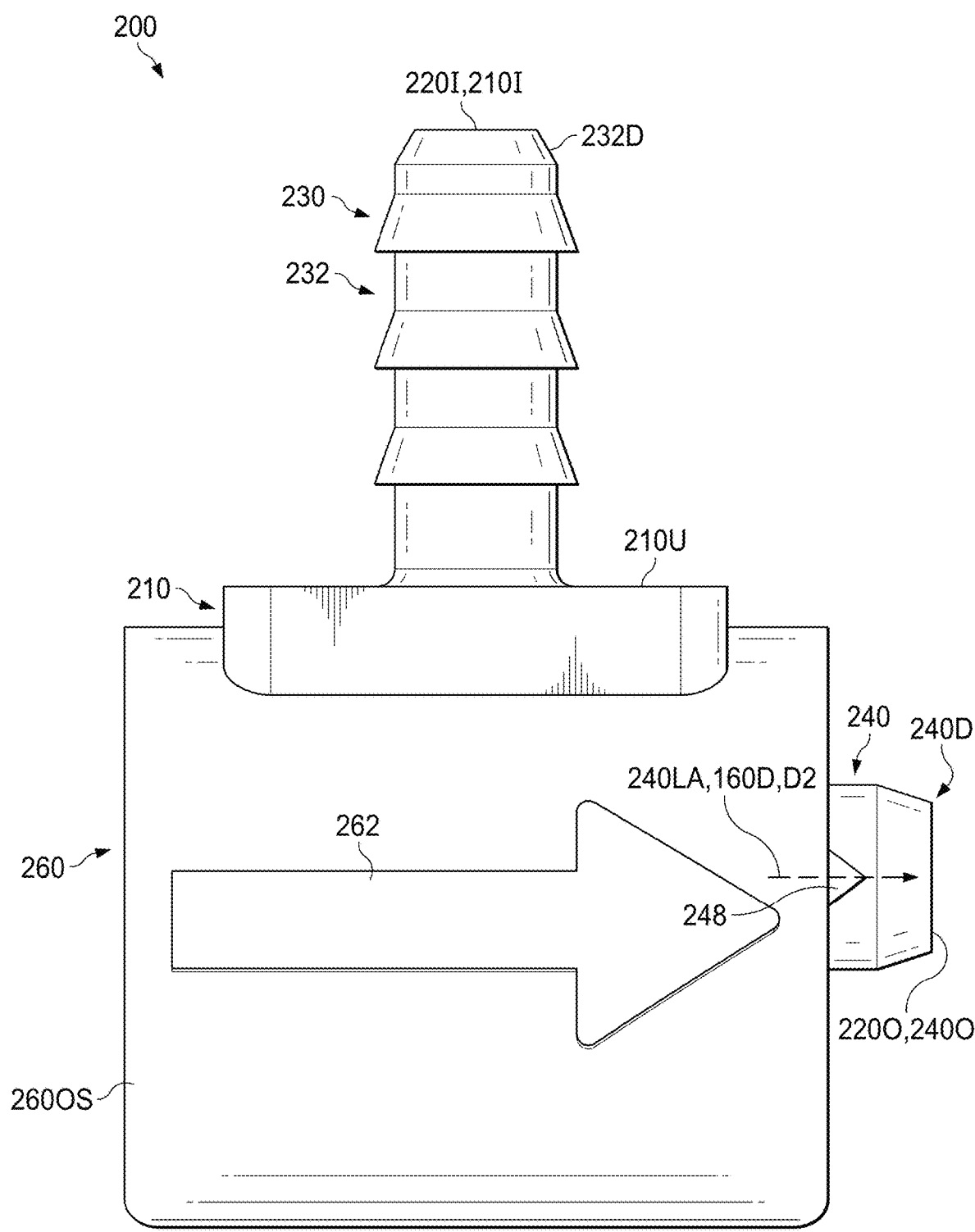
Figure 3C:
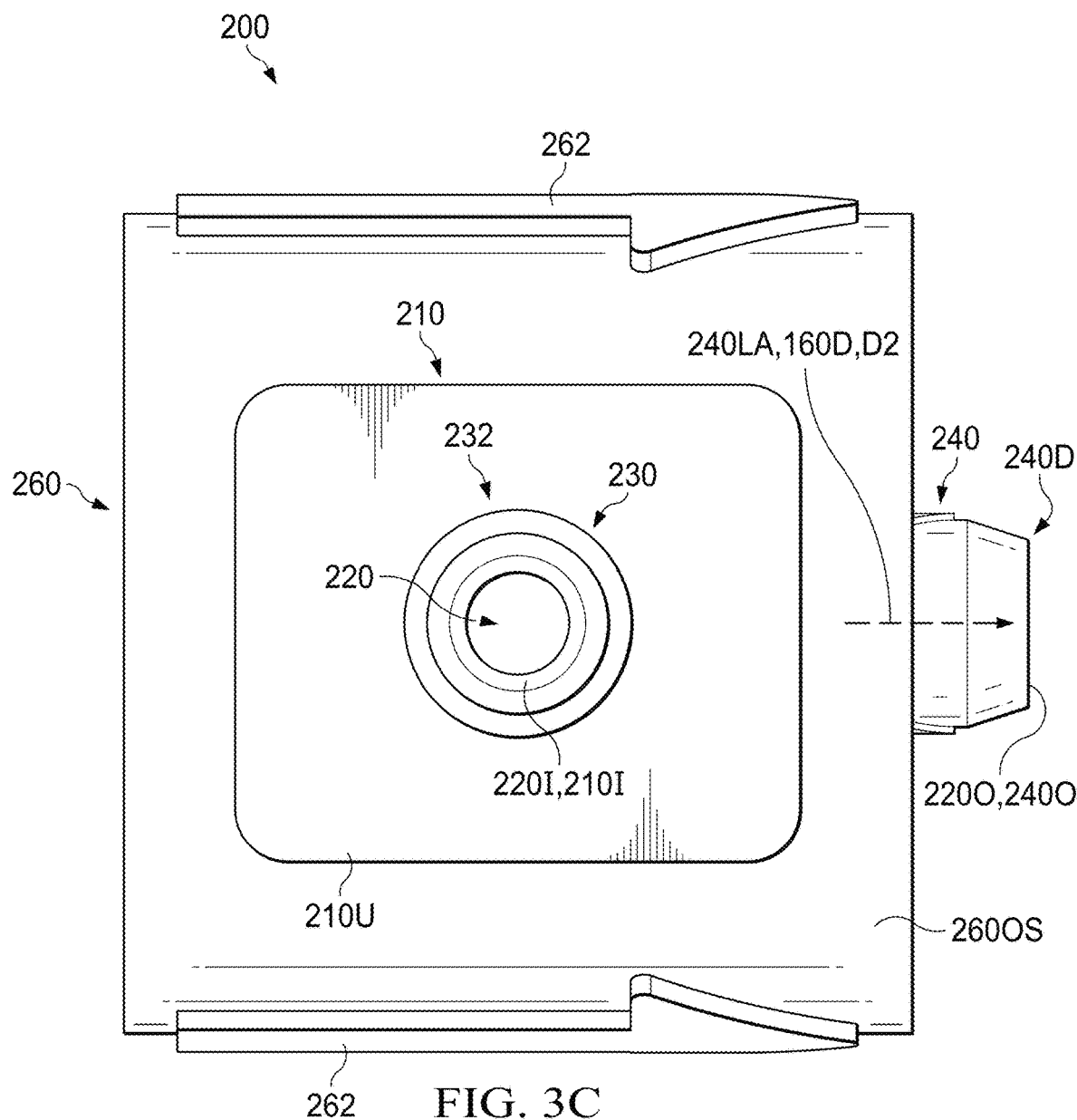
Figure 3D:
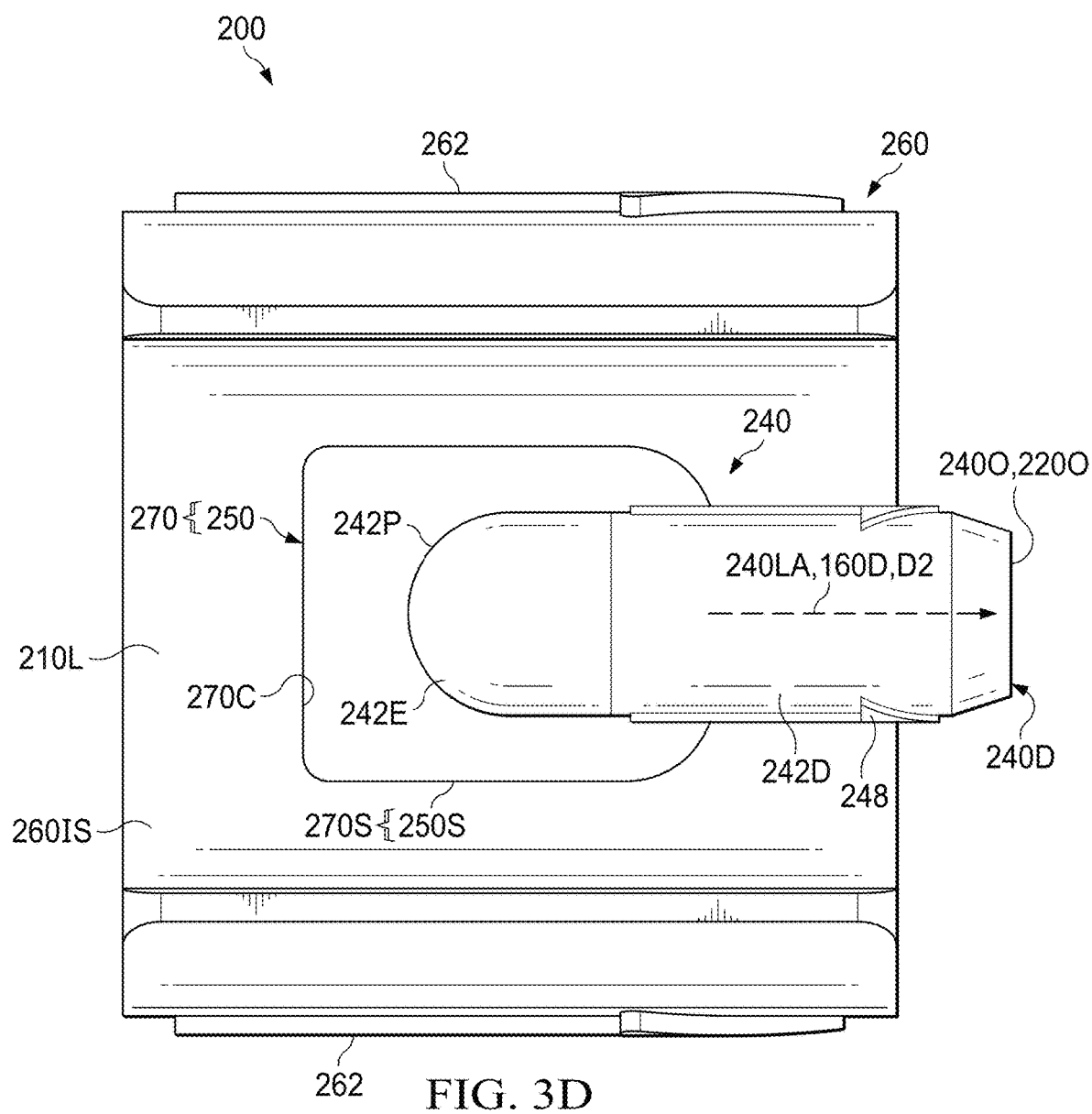
Figure 3E:
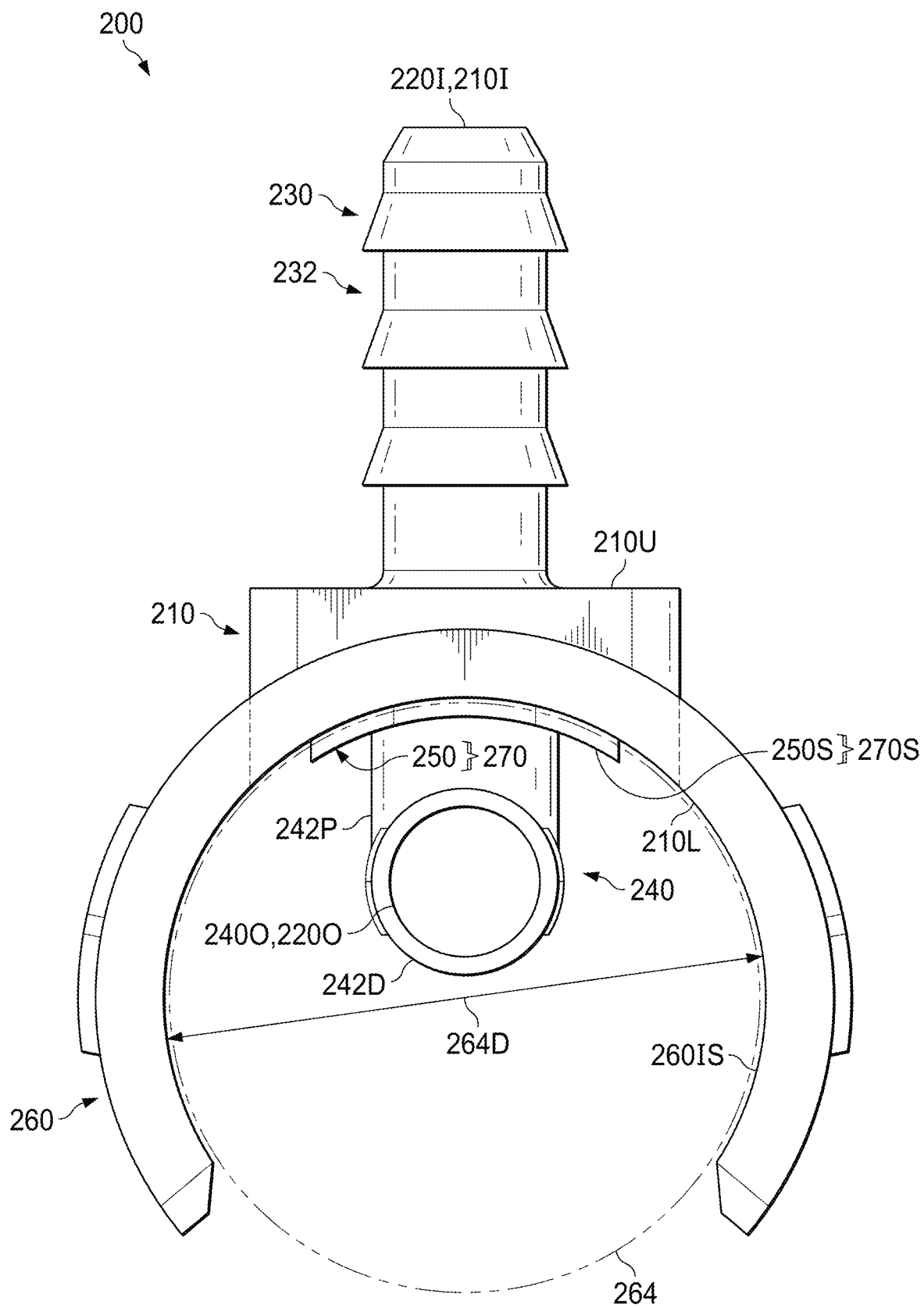
Figure 3F:
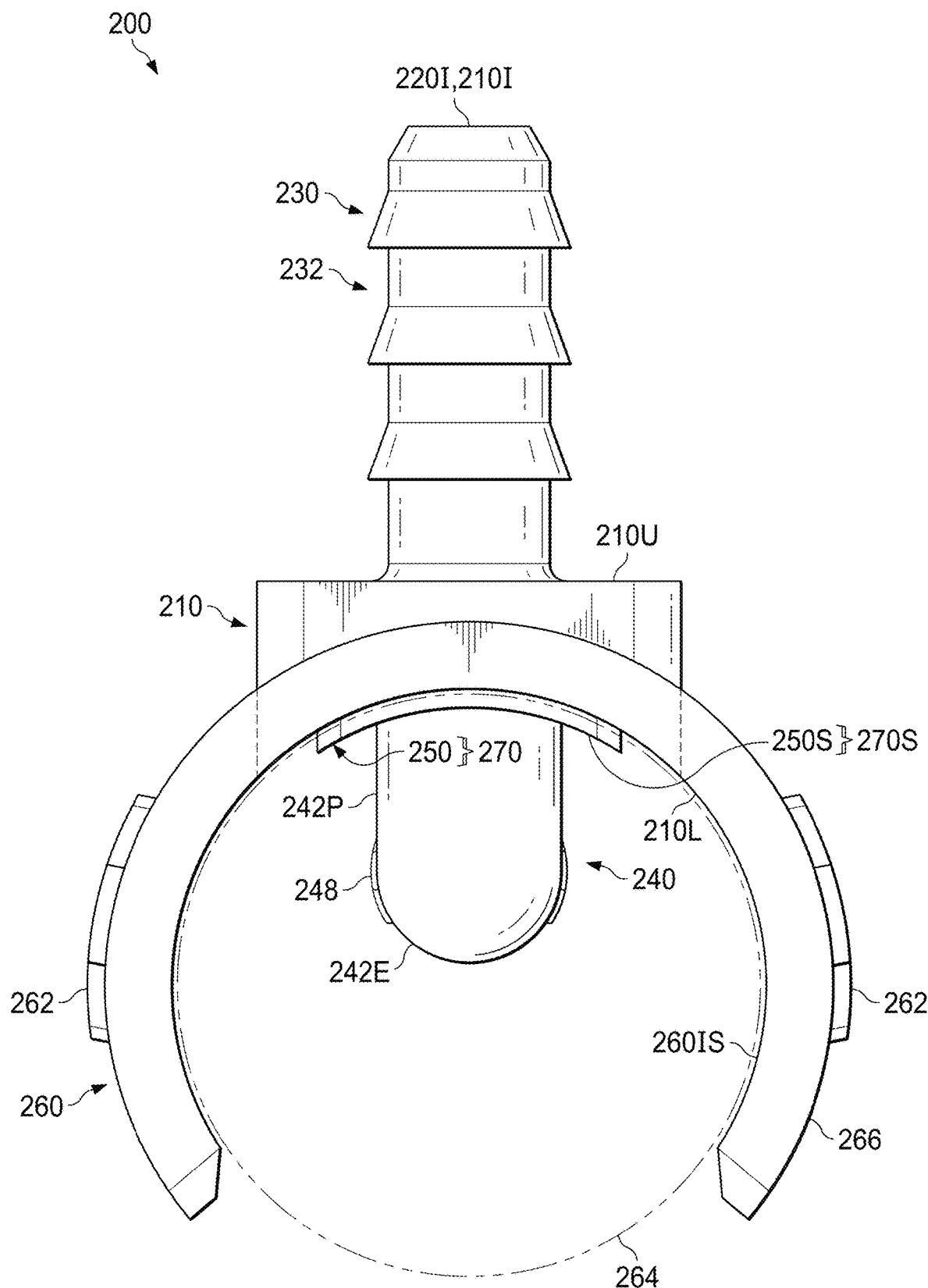
Figure 3G:
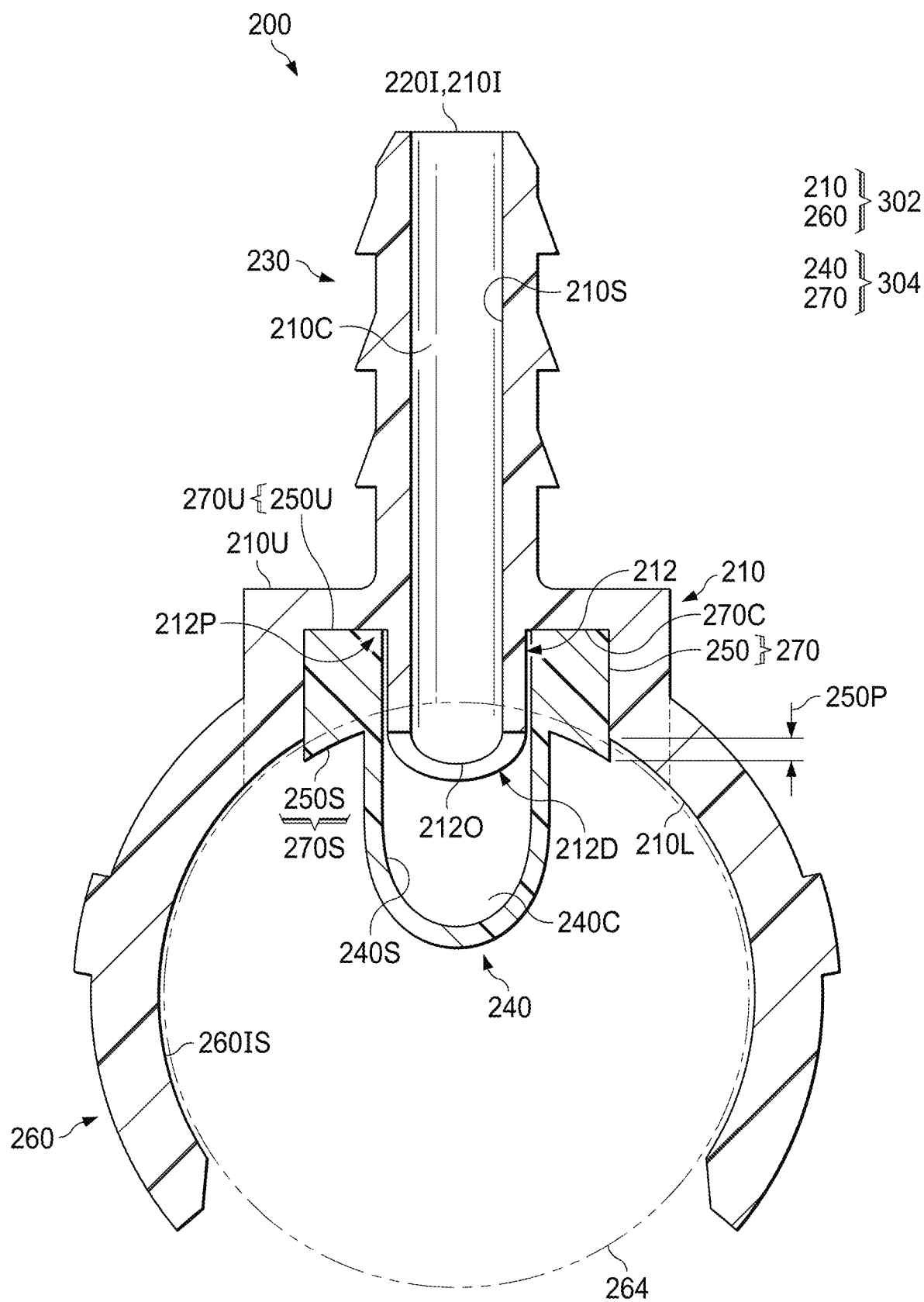
FIGS. 3G and 3H are cross-sectional elevation views of the adaptor device of FIG. 3A along cross-sectional view lines IIIG-IIIG' and IIIH-IIIH', respectively, shown in FIG. 3A, according to some example embodiments.
Figure 3H:
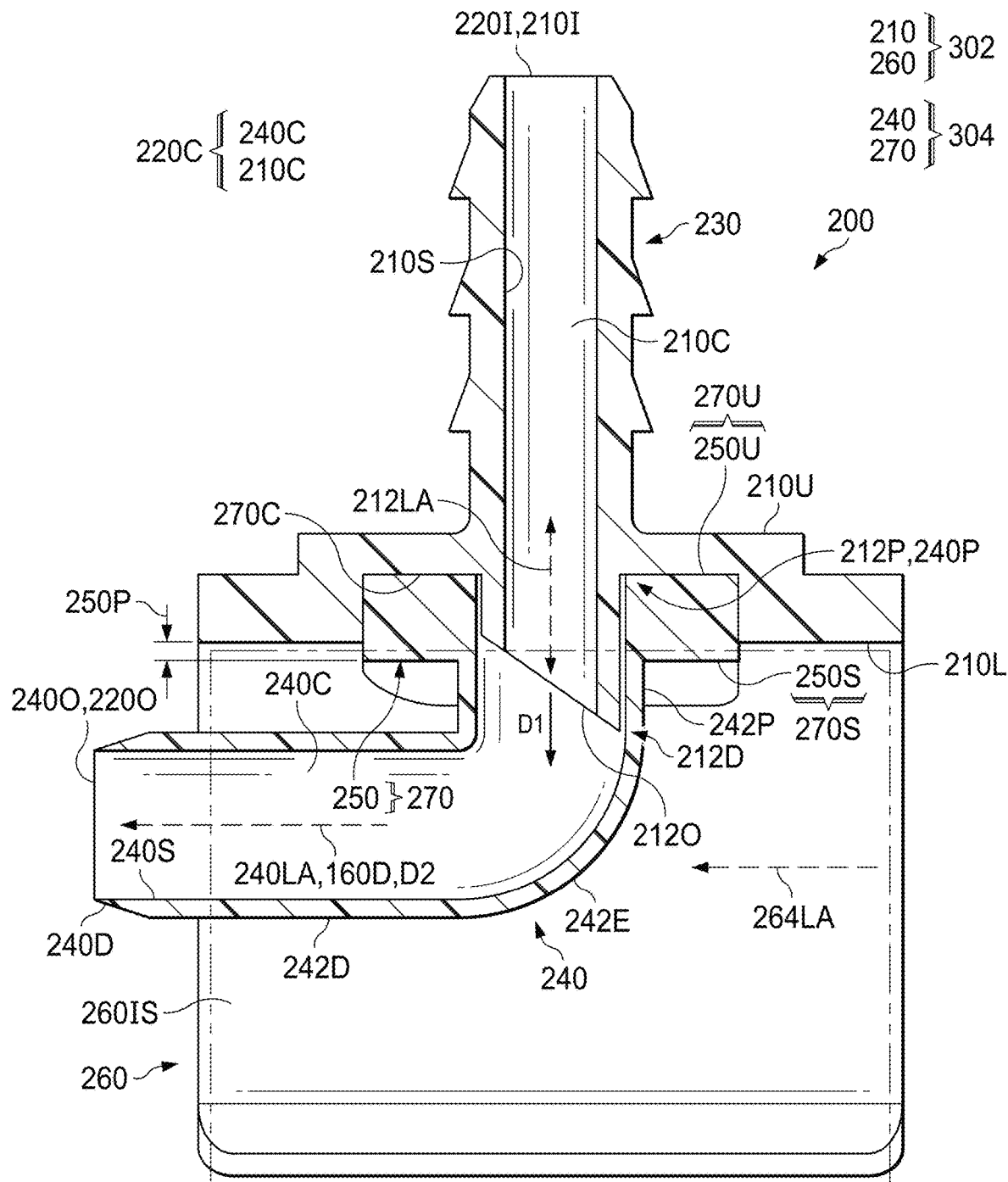
Figure 4A:
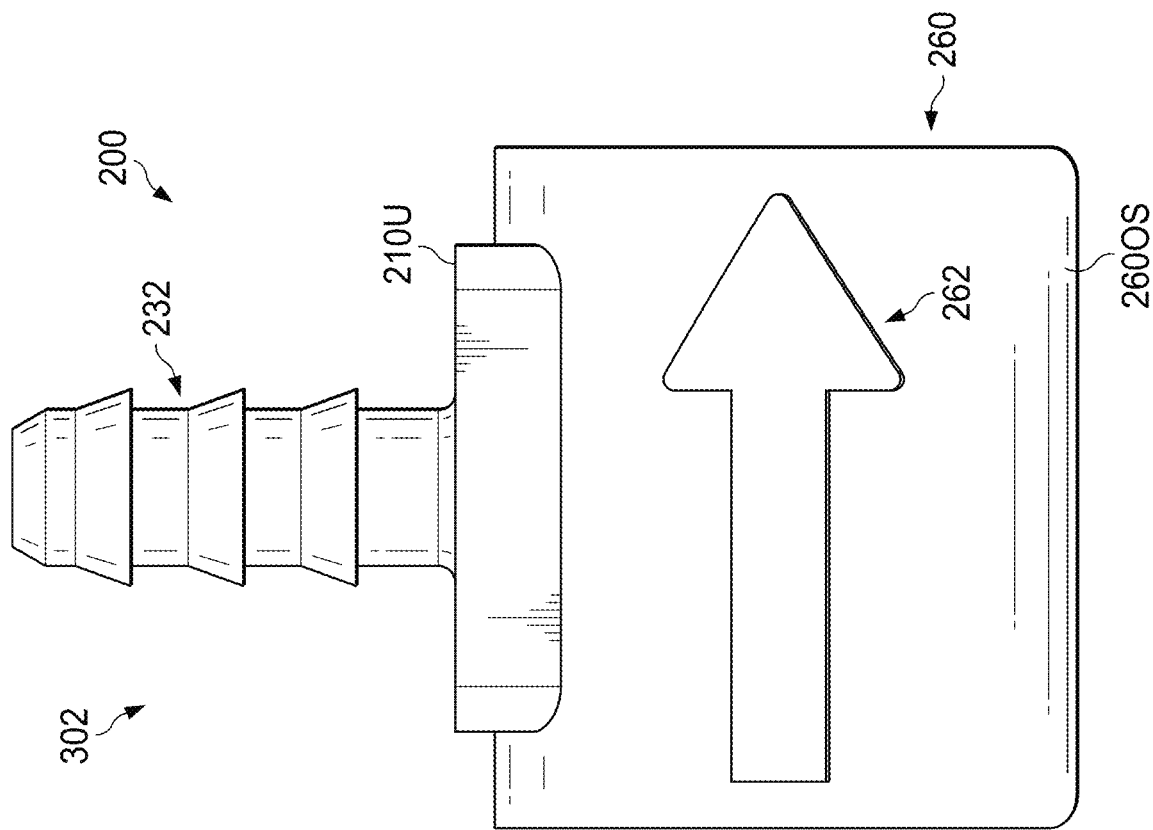
FIG. 4A is an elevation side view of the adaptor device of FIG. 3A with the elbow nozzle disconnected from the adaptor conduit structure, according to some example embodiments.
Figure 4A:
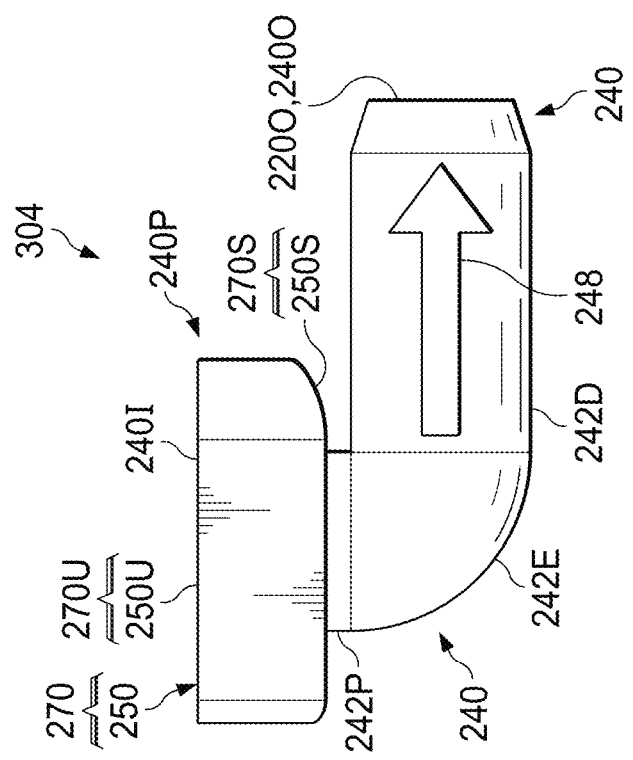
Figure 4B:
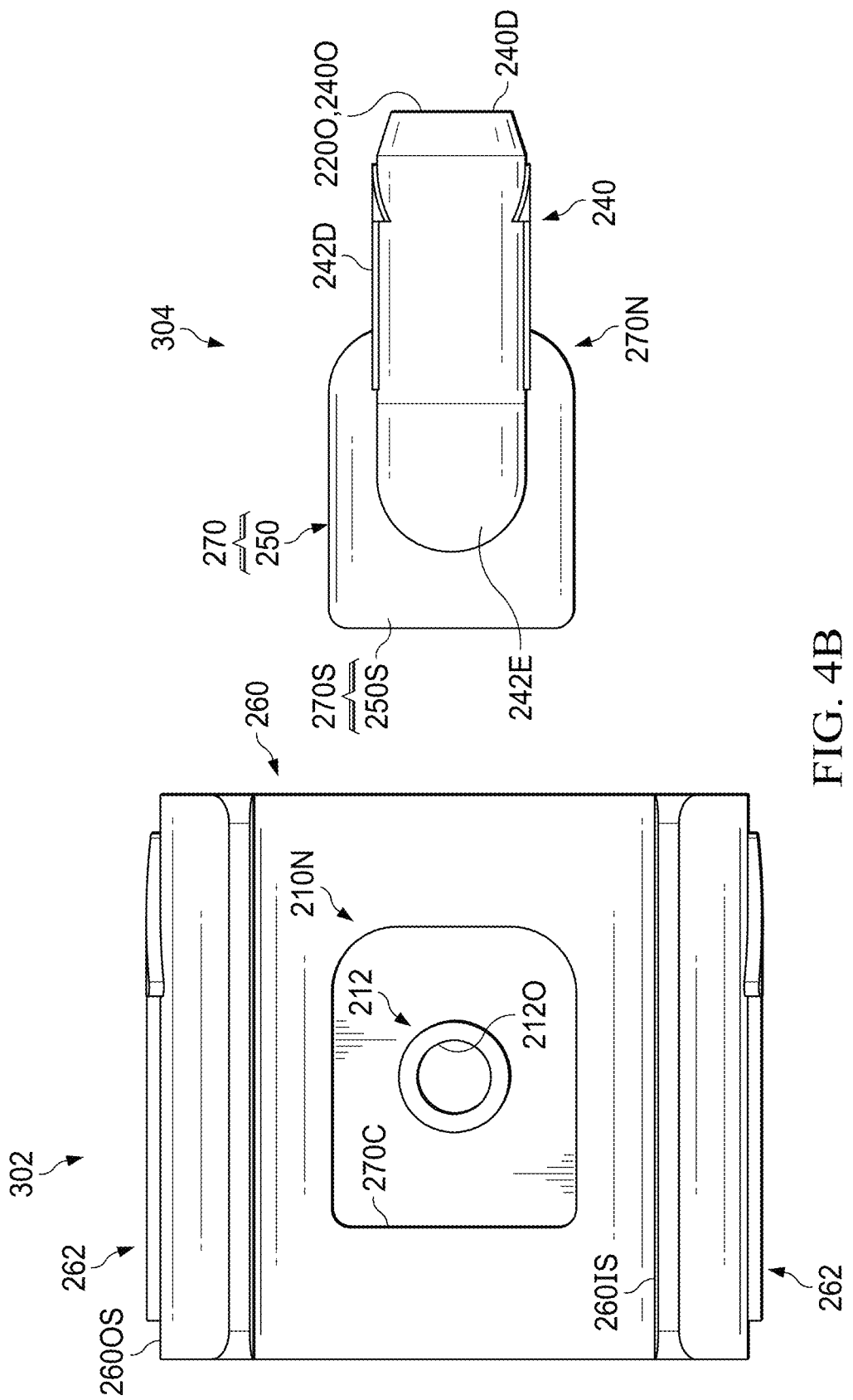
FIG. 4B is a plan bottom view of the adaptor device of FIG. 3A with the elbow nozzle disconnected from the adaptor conduit structure, according to some example embodiments.
Figure 5A:
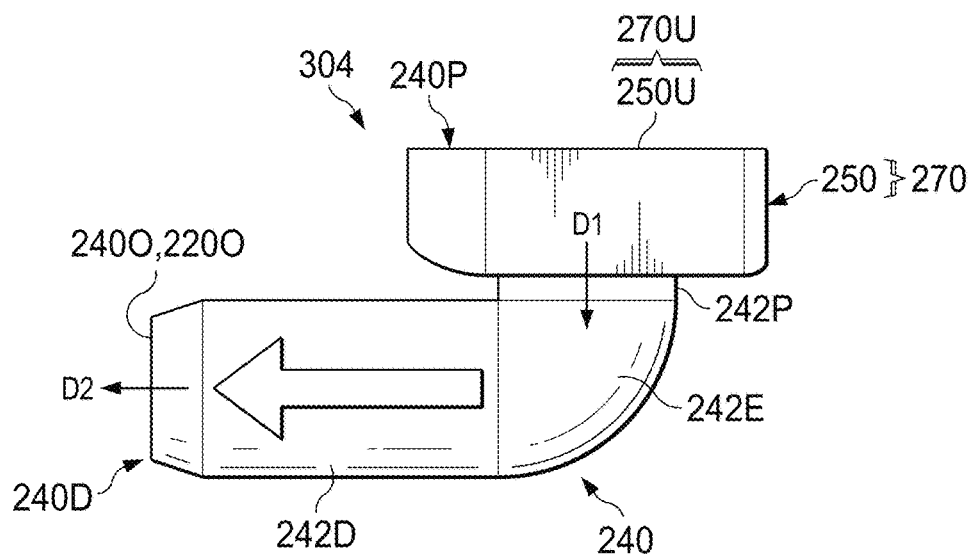
FIGS. 5A, 5B, and 5C are views of an elbow nozzle structure, according to some example embodiments.
Figure 5B:
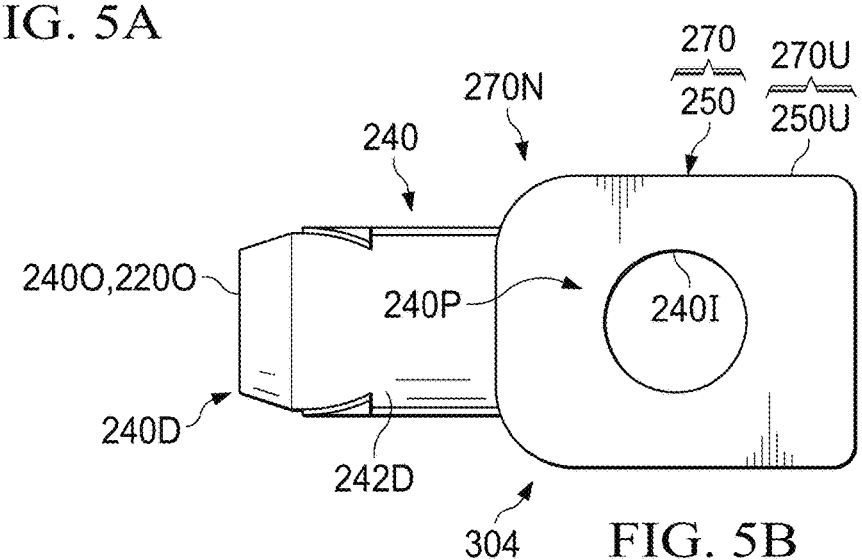
Figure 5C:
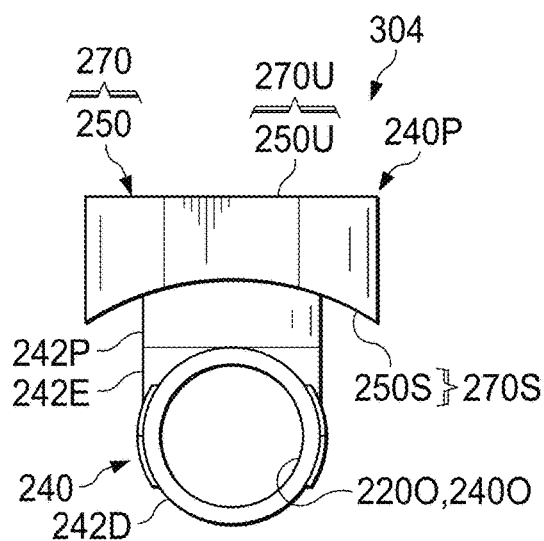

FIG. 2A is an expanded cross-sectional view of region A of FIG. 1, showing an adaptor device providing a fluid connection into a conduit section interior of a closed conduit section of a conduit through a sidewall thickness of a conduit section sidewall of the conduit section, according to some example embodiments. FIG. 2B is a cross-sectional view along view line IIB-IIB' in FIG. 2A, according to some example embodiments. FIGS. 3A, 3B, 3C, 3D, 3E, and 3F are views of an adaptor device, according to some example embodiments. FIGS. 3G and 3H are cross-sectional elevation views of the adaptor device of FIG. 3A along cross-sectional view lines IIIG-IIIG' and IIIH-IIIH', respectively, shown in FIG. 3A, according to some example embodiments. FIG. 4A is an elevation side view of the adaptor device of FIG. 3A with the elbow nozzle disconnected from the adaptor conduit structure, according to some example embodiments. FIG. 4B is a plan bottom view of the adaptor device of FIG. 3A with the elbow nozzle disconnected from the adaptor conduit structure, according to some example embodiments. FIGS. 5A, 5B, and 5C are views of an elbow nozzle structure, according to some example embodiments.

Referring to FIGS. 2A-2B, 3A-3H, and 4A-4B, in some example embodiments an adaptor device 200 is configured to establish a fluid connection between a fluid supply source 150 (e.g., via a fluid supply conduit 170 coupled between the adaptor device 200 and an outlet 152 of the fluid supply source 150 as shown in FIG. 1) and a conduit section interior 184I of a conduit section 184 of a conduit through an access point opening 140 in the conduit section 184, where the access point opening 140 includes a conduit extending through a sidewall thickness 186T of a conduit section sidewall 186 of the conduit section 184 (e.g., extending perpendicular to the longitudinal axis 184LA of the conduit section 184). It will be understood that a longitudinal axis of an element as described herein, including for example the longitudinal axis 184LA of the conduit section 184, may be referred to interchangeably as a central axis of the element, a central longitudinal axis of the element, or the like.

In some example embodiments, including the example embodiments shown in FIGS. 2A-2B, 3A-3H, and 4A-4B, the adaptor device 200 may include an adaptor conduit structure 210 at least partially defining a base conduit 210C extending from a base conduit inlet 210I to a base conduit outlet 210O. As shown, the base conduit inlet 210I may define an adaptor inlet 220I of the adaptor device 200. As shown, the base conduit 210C may be at least partially defined by one or more inner surfaces 210S of the adaptor conduit structure 210. As shown, the adaptor conduit structure 210 may include an upper end 210U, also referred to herein interchangeably as an upper surface and which may or may not be an uppermost surface of the adaptor conduit structure 210. As shown, the adaptor conduit structure 210 may include a lower end 210L, also referred to herein interchangeably as a lower surface and which may or may not be a lowermost surface of the adaptor conduit structure 210. As shown, the lower end 210L may be inwardly curved to be complementary to a curvature of n at least partially cylindrical outer sidewall surface 186OS of the conduit section sidewall 186 of the conduit section 184, in order to promote a flush fit or connection between the adaptor device 200 and the conduit section 184. In some example embodiments, the adaptor conduit structure 210 is a single piece of material. In some example embodiments, the adaptor conduit structure is formed from molded plastic. However, example embodiments are not limited thereto. As shown, the base conduit 210C may extend through the adaptor conduit structure 210 between at least the upper and lower ends 210U and 210L of the adaptor conduit structure 210.

The adaptor conduit structure 210 may include an inlet nozzle 232 extending to a distal end 232D from the upper end 210U of the adaptor conduit structure 210 (e.g., from a proximate end 232P that is at the upper end 210U to the distal end 232D). The inlet nozzle 232 may define the base conduit inlet 210I (which may be the adaptor inlet 220I) at the distal end 232D of the inlet nozzle 232 may further define at least a portion (also referred to herein as an inlet conduit portion) of the base conduit 210C extending to the base conduit inlet 210I (i.e., the adaptor inlet 220I), such that the base conduit 210C (and thus at least a portion of the adaptor conduit 220) at least partially extends through the inlet nozzle 232 to the adaptor inlet 220I. As shown, the inlet nozzle 232 may be integral to the adaptor conduit structure 210 so that the inlet nozzle 232 and the adaptor conduit structure 210 are separate portions of a single, unitary piece of material and/or such that the inlet nozzle 232 is configured to be a portion of the adaptor conduit structure 210. However, example embodiments are not limited thereto. In some example embodiments the inlet nozzle 232 may be omitted from the adaptor conduit structure 210. In some example embodiments the inlet nozzle 232 may be separate from the adaptor conduit structure 210. For example the inlet nozzle 232 may be defined by at least one separate piece of material that is coupled to the adaptor conduit structure 210.

The adaptor device 200 may include an inlet connector 230 configured to couple with the fluid supply source 150 externally to the conduit section to cause the adaptor inlet 220I to be in fluid communication with the fluid supply source 150. As shown, the inlet connector 230 may be at least partially defined by the inlet nozzle 232 extending from the upper end 210U of the adaptor conduit structure 210 to the distal end 232D, such that the inlet nozzle 232 may be considered to be a part of the inlet connector 230 (or alternatively the inlet connector 230 may be considered to be a part of the inlet nozzle 232), but example embodiments are not limited thereto.

The inlet nozzle 232 and/or the inlet connector 230 may be integral with the adaptor conduit structure 210 such that the adaptor conduit structure 210, together with the inlet nozzle 232 and/or the inlet connector may be separate portions of a single, unitary piece of material. However, example embodiments are not limited thereto, and in some example embodiments at least one of the inlet connector 230 or the inlet nozzle 232 at least partially defining the inlet connector 230 and/or the adaptor inlet 220I may be included in a separate piece of material from that of the adaptor conduit structure 210 and may be coupled to the adaptor conduit structure 210.

In some example embodiments, and as shown in at least FIGS. 2A and 2B, the inlet connector 230 may include a fitting configured to engage an inner surface 170IS of a fluid supply conduit 170 based on being inserted into the fluid supply conduit 170 (e.g., at one end of the fluid supply conduit 170). The fluid supply conduit 170 may include any length of flexible tubing that is configured to flex around a surface of the fitting to engage the fitting (e.g., via compression). As shown, the inlet connector 230 may include a male barbed connector fitting that is configured to engage an inner surface 170IS of a fluid supply conduit 170 (e.g., flexible tubing, PVC tubing, etc.), but example embodiments are not limited thereto. As shown in FIG. 1, an opposite end of the fluid supply conduit 170 may be connected to the outlet 152 of the fluid supply source 150 so as to establish fluid communication between the adaptor inlet 220I and the fluid supply source 150 and thus enable fluid 160 that is output (e.g., supplied, discharged, etc.) from the fluid supply source 150 via the outlet 152 to be directed to the adaptor inlet 220I and thus directed through the adaptor conduit 220C via the adaptor inlet 220I. It will be understood that the inlet connector 230 as shown in at least FIGS. 2A-2B and 3A-3H may be a fitting (e.g., a male barbed connector fitting as shown) configured to engage an inner surface 170IS of a fluid supply conduit 170 based on being inserted into the fluid supply conduit 170 (e.g., at one end of the fluid supply conduit 170).

While the inlet connector 230 is shown to be at least partially defined by the inlet nozzle 232 which further defines the base conduit inlet 210I (i.e., the adaptor inlet 220I) and at least a portion of the adaptor conduit 220C (e.g., at least a portion of base conduit 210C), example embodiments are not limited thereto. In some example embodiments, the inlet connector 230 may be completely separate from the adaptor inlet 220I and/or any structure such as an inlet nozzle 232 defining the adaptor inlet 220I. For example, in some example embodiments the inlet nozzle 232 may extend from the upper end 210U of the adaptor conduit structure 210 to define the adaptor inlet 220I (e.g., base conduit inlet 210I) at the distal end 232D thereof while the inlet connector 230 may be a separate structure and/or device coupled to a different portion of the adaptor conduit structure 210 and configured to engage a fluid supply source 150 and/or fluid supply conduit 170 to hold an end of the fluid supply source 150 and/or fluid supply conduit 170 in fluid communication with (e.g., on, covering, engaging, contacting, etc.) the adaptor inlet 220I.

In some example embodiments, the conduit 124 may include a condensate drain line of an air conditioning system and may be configured to direct a separate fluid 120 that includes a condensate from a drip pan 122 of an air handler process unit 102 of the air conditioning system to a condensate drain outlet (e.g., conduit outlet 130) through at least the conduit section interior 184I, the fluid 160 may include a cleaning composition, the fluid supply source 150 may include a cleaner dispensing system configured to dispense the cleaning composition, and the adaptor device 200 may be configured to, based on being coupled to both the conduit section 184 and the fluid supply source (e.g., cleaner dispensing system), receive cleaning composition at the adaptor inlet 220I from the cleaner dispensing system based on the cleaner dispensing system dispensing the cleaning composition through an outlet thereof, and direct the received cleaning composition through the adaptor conduit 220C and into the conduit section interior 184I to be supplied into at least a portion of the condensate drain line to cause at least some biological substances to be removed from at least a portion of the condensate drain line, for example based on directing the fluid through the adaptor outlet 220O into the conduit section interior 184I in a flow direction 160D that is at least partially paraxial (e.g., paraxial or substantially paraxial) to the longitudinal axis 184LA of the conduit section 184 and directed in an "upstream" direction through the upstream end 184U of the conduit section 184 towards the conduit inlet 128 so that the cleaning composition may reach the drip pan 122 to at least partially mitigate biological materials therein and subsequently flow from the drip pan 122 and through an entirety of the conduit 124 via the conduit inlet 128 and the conduit outlet 130 to at least partially mitigate biological materials through some or all of the length of the conduit 124. However, example embodiments are not limited thereto.

The adaptor device 200 may include a conduit connector 260. As shown, the conduit connector 260 may be a connector device that is configured to engage at least a portion of the conduit section 184 (e.g., the outer sidewall surface 186OS thereof) to couple the adaptor device 200 to the conduit section 184. In some example embodiments, the conduit connector 260 may be a connector device that is configured to engage at least a portion of the conduit section 184 (e.g., the outer sidewall surface 186OS thereof) to couple the adaptor device 200 (e.g., at least the adaptor conduit structure 210) to the conduit section 184 to at least partially align the base conduit outlet 212O with the access point opening 140 to establish fluid communication from the adaptor inlet 220I to the conduit section interior 184I through at least the base conduit 210C, for example to cause at least a portion of the base conduit 210C to be aligned with, exposed to, and/or at least partially extending through the access point opening 140, but example embodiments are not limited thereto. In some example embodiments, including the example embodiments shown in at least FIGS. 2A and 2B, the conduit connector 260 may be configured to engage at least a portion of the conduit section 184 (e.g., the outer sidewall surface 186OS thereof) to couple the adaptor device 200 to the conduit section 184 such that the lower end 210L of the adaptor conduit structure 210 is proximate to (e.g., adjacent, contacting, etc.) an outer sidewall surface 186OS of the conduit section sidewall 186 and the upper end 210U of the adaptor conduit structure 210 is distal from the outer sidewall surface 186OS of the conduit section sidewall 186.

The conduit connector 260 may be configured to couple the adaptor device 200 to the conduit section 184 such that the lower end 210L of the adaptor conduit structure 210 is held in place proximate to an outer sidewall surface 186OS of the conduit section 184 to at least partially align the base conduit outlet 212O with the access point opening 140. For example, the conduit connector 260 may be configured to engage the conduit section sidewall 186 to press at least a portion of the lower end 210L of the adaptor conduit structure 210 into contact (e.g., flush contact) with at least a portion of the outer sidewall surface 186OS so as to establish a flush or substantially flush complementary fit between the outer sidewall surface 186OS and the lower end 210L. As shown, the lower end 210L may have a curvature that is complementary to the curvature of the outer sidewall surface 186OS to further enable such a flush complementary fit. However, it will be understood that example embodiments are not limited thereto. In some example embodiments the lower end 210L may be spaced apart from the outer sidewall surface 186OS when the adaptor device 200 is coupled with the conduit section 184 by the conduit connector 260.

As shown, the conduit connector 260 may include a flexible clamp device 266 having one or more inner surfaces 260IS that are configured to flex around the conduit section sidewall 186 and engage (e.g., directly engage) and clamp the conduit section outer sidewall surface 186OS such that the clamp device 266 may exert a clamping force (e.g., compressive force) on the conduit section sidewall 186 to couple the adaptor device 200 to the conduit section 184 and which may, in some example embodiments, "grip" the conduit section sidewall 186 to hold the adaptor device 200 in place in relation to the conduit section 184. The conduit connector 260 (e.g., the clamp device 266) may be flexible to enable "snap-on" connection of the conduit connector 260 to the conduit section sidewall 186, and thus to enable "snap-on" connection of the adaptor device 200 to the conduit section 184. In some example embodiments, the conduit connector 260 (e.g., the flexible clamp device 266) is configured to detach from the conduit section 184 to enable disconnection of the adaptor device 200 from the conduit section 184.

As shown, the conduit connector 260 may include a clamp device 266, but example embodiments are not limited thereto, and the conduit connector 260 may be any device, material, or the like which may engage the conduit section 184 to hold the adaptor device 200 in place in relation to the conduit section 184 to at least partially align the adaptor outlet 220O with the access point opening 140 to establish fluid communication from the adaptor inlet 220I to the conduit interior through at least the adaptor conduit 220. For example, in some example embodiments the conduit connector 260 may include an adhesive material on the lower end 210L of the adaptor conduit structure 210 that is configured to adhere or bond with the outer sidewall surface 186OS of the conduit section 184 to couple the adaptor device 200 to the conduit section 184.

As further shown in at least FIGS. 3A-3H, the conduit connector 260 and the adaptor conduit structure 210 may be integrated with each other so as to be separate portions of a single, unitary piece of material. As shown, the inner surface 260IS of the conduit connector 260 may be continuous with at least a portion of the lower end 210L of the adaptor conduit structure 210. In some example embodiments, at least a portion of the inner surface 260IS and the lower end 210L may collectively define a single continuous curvature which may be configured to be at least partially complementary to the outer sidewall surface 186OS of the conduit section. For example, as shown in at least FIGS. 3E and 3F, the lower end 210L of the adaptor conduit structure 210 and the inner surface 260IS of the conduit connector 260 may be continuous with each other and may collectively define at least a portion of a cylindrical gap space 264 having a circumference that may approximate (e.g., be within a 5% margin, 10% margin, etc.) the cross-sectional circumference of the outer sidewall surface 186OS of the conduit section 184 and may have a diameter 264D that may approximate (e.g., be within a 5% margin, 10% margin, etc.) the outer diameter of the conduit section 184 at least partially defined by the outer sidewall surface 186OS and may further have a longitudinal axis 264LA configured to extend partially or entirely paraxial to the longitudinal axis 184LA of the conduit section 184 based on the conduit connector 260 coupling with the conduit section 184. As a result, based on the conduit connector 260 coupling with the conduit section 184 such that at least a portion of the conduit section 184 is received into the cylindrical gap space 264, the adaptor conduit structure 210, and thus the adaptor device 200, may be oriented in relation to the conduit section 184 such that the longitudinal axis 264LA of the cylindrical gap space 264 extends paraxial to the longitudinal axis 184LA of the conduit section 184.

The circumference and/or diameter 264D of the cylindrical gap space 264 may be smaller than that of the outer sidewall surface 186OS of the conduit section 184 to ensure that the conduit connector 260 flexes around and "grips" (e.g., exerts compressive force on) the outer sidewall surface 186OS, and a portion of the circumference of the cylindrical gap space 264 may be exposed by a gap between opposing sides of the conduit connector 260, at a bottom end that is distal from the adaptor conduit structure 210, to provide an opening via which the conduit section sidewall 286 may be inserted into the cylindrical gap space 264. Based on the conduit connector 260 engaging the conduit section 184 to couple the adaptor device 200 to the conduit section 184, the portions of the inner surface(s) 260IS of the conduit connector 260 and the lower end 210L of the adaptor conduit structure 210 that collectively define the portion of the circumference of the cylindrical gap space 264 may contact the outer sidewall surface 186OS of the conduit section 184 and may be held in continuous or substantially continuous contact therewith, and the cylindrical gap space 264 defined by the adaptor conduit structure 210 and the conduit connector 260 may receive at least a portion of the conduit section 184 such that the longitudinal axes 264LA and 184LA extend partially or entirely in parallel with each other. As a result, the conduit connector 260, together with the lower end 210L of the adaptor conduit structure 210, may establish a good "grip" of the adaptor device 200 with the conduit section 184 and may enable a good seal of the access point opening 140 to be established by the adaptor device 200 which further ensuring that the adaptor device 200 is coupled in a particular orientation in relation to the longitudinal axis 184LA of the conduit section 184. It will be understood that the term "paraxial" as used herein with regard to a given axis is interchangeable with "parallel" with regard to the given axis, for example such that an element (e.g., a structure, a direction, a particular axis, or the like) that is referred to herein as being at least partially paraxial to a given axis may be referred to interchangeably as being at least partially parallel to the given axis, at least partially in parallel with the given axis, or the like.

As further shown, the inlet nozzle 232 at least partially defining the inlet connector 230 may be integrated with the adaptor conduit structure 210, so that the adaptor conduit structure 210, at least the inlet nozzle 232, and the conduit connector 260 may be separate portions of a single, unitary piece of material. For example, as shown in FIGS. 4A and 4B, the adaptor conduit structure 210 (which may include the inlet nozzle 232), and the conduit connector 260 may collectively comprise a base structure 302 that may be a single, unitary piece of material.

Still referring to FIGS. 2A-2B, 3A-3H, and 4A-4B, the adaptor conduit structure 210 may include an outlet nozzle 212 extending to a distal end 212D from the lower end 210L of the adaptor conduit structure 210 (e.g., extending from a proximate end 212P to the distal end 212D). As shown, the outlet nozzle 212 may define the base conduit outlet 212O at the distal end 212D of the outlet nozzle 212 and may further define at least a portion of the base conduit 210C extending to the base conduit outlet 212O, such that the base conduit 210C at least partially extends through the outlet nozzle 212 to the base conduit outlet 212O. As shown, the outlet nozzle 212 may be integral with the adaptor conduit structure 210 such that the adaptor conduit structure 210 and the outlet nozzle 212 are separate portions of a single, unitary piece of material (e.g., a single piece of material comprising the base structure 302 as shown in FIGS. 4A and 4B), but example embodiments are not limited thereto.

As further shown, in some example embodiments the adaptor device 200 may include an adaptor conduit structure 210, an inlet nozzle 232, an outlet nozzle 212, a conduit connector 260, or any combination thereof that are separate portions of a single, unitary piece of material, but example embodiments are not limited thereto. For example, as shown in FIGS. 4A and 4B, the adaptor conduit structure 210 (which may include the inlet nozzle 232 and the outlet nozzle 212) and the conduit connector 260 may collectively comprise a base structure 302 that may be a single, unitary piece of material.

As shown, the outlet nozzle 212 may extend downward at least partially from the lower end 210L of the adaptor conduit structure 210. In some example embodiments, the outlet nozzle 212 may be configured to at least partially extend (e.g., protrude) through an access point opening 140 from the outer sidewall surface 186OS of the conduit section 184 based on the conduit connector 260 coupling the adaptor device 200 to the conduit section 184. For example, as shown in at least FIGS. 2A and 2B in view of FIGS. 3G and 3H, the outlet nozzle 212 may extend into a cylindrical gap space 264 at least partially at least partially defined by the lower end 210L and the inner surface(s) 260IS of the conduit connector 260 and which the conduit connector 260 is configured to cause to be occupied by the conduit section 184 based on the adaptor device 200 being coupled to the conduit section 184.

Still referring to FIGS. 2A-2B, 3A-3H, 4A-4B, and 5A-5C, the adaptor device 200 may include an elbow nozzle 240 that is configured to extend to a distal end 240D from the lower end 210L of the adaptor conduit structure 210 (e.g., extend to the distal end 240D from a proximate end 240P). The elbow nozzle 240 may define an elbow conduit outlet 240O at the distal end 240D, where the elbow conduit outlet 240O may define (e.g., may be) the adaptor outlet 220O of an adaptor conduit 220C of the adaptor device 200. The elbow nozzle 240 may further define an elbow conduit 240C extending to the adaptor outlet 220O. The elbow nozzle 240 may be configured to expose the elbow conduit 240C to the base conduit 210C to collectively define an adaptor conduit 220C extending between the adaptor inlet 220I and the adaptor outlet 220O.

As shown, the elbow nozzle 240 may include a structure that defines an elbow conduit inlet 240I at the proximate end 240P and includes one or more inner surfaces 240S defining the elbow conduit 240C to extend in a first direction D1 (e.g., in a proximate conduit section 244P as described herein) and then turn and/or bend to extend in a second direction D2 that is different from the first direction D1 (e.g., in a distal conduit section 244D as described herein). The elbow nozzle 240 may be configured to be coupled with (and/or integrated with) the adaptor conduit structure 210 so that the elbow nozzle 240 is configured to expose the elbow conduit inlet 240I to the base conduit outlet 212O of the adaptor conduit structure 210 and to further define the elbow conduit 240C to extend in the first direction D1 (e.g., in a proximate conduit section 244P as described herein) away from the lower end 210L of the adaptor conduit structure 210 (e.g., into the cylindrical gap space 264 at least partially defined by the adaptor conduit structure 210) and then turn and/or bend to extend in the second direction D2 that is different from the first direction D1 (e.g., which may be at least partially paraxial to the longitudinal axis 264LA of the cylindrical gap space 264 at least partially defined by the adaptor conduit structure 210). As shown, the elbow nozzle 240 may be configured to be coupled with the adaptor conduit structure 210 to cause at least the distal nozzle portion of the elbow nozzle 240 to extend to the distal end 240D in a second direction D2 that is paraxial to the central longitudinal axis 264LA of the cylindrical gap space 264 defined by at least the inner surfaces 260IS of the conduit connector 260 and the lower end 210L of the adaptor conduit structure 210, such that the adaptor device 200 is configured to cause the at least the distal nozzle portion of the elbow nozzle 240 to be oriented to extend to the distal end 240D in a second direction D2 that is paraxial to the longitudinal axis 184LA of the conduit section 184 based on the conduit connector 260 coupling with the conduit section 184 such that the conduit section 184 is at least partially received into the cylindrical gap space 264.

As shown in at least FIGS. 2A-2B and 3A-3H, 4A-4B, and 5A-5C, the elbow nozzle 240 may include a proximate nozzle section 242P, an elbow joint 242E, and a distal nozzle section 242D. The proximate nozzle section 242P may define an elbow conduit inlet 240I. The proximate nozzle section 242P may include one or more inner surfaces that define a proximate conduit section 244P extending from the elbow conduit inlet 240I in the first direction D1. As shown, the proximate nozzle section 242P may at least partially define a base structure 270 which may extend perpendicular to the first direction D1 (e.g., extend at least partially radially away from the central axis of the elbow conduit inlet 240I). The base structure 270 may be configured to engage a portion of an outer sidewall surface 186OS of a conduit section 184 to at least partially hold the elbow nozzle 240 in place in relation to the outer sidewall surface 186OS. As shown, the base structure 270 and the remainder of the elbow nozzle 240 may be integral with each other so as to be separate portions of a single, unitary piece of material (e.g., silicone), but example embodiments are not limited thereto.

The distal nozzle section 242D may extend to and define a distal end 240D of the elbow nozzle 240. The distal nozzle section 242D may further define an elbow conduit outlet 240O at the distal end 240D of the elbow nozzle 240. The distal nozzle section 242D may include one or more inner surfaces that define a distal conduit section 244D extending to the elbow conduit outlet 240O outlet in the second direction D2. As shown, the elbow conduit outlet 240O may be the adaptor outlet 220O of the adaptor conduit 220C of the adaptor device 200.

The elbow joint 242E may connect the proximate nozzle section 242P and the distal nozzle section 242D together. The elbow joint 242E may include one or more inner surfaces defining an elbow joint conduit section 244E extending between the proximate conduit section 244P and the distal conduit section 244D such that the proximate conduit section 244P, the elbow joint conduit section 244E, and the distal conduit section 244D collectively define the elbow conduit 240C. As a result, the inner surfaces of the proximate nozzle section 242P, the elbow joint 242E, and the distal nozzle section 242D may collectively define the one or more inner surfaces 240S of the elbow nozzle 240 that define the elbow conduit 240C extending from the elbow conduit inlet 240I to the elbow conduit outlet 240O. In some example embodiments, at least the proximate nozzle section 242P may be omitted such that the elbow joint 242E defines the elbow conduit inlet 240I at one end of the elbow joint conduit section 244E that is opposite to the end coupled to the distal conduit section 244D.

In some example embodiments, the proximate nozzle section 242P, the elbow joint 242E, and the distal nozzle section 242D may be separate portions of a single, unitary piece of material (e.g., silicone), for example such that the elbow nozzle 240 is comprised of a single, unitary piece of material (e.g., silicone), but example embodiments are not limited thereto. In some example embodiments, the elbow nozzle 240 comprises multiple pieces of material coupled together, which may include same or different materials.

As shown, the elbow joint 242E may be configured to structure the elbow conduit 240C to turn, bend, or change direction from the proximate conduit section 244P (extending in the first direction D1) to the distal conduit section 244D (extending in the second direction D2). The elbow joint 242E may be configured to cause the elbow conduit 240C to change direction from the first direction D1 (which may be parallel to the longitudinal axis of the proximate conduit section 244P) to the second direction D2 (which may be parallel to the longitudinal axis of the distal conduit section 244D and which may also be parallel to the central axis 240LA of the elbow conduit outlet 240O). The central axis 240LA of the elbow conduit outlet 240O may be a central longitudinal axis of the elbow conduit outlet 240O. The central axis 240LA of the elbow conduit outlet 240O may be the same as the longitudinal axis of at least the distal conduit section 244D of the elbow conduit 240C as at least partially defined by one or more inner surfaces of the distal nozzle section 242D. The elbow joint inner surface(s) may be configured to define the elbow joint conduit section 244E to exhibit a bend having a radius of curvature between a proximate end of the proximate conduit section 244P connected to one end of the elbow joint conduit section 244E and a proximate end of the distal conduit section 244D connected to the opposite end of the elbow joint conduit section 244E. In some example embodiments, the elbow joint conduit section 244E may have a constant or substantially constant cross-sectional area and/or diameter, and the radius of curvature of the bend in the elbow conduit 240C that is defined by the elbow joint conduit section 244E may, for example be twice the cross-sectional diameter of the elbow joint conduit section 244E, although example embodiments are not limited thereto. In some example embodiments, the radius of curvature of the bend in the elbow conduit 240C that is defined by the elbow joint conduit section 244E may, for example be equal or substantially equal to the radius (e.g., one-half the cross-sectional diameter) of the elbow joint conduit section 244E, but example embodiments are not limited thereto. In some example embodiments, the elbow conduit 240C may have a constant or substantially constant diameter from the elbow conduit inlet 240I to the elbow conduit outlet 240O, but example embodiments are not limited thereto.

As shown, the proximate nozzle section 242P is configured to define the proximate conduit section 244P extending in a first direction D1, the distal nozzle section 242D is configured to define the distal conduit section 244D extending in a second direction D2, and the elbow joint 242E is configured to define an elbow joint conduit section 244E that connects the proximate and distal conduit sections 244P and 244D to each other to define the elbow conduit 240C as extending from the elbow conduit inlet 240I in the first direction D1 and then turning (e.g., bending) to extend to the elbow conduit outlet 240O in the second direction D2 which is different from the first direction D1. In some example embodiments, the second direction D2 is perpendicular to the first direction D1, but example embodiments are not limited thereto. As shown, the elbow nozzle 240 may include one or more direction indicators 248 on an outer surface of the elbow nozzle 240 (e.g., on an outer surface of the distal nozzle section 242D as shown) to indicate a direction that the elbow nozzle 240 is configured to direct a fluid 160.

As shown, the elbow nozzle 240 may include a base structure 270 defining a lower surface 270S and configured to engage, at the lower surface 270S, an outer sidewall surface 186OS of a conduit section 184. As shown, the lower surface 270S may be shaped to be complementary or substantially complementary to the curvature of the outer sidewall surface 186OS, for example such that the lower surface 270S is curved in a direction perpendicular to the first and second directions D1 and D2 in a curvature that is complementary or substantially complementary to the curvature of the outer sidewall surface and the lower surface 270S is further straight or substantially straight in the second direction D2.

As shown, the elbow nozzle 240 is configured to couple with the adaptor conduit structure 210 to expose the elbow conduit inlet 240I of the elbow nozzle 240 to the base conduit outlet 212O of the adaptor conduit structure 210, thereby exposing the elbow conduit 240C to the base conduit 210C such that the base conduit 210C and the elbow conduit 240C collectively define an adaptor conduit 220C extending between the base conduit inlet 210I of the adaptor conduit structure 210 and the elbow conduit outlet 240O of the elbow nozzle 240, such that the base conduit inlet 210I may be considered to be an adaptor inlet 220I of the adaptor conduit 220C and the elbow conduit outlet 240O may be considered to be an adaptor outlet 220O of the adaptor conduit 220C. As shown, such an adaptor conduit 220C may be defined by the adaptor device 200 (e.g., one or more inner surfaces 210S of the adaptor conduit structure 210 and one or more inner surfaces 240S of the elbow nozzle 240) to extend in the first direction D1 from the adaptor inlet 220I, through the adaptor conduit structure 210, to the elbow joint conduit section 244E to turn (bend) to further extend in the second direction D2 to the adaptor outlet 220O. Accordingly, it will be understood that the first direction D1 may be a direction in which the longitudinal axis of at least the proximate conduit section 244P extends and the second direction D2 may the direction in which the longitudinal axis of at least a portion of the distal conduit section 244D that is adjacent to the adaptor outlet 220O extends, for example such that the central axis 240LA of the elbow conduit outlet 240O, and thus the central axis of the adaptor outlet 220O, extend in the second direction D2.

As shown, the adaptor conduit structure 210 may include one or more surfaces defining a cavity 270C that is complementary to at least a portion of the elbow nozzle 240, including for example the base structure 270, so that the elbow nozzle 240 may be coupled with the adaptor conduit structure 210 to insert at least a portion of the base structure 270 into the cavity 270C to further cause the lower surface 270S of the base structure 270 to face away from the adaptor conduits structure 210 (e.g., into the cylindrical gap space 264). As further shown, the base structure 270 may define an alignment structure 270N that is complementary to a particular shape, structure, or portion defined in the cavity 270C as a complementary alignment structure 210N, for example such that the base structure 270 and the cavity 270C may each have a similar, and radially asymmetrical (in a radial direction perpendicular to the first direction D1), to cause the elbow nozzle 240 to be aligned in a particular alignment in relation to the adaptor conduit structure 210 based on being coupled with the adaptor conduit structure 210. As shown, the alignment structure 270N is configured to align with the complementary shaped alignment structure 210N, or portion, of the cavity 270C to enable the elbow nozzle 240 to couple with the adaptor conduit structure 210 in a particular alignment so that the distal nozzle section 242D and/or the distal conduit section 244D, and thus the second direction D2 extend in a particular direction in relation to the adaptor conduit structure 210. Such a direction, as indicated by the direction indicators 248 of the elbow nozzle 240, may be the same direction as the direction indicated by the direction indicator symbols 262 on the outer surface (e.g., outer surface 260OS) of the adaptor conduit structure 210, which may be parallel to the direction in which the longitudinal axis 264LA of the cylindrical gap space 264 that is at least partially defined by the adaptor conduit structure 210 is configured to extend and which is configured to receive at least a portion of the conduit section 184 such that the longitudinal axis 264LA extends paraxial to the longitudinal axis 184LA of the conduit section 184 based on the adaptor device 200 being coupled with the conduit section 184. Thus, the elbow nozzle 240 and the adaptor conduit structure 210 may be configured to be coupled together so that the distal conduit section 244D of the elbow nozzle 240, and the elbow conduit outlet 240O (e.g., adaptor outlet 220O), is facing in a particular direction in relation to the adaptor conduit structure 210 and furthermore is configured to face in a particular direction in relation to the conduit section 184, for example such that the second direction D2, the direction of the central axis 240LA, and thus the flow direction 160D, extend partially or entirely paraxial to the longitudinal axis 184LA of the conduit section 184 based on the conduit connector 260 coupling with the conduit section 184.

Referring to FIGS. 4A and 4B, the elbow nozzle 240 and the adaptor conduit structures 210 may comprise two separate pieces of material, or structures 302 and 304, which may each be a single, unitary piece of material and where structures 302 and 304 may comprise different materials. For example, the adaptor conduit structure 210, together with the conduit connector 260 and further including the inlet nozzle 232 and the outlet nozzle 212, may comprise a base structure 302 that is a single, unitary piece of material comprised of a plastic material (e.g., any known plastic material), and the elbow nozzle 240 may comprise an elbow nozzle structure 304 that is a single, unitary piece of material comprised of a separate material that may be more flexible than the material comprising the base structure 302 (e.g., silicone). However, example embodiments are not limited thereto; in some example embodiments, the structures 302 and 304 may each comprise a same material.

Referring to FIGS. 2A and 2B, the elbow nozzle 240 may be configured to be at least partially inserted through an access point opening 140 through a sidewall thickness 186T of a conduit section such that the elbow nozzle 240 extends at least partially through the access point opening 140 in the first direction D1 into the conduit section interior 184I and further extends to the distal end 240D within the conduit section interior 184I in the second direction D2 that is different from the first direction D1 and is at least partially paraxial to a longitudinal axis 184LA of the conduit section 184 as defined by the conduit section sidewall 186, such that a central axis of the adaptor outlet 220O, which may be a central axis 240LA of the elbow conduit outlet 240O, extends in the second direction D2 (e.g., at least partially paraxial to the longitudinal axis 184LA) within the conduit section interior 184I.

For example, as shown, the elbow nozzle 240 may be configured to engage the lower surface 270S of the base structure 270 with the outer sidewall surface 186OS of the conduit section sidewall 186 to cause at least the distal nozzle section 242D and the elbow joint 242E and, in some example embodiments, at least a portion of the proximate nozzle section 242P to extend through the access point opening 140 and bend at least partially in the conduit section interior 184I from extending in the first direction D1 to extending in the second direction D2 to the elbow conduit outlet 240O that also defines the adaptor outlet 220O. The lower surface 270S may be curved to be complementary with the cylindrical outer sidewall surface 186OS of the conduit section 184 to that base structure 270 may engage the outer sidewall surface 186OS to axially align at least the elbow conduit outlet 240O and/or at least a portion of the elbow nozzle 240 (particularly at least the distal nozzle section 242D) with the conduit section 184 so that the second direction D2 in which the elbow conduit outlet 240O is facing within the conduit section interior 184I (and which may also be the direction in which the distal conduit section 244D extends) is at least partially (e.g., partially or entirely) paraxial to the longitudinal axis 184LA of the conduit section 184, which may also include the first direction in which the proximate nozzle section 242P may extend may be perpendicular to the longitudinal axis of the conduit section 184 to which the elbow nozzle 240 is coupled.

It will be understood that descriptions herein relating to the longitudinal axis and/or the direction of extension of the proximate nozzle section 242P may apply equally to the longitudinal axis and/or the direction of extension of the proximate conduit section 244P. It will be understood that descriptions herein relating to the longitudinal axis and/or the direction of extension of the distal nozzle section 242D may apply equally to the longitudinal axis and/or the direction of extension of the distal conduit section 244D. It will be understood that descriptions herein relating to the longitudinal axis and/or the direction of extension of the elbow joint 242E may apply equally to the longitudinal axis and/or the direction of extension of the elbow joint conduit section 244E. It will be understood that descriptions herein relating to the longitudinal axis and/or the direction of extension of the proximate conduit section 244P may apply equally to the longitudinal axis and/or the direction of extension of the proximate nozzle section 242P. It will be understood that descriptions herein relating to the longitudinal axis and/or the direction of extension of the distal conduit section 244D may apply equally to the longitudinal axis and/or the direction of extension of the distal nozzle section 242D. It will be understood that descriptions herein relating to the longitudinal axis and/or the direction of extension of the elbow joint conduit section 244E may apply equally to the longitudinal axis and/or the direction of extension of the elbow joint 242E.

As further shown, the adaptor conduit structure 210 may be coupled to the elbow nozzle 240 (e.g., based on the base structure 270 being inserted into the cavity 270C of the adaptor conduit structure 210) and may be further coupled to the conduit section 184 to define the adaptor device 200 coupled to the conduit section 184, such that the adaptor device 200 defines the adaptor conduit 220C as extending from the adaptor inlet 220I external to the conduit section 184 to extend through the adaptor conduit structure 210 and the elbow nozzle 240, and thus through the access point opening 140, into the conduit section interior 184I to the adaptor outlet 220O defined by the elbow conduit outlet 240O facing in the second direction D2 at least partially paraxial to the longitudinal axis 184LA of the conduit section 184. The elbow conduit outlet 240O, facing in the second direction D2 in the conduit section interior 184I as shown, may define the flow direction 160D of fluid 160 directed through the adaptor conduit 220C and further through the adaptor outlet 220O to be the same or at least partially the same as the second direction D2, which may be the same as the longitudinal axis (e.g., central axis 240LA) of the elbow conduit outlet 240O and/or the central axis of the adaptor outlet 220O, which may be the same as or different from the longitudinal axis of the distal nozzle section 242D and/or the distal conduit section 244D. As shown, the second direction D2 in relation to the conduit section interior 184I (e.g., the alignment of the central axis 240LA and thus the flow direction 160D defined thereby in relation to the longitudinal axis 184LA of the conduit section 184) may be at least partially defined by the base structure 270, particularly the lower surface 270S which may be oriented in relation to at least the elbow joint 242E and the distal nozzle section 242D to cause the distal nozzle section 242D, and thus the elbow conduit outlet 240O, to face in a particular direction in relation to the longitudinal axis 184LA of the conduit section 184 based on the lower surface 270S of the base structure 270 engaging the outer sidewall surface 186OS of the conduit section 184. In some example embodiments, the longitudinal axis of the conduit section 184 (e.g., as defined by the conduit section sidewall 186) may be the same as the longitudinal axis of the conduit section interior 184I that is at least partially defined by the inner sidewall surface 186IS of the conduit section sidewall 186, but example embodiments are not limited thereto.

Descriptions herein with regard to the longitudinal axis 184LA of the conduit section 184 may apply equally to the longitudinal axis of the conduit section interior 184I. Descriptions herein with regard to the longitudinal axis of the conduit section interior 184I may apply equally to the longitudinal axis 184LA of the conduit section 184.

In some example embodiments, based on the elbow nozzle 240 of the adaptor device 200 being configured to at least partially extend through the access point opening 140 in the first direction D1 into the conduit section interior 184I and further extend to the distal end 240D within the conduit section interior 184I in a second direction D2 that is different from the first direction D1 and at least partially paraxial to a longitudinal axis 184LA of the conduit section 184 such that a central axis 240LA of the elbow conduit outlet 240O (and thus a central axis of the adaptor outlet 220O) extends in the second direction D2 within the conduit section interior 184I, the elbow nozzle 240 may configure the adaptor device 200 to direct a fluid 160 received at the adaptor inlet 220I to flow through the adaptor conduit 220C and out of the adaptor conduit 220 through the adaptor outlet 220O defined by the elbow conduit outlet 240O as a fluid stream 160S in a flow direction 160D that is the same or substantially the same as the second direction D2 (e.g., the central axis 240LA) and thus is directed in a particular flow direction 160D in relation to the conduit section longitudinal axis 184LA within the conduit section interior 184I. Thus, the adaptor device 200 may be configured to direct the fluid stream 160S to flow at least partially paraxial to the conduit section longitudinal axis 184LA and thus to flow in an "upstream" direction through at least a portion of the conduit section 184 through at least an upstream end 184U of the conduit section 184, which may enable the fluid stream 160S to be directed to reach at least an upstream conduit portion 124U of the conduit 124 and/or at least apportion of a process unit 102 via the conduit inlet 128 of the conduit 124 (e.g., the drip pan 122).

In some example embodiments, the elbow nozzle 240 is configured to couple with the adaptor conduit structure 210 to cause the outlet nozzle 212 to extend through the elbow conduit inlet 240I into at least a proximate conduit section 244P of the elbow conduit 240C. Accordingly, the outer diameter of the outlet nozzle 212 may be equal to or smaller than the inner diameter of at least the proximate conduit section 244P of the elbow conduit 240C, to enable the outlet nozzle 212 to be at least partially inserted into the elbow conduit 240C as shown. The base conduit outlet 212O may be perpendicular to a longitudinal axis 212LA (e.g., central longitudinal axis) of the outlet nozzle 212 and/or the first direction D1 which may be paraxial to the longitudinal axis of at least the proximate conduit section 244P of the elbow conduit 240C, but example embodiments are not limited thereto. In some example embodiments, including the example embodiments shown in FIGS. 2A-2B, 3A-3H, and 4A-4B, the base conduit outlet 212O is at least partially angled in relation to the longitudinal axis 212LA. As shown, the angling of the base conduit outlet 212O may cause the central axis of the base conduit outlet 212O to be angled at least partially toward the second direction D2 in which at least the distal nozzle section 242D may extend. As described herein, such angling of the base conduit outlet 212O may configure the outlet nozzle 212 to assist in directing the change in flow direction of fluid 160 within the elbow conduit 240C from the first direction D1 to the second direction D2, thereby potentially reducing flow turbulence in the elbow joint conduit section 244E and the distal conduit section 244D and thus to improve the flow of the fluid stream 160S along a greater length of the conduit 124 and further improving the effects provided by the fluid 160 (e.g., breakdown of biological substances accumulating in the conduit 124 interior when the fluid 160 includes a cleaning composition) over a greater proportion of the length of the conduit 124. As shown in at least FIGS. 3A-3G, the adaptor device 200 may include direction indicator symbols 262 on an outer surface of the adaptor device 200 (e.g., the outer surface 260OS of the conduit connector 260 as shown) to point in the flow direction 160D in which the adaptor outlet 220O (e.g., elbow conduit outlet 240O) is facing (e.g., to point in the second direction D2 and/or the direction of the central axis 240LA of the adaptor outlet 220O (e.g., elbow conduit outlet 240O), to enable the adaptor device 200 to be coupled to the conduit section 184 to cause the adaptor outlet 220O and thus the corresponding flow direction 160D of the fluid stream 160S to be directed in a desired direction, for example towards the upstream end 184U of the conduit section 184 as shown in FIG. 2A.

As further shown in FIGS. 2A and 2B, the elbow nozzle 240 may be configured to extend through the access point opening 140 into the conduit section interior 184I, based for example on the base structure 270 engaging with the outer sidewall surface 186OS, so that the elbow nozzle 240 remains in the particular upper portion 202U of the conduit section interior 184I, for example an upper region that is above the longitudinal axis 184LA (e.g., opposite the direction of gravity) and further between the longitudinal axis 184LA and the inner sidewall surface 186IS. As a result, the elbow nozzle 240 (e.g., the portion thereof that is located within the conduit section interior 184I) may be located entirely within the upper portion 202U, or upper half, of the conduit section interior 184I, such that the elbow nozzle 240 may be spaced apart from (e.g., entirely spaced apart, absent from, etc.) a lower portion 202L, or lower half, of the conduit section interior 184I through which a fluid 120 that is flowing through the conduit 124 from the conduit inlet 128 to the conduit outlet 130 thereof in the flow direction 120D may flow. The longitudinal axis 184LA of the conduit section 184 and/or conduit section interior 184I may extend perpendicular to the direction of gravity. The upper portion 202U or upper half of the conduit section interior 184I may be defined as an upper portion of the conduit section interior 184I that is above the longitudinal axis 184LA of the conduit section interior 184I in relation to the direction of gravity (which may be directed perpendicular to the longitudinal axis 184LA and away from the access point opening 140 such that fluid within the conduit section interior 184I falls out of the upper portion 202U under the influence of gravity). The lower portion 202L or lower-half of the conduit section interior 184I may be defined as a lower portion of the conduit section interior 184I that is below the longitudinal axis 184LA of the conduit section interior 184I in relation to a direction of gravity (which may be directed perpendicular to the longitudinal axis 184LA and away from the access point opening 140 such that fluid within the conduit section interior 184I falls into the lower portion 202L under the influence of gravity). Based on the elbow nozzle 240 being configured to restrict the portions thereof (the portions of the elbow nozzle 240) that are within the conduit section interior 184I to be restricted (e.g., entirely restricted) to an upper portion 202U (also referred to herein interchangeably as an upper half) of the conduit section interior 184I when coupled to the conduit section 184 (where the longitudinal axis 184LA thereof extends perpendicular to the direction of gravity), such that said portions of the elbow nozzle 240) that are within the conduit section interior 184I are absent (e.g., entirely absent) from the lower portion 202L (also referred to herein interchangeably as a lower half) of the conduit section interior 184I), the elbow nozzle 240 may be configured to enable the separate fluid 120 (e.g., condensate) flowing through the conduit 124 from the conduit inlet 128 to the conduit outlet 130 to flow underneath the elbow nozzle 240 without interaction (e.g., splashing) the elbow nozzle 240. As a result, the elbow nozzle 240 may be configured to mitigate (e.g., minimize, prevent, etc.) clogging due to splashing of the fluid 120 which may be condensate generated by an air handler process unit 102 coupled the conduit inlet 128) onto the elbow nozzle 1240 and potentially into the elbow conduit 240C based on the elbow nozzle 240 being located in the upper portion 202U that may have a reduced likelihood of being occupied by the fluid 120 in relation to the lower portion 202L of the conduit section interior 184I. As a further result, the elbow nozzle 240 may be configured to mitigate (e.g., minimize, prevent, etc.) obstruction of the flow of the fluid 120 (e.g., condensate) through the conduit 124 based on the elbow nozzle 240 being located in the upper portion 202U that may have a reduced likelihood of being occupied by the fluid 120 in relation to the lower portion 202L of the conduit section interior 184I.

Based on being configured to cause the fluid 160 to be directed into the conduit section interior 184I as a fluid stream 160S directed in a particular flow direction 160D (e.g., the second direction D2, which may the same as the direction in which the central axis 240LA extends) which may extend at least partially paraxial to the longitudinal axis 184LA of the conduit section 184 and further extend in the "upstream" direction towards the upstream end 184U of the conduit section 184 and the conduit inlet 128 based on the adaptor device 200 being coupled to the conduit section 184, the adaptor device 200 may be configured to cause the fluid stream 160S to be directed "upstream" in the conduit 124 to reach at least the upstream conduit portion 124U of the conduit and/or at least a portion of the process unit 102 coupled to the conduit inlet 128 (e.g., a drip pan 122 of an air handler process unit 102). The adaptor device 200 may thus be configured to provide the effects of the fluid 160 (e.g., mitigate of biological materials contacted by the fluid, in example embodiments where the fluid 160 includes a cleaning composition) at portions of the system 100 that are "upstream" from the access point opening 140 in the conduit 124 to further enable the fluid 160 to then flow back through the conduit 124 in the separate fluid flow direction 120D (separately or together with the fluid 120) to further provide the effects of the fluid 160 (e.g., mitigate of biological materials contacted by the fluid, in example embodiments where the fluid 160 includes a cleaning composition) in a downstream conduit portion 124D of the conduit 124, thereby enabling the entire length of the conduit 124 to be affected (e.g., at least partially cleaned of biological materials) by the fluid 160 even though the fluid 160 is introduced into the conduit 124 at a conduit section 184 that is between the conduit inlet 128 and the conduit outlet 130. The adaptor device 200 may thus be configured to provide a supply of the fluid 160 into upstream locations (e.g., provide cleaning of the upstream conduit portion 124U and/or the process unit 102 via enabling supply of a cleaning composition fluid 160 thereto) via the access point opening 140 into the conduit 124 without requiring a separate access point opening into the conduit inlet 128 and/or a portion of the process unit 102 upstream of the conduit inlet 128. As a result, installation and/or maintenance costs, and/or complexity of a system to supply the fluid 160 into the system 100, may be reduced, thereby reducing costs and/or operational complexity associated with providing the fluid 160 from the fluid supply source 150 into the system 100, process unit 102, conduit 124, etc., while still providing the effects of the fluid 160 (e.g., mitigating biological materials) throughout the entire length of the conduit 124 and, in some example embodiments, at least a portion of a process unit 102 upstream of the conduit 124. The adaptor device 200 may therefore be configured to improve operation of the system 100, for example based on enabling the effects of the fluid 160 (e.g., biological material mitigation, cleaning, etc.) throughout the entire length of the conduit 124 and at least a portion of an air handler process unit 102 via a single access point opening 140 into the conduit 124 that may be at least partially downstream of portions of the system 100 to which the adaptor device 200 may be configured to direct the fluid stream 160S.

As shown, the elbow nozzle 240 (e.g., at least the proximate nozzle section 242P, the elbow joint 242E, and the distal nozzle section 242D) may have an outer diameter 240W that is equal to or smaller than the diameter 140W of the access point opening 140, such that the elbow nozzle 240 may be configured to extend at least partially or entirely through the access point opening 140 towards the conduit section interior 184I, although example embodiments are not limited thereto. As a result, based on the elbow nozzle 240 partially or entirely extending through the access point opening 140 based on the adaptor device 200 being coupled to the conduit section 184, an annular "remainder" conduit 140AN may be defined between an outer sidewall 240OS of the elbow nozzle 240 and the inner sidewall of the access point opening 140 as defined by one or more inner surfaces of the conduit section sidewall 186.

In some example embodiments, the adaptor device 200 includes a sealing member 250 at the lower end 210L of the adaptor conduit structure 210. As shown, the sealing member 250 may be defined in the elbow nozzle structure 304 by the base structure 270, such that the sealing member 250 is coupled to the elbow nozzle 240 and the lower surface 270S of the base structure 270 defines the lower surface 250S of the sealing member 250, but example embodiments are not limited thereto, and in some example embodiments the sealing member 250 may be a separate piece of material from the elbow nozzle 240. In some example embodiments, the sealing member 250 is coupled to the elbow nozzle 240 and may be a separate material or part of a same piece of material as the elbow nozzle 240. As shown, the adaptor conduit structure 210 may at least partially define a recess, or cavity 270C in which the sealing member 250 (e.g., as defined by the base structure 270) may be at least partially located. As shown, the lower surface 250S of the sealing member 250 may be exposed from the adaptor conduit structure 210 and may, in the absence of a countering force, protrude away from the adaptor conduit structure 210 and the lower end 210L thereof by a protrusion distance 250P. The sealing member 250 may comprise a material that may be flexible, deformable, and/or elastic. The sealing member 250 may comprise a material that may have greater flexibility, deformability, and/or elasticity (e.g., a greater elastic modulus) than the material comprising at least the adaptor conduit structure 210 (which may be, for example, molded plastic). For example the sealing member 250 (and in some example embodiments, the sealing member 250 together with the elbow nozzle 240 in the elbow nozzle structure 304) may be formed of (e.g., may entirely comprise) silicone (e.g., polysilicone). However, example embodiments are not limited thereto, and in some example embodiments the sealing member 250 and at least one of the adaptor conduit structure 210, the conduit connector 260, the elbow nozzle 240, the inlet nozzle 232, the outlet nozzle 212, any combination thereof, or the like may be separate portions of a single, unitary piece of material.

In some example embodiments, the sealing member 250 may be configured to seal at least an outer edge 140E of the access point opening 140 based on the conduit connector 260 coupling the adaptor device 200 to the conduit section 184. For example, based on the sealing member 250 extending (e.g., protruding) from the lower end 210L of the adaptor conduit structure 210 by a protrusion distance 250P and/or based on the sealing member 250 comprising a flexible, deformable, and/or elastic material (e.g., silicone), the adaptor device 200 may be configured to be coupled to the conduit section 184 to bring the lower end 210L into direct contact with the outer sidewall surface 186OS to thereby cause the protruding portion of the sealing member 250 that protrudes from the lower end 210L by the protrusion distance 250P to be compressed to establish a seal that axially covers and/or surrounds the outer edge 140E of the access point opening 140. In some example embodiments, the adaptor device 200 may be configured to be coupled to the conduit section 184 to bring the lower end 210L into direct contact with the outer sidewall surface 186OS to thereby cause the protruding portion of the sealing member 250 that protrudes from the lower end 210L by the protrusion distance 250P to move at least partially into the access point opening 140 from the outer end thereof to thereby improve the sealing of the outer edge 140E of the access point opening 140.

As further shown, the lower surface 250S of the sealing member 250, even in an uncompressed state as shown in FIGS. 3E-3H, may have a curvature that is configured to be complementary to the curvature of the outer sidewall surface 186OS of the conduit section 184, such that the sealing member 250 may be configured to be more uniformly compressed between the adaptor conduit structure 210 and the outer sidewall surface 186OS based on the adaptor device 200 being coupled to the conduit section 184, thereby improving the uniformity and thus the reliability of the sealing of at least the outer edge 140E of the access point opening 140 by the sealing member 250. As further shown, the lower end 210L, the inner surface 260IS, and the lower surface 250S may be configured to, based on the adaptor device 200 being coupled to the conduit section 184, define separate portions of a same curvature of a same cylindrical gap space 264 having a particular circular circumference and having a particular longitudinal axis 264LA. As shown, the upper surface 250U of the sealing member 250 (e.g., as defined by an upper surface 270U of the base structure 270) opposite the lower surface 250S (e.g., as defined by a lower surface 270S of the base structure 270) may be planar (e.g., parallel to the upper end 210U of the adaptor conduit structure 210 as shown in at least FIG. 3G), and similarly the cavity 270C of the adaptor conduit structure 210 configured to receive at least a portion of the sealing member 250 may have a complementary planar surface to engage in a flush or substantially flush fit with the upper surface 250U of the sealing member 250 and/or base structure 270.

In some example embodiments, including example embodiments where the elbow nozzle 240 is configured to extend away from the lower end 210L of the adaptor conduit structure 210 (for example based on the elbow nozzle structure 304 being coupled to the base structure 302), the sealing member 250 may at least partially surround a proximate end 240P of the elbow nozzle 240 in a plan view (e.g., as shown in at least FIG. 3D), which may also be referred to as the sealing member 250 surrounding the circumference of a portion of the elbow nozzle 240 that is axially proximate to the proximate end 240P of the elbow nozzle 240. In some example embodiments, and as shown in at least FIG. 2, the sealing member 250 may be configured to seal at least an outer edge 140E of the access point opening 140 based on the conduit connector 260 coupling the adaptor device 200 to the conduit section 184 such that the elbow nozzle 240 at least partially extends through the access point opening 140 from the outer sidewall surface 186OS of the conduit section 184. For example, based on the sealing member 250 extending (e.g., protruding) from the lower end 210L of the adaptor conduit structure 210 by a protrusion distance 250P and/or based on the sealing member 250 comprising a flexible, deformable, and/or elastic material (e.g., silicone), the adaptor device 200 may be configured to be coupled to the conduit section 184 to bring the lower end 210L into direct contact with the outer sidewall surface 186OS to thereby cause the protruding portion of the sealing member 250 that protrudes from the lower end 210L by the protrusion distance 250P to be compressed to establish a seal that axially covers and/or surrounds the outer edge 140E of the access point opening 140. The sealing member 250 may further cover and seal an outer end of an annular conduit 140AN defined between the outer sidewall 240OS of the elbow nozzle 240 and the inner sidewall of the access point opening 140. In some example embodiments, the adaptor device 200 may be configured to be coupled to the conduit section 184 to bring the lower end 210L into direct contact with the outer sidewall surface 186OS to thereby cause the protruding portion of the sealing member 250 that protrudes from the lower end 210L by the protrusion distance 250P to move at least partially into the annular conduit 140AN from the outer end thereof to thereby improve the sealing of the outer edge 140E of the access point opening 140.

Based on the sealing member 250 sealing the outer edge 140E based on the adaptor device 200 being coupled to the conduit section 184, the likelihood of leakage of either the fluid 160 directed into the conduit section interior 184I by the adaptor device 200 or the separate fluid 120 directed through the conduit 124 may be reduced, minimized, or prevented.

Figure 6:
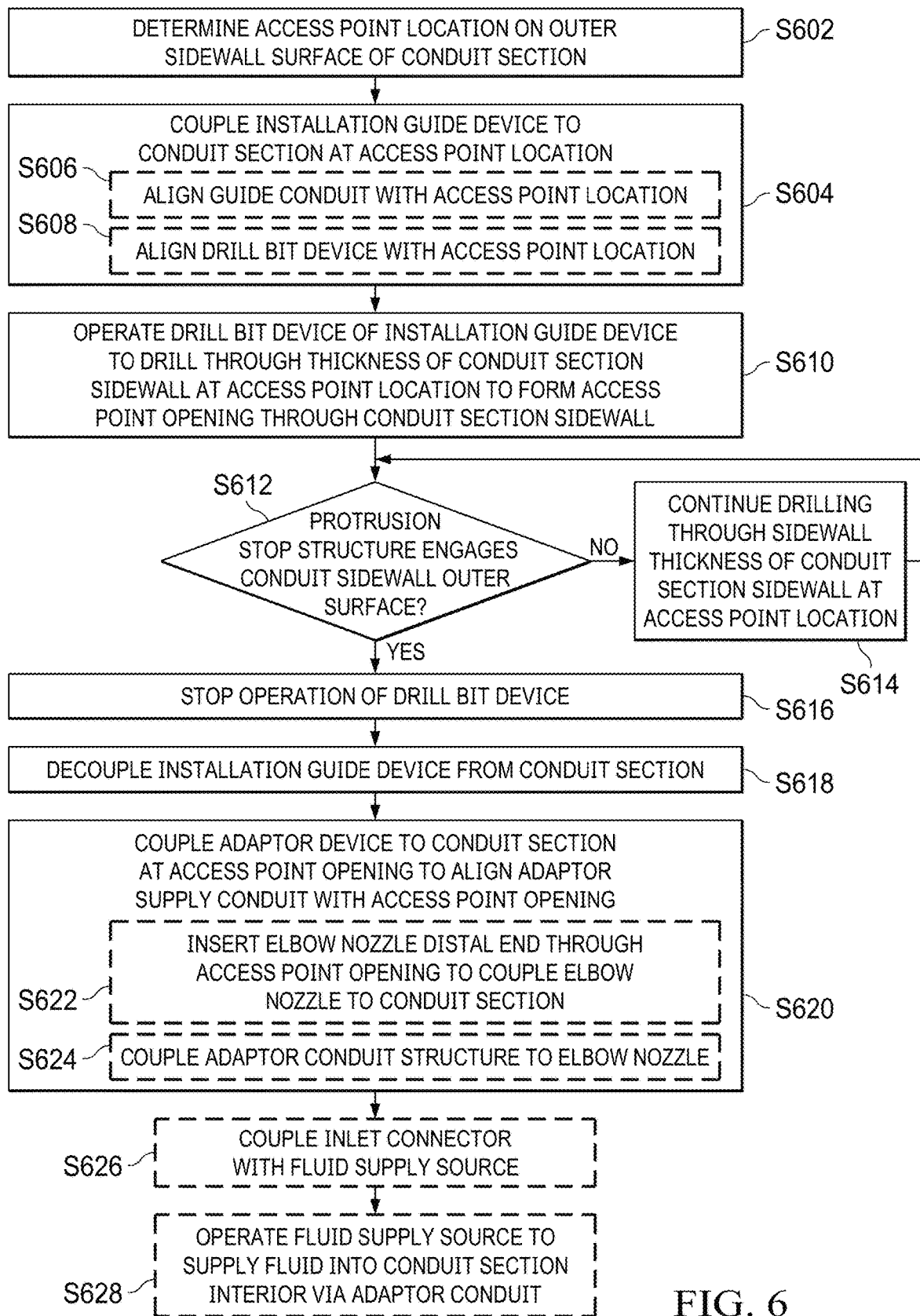
FIG. 6 is a flowchart illustrating a method to provide a fluid connection into a conduit section interior of a conduit section of a conduit through a sidewall thickness of a conduit section sidewall of the conduit section, according to some example embodiments.

FIG. 6 is a flowchart illustrating a method to provide a fluid connection into a conduit section interior of a conduit section of a conduit through a sidewall thickness of a conduit section sidewall of the conduit section, according to some example embodiments. FIGS. 7A, 7B, 7C, 7D, 7E, 7F, and 7G are perspective views of separate operations of the method shown in FIG. 6, according to some example embodiments. FIGS. 8A, 8B, and 8C are perspective views of region B of FIG. 7G with regard to separate operations of the method shown in FIG. 6, according to some example embodiments. FIGS. 9A, 9B, 9C, 9D, and 9E are cross-sectional elevation views, along the cross-sectional view line IX-IX' shown in FIGS. 7C-7G, of separate operations of the method shown in FIG. 6, according to some example embodiments. FIGS. 10A, 10B, 10C, 10D, and 10E are cross-sectional views along view line X-X' shown in FIGS. 7G and 8A-8C with regard to separate operations of the method shown in FIG. 6, according to some example embodiments. FIG. 11A is an elevation cross-sectional view of a conduit section and adaptor device being coupled thereto along view lines XIA-XIA' in FIG. 10D, according to some example embodiments. FIG. 11B is an elevation cross-sectional view of a conduit section and adaptor device being coupled thereto along view lines XIB-XIB' in FIG. 10E, according to some example embodiments. It will be understood that the methods and/or operations thereof as shown in FIGS. 6, 7A-7G, 8A-8C, 9A-9E, 10A-10E, and 11A-11B may be performed with regard to any of the example embodiments of the adaptor device 200 and any example embodiments of a system 100, a conduit 124, or any combination thereof. It will be understood that the operations of the method shown in FIG. 6 may be arranged in any order and/or may be rearranged in order relative to the order shown in FIG. 6. One or more of the operations shown in FIG. 6 may be omitted from the method shown in FIG. 6. One or more operations may be added to the method shown in FIG. 6.

Referring to FIGS. 6 and 7A, at S602 a "closed" conduit section 184 of a conduit 124 that may not include any openings through the sidewall thickness 186T thereof is inspected to determine an access point location 600 on an outer sidewall surface 186OS of the conduit section 184 that is suitable for forming (establishing) an access point opening 140 through the sidewall thickness 186T of the conduit section 184 at that location 600. As shown in FIG. 7A, in some example embodiments, the conduit 124 is a condensate drain line of an air conditioning system and is configured to direct condensate from a drip pan of a process unit 102 that includes an air handler of the air conditioning system to a conduit outlet 130 of the conduit 124 that is a condensate drain outlet through at least the conduit section interior 184I. However, it will be understood that example embodiments are not limited thereto. The conduit section 184 may be a horizontal length of pipe, for example PVC pipe such that the conduit section sidewall 186 is formed of PVC, but example embodiments are not limited thereto. As shown, the conduit section 184 may be a segment of the conduit 124 that is defined by multiple segments of components (e.g., connection fitting 604 and elbow joint 606) being connected to the conduit section 184, but example embodiments are not limited thereto.

As shown in FIG. 7A, the access point location 600 may be selected to be a location on the outer sidewall surface 186OS that is at least a minimum spacing distance 602 along the length of the conduit section 184, in both an upstream (602U) and a downstream (602D) direction, from adjacent structure and/or other conduit sections. For example, where the conduit section 184 is selected to be a horizontal section of a conduit 124 that is a condensate drain line connected to a process unit 102 that includes an air handler, and where the conduit section 184 is connected between a connection fitting 604 of the conduit 124 to the air handler and an elbow joint 606 (each of which may be considered to be separate conduit sections of the conduit 124), the access point location 600 may be determined to be a location on the upper side of the outer sidewall surface 186OS of the conduit section 184 that is at least a minimum spacing distance of 2" from both the connection 604 (602U) and the elbow joint (602D). Such spacing may reduce or minimize damage to the conduit 124 at the interface between the conduit section 184 and other conduit sections and/or structures (e.g., fittings). In some example embodiments, the spacing distances 602U and 602D are equal or substantially equal, so that the access point location 600 is at a midpoint of along the length (in the direction of the longitudinal axis 184LA) of the conduit section 184.

In some example embodiments where the conduit section 184 extends horizontally (e.g., perpendicular to the direction of gravity), the access point location 600 may be selected as a location at a "top" end of the conduit section opposite from the direction of gravity, so that the access point opening 140 may face "upwards", to mitigate the risk of leakage of fluid from the conduit section through the access point opening 140 via gravity.

As shown in FIG. 6, 7B-7D, and 9A-9B, at S604 an installation guide device 400 is coupled to the conduit section 184.

As shown in FIGS. 7B-7D and 9A-9B, the installation guide device 400 may include a drill bit device 410 configured to drill through the sidewall thickness 186T of the conduit section 184. As shown, the drill bit device 410 may include a drill bit 411 extending along a longitudinal axis 411LA (which may be a central longitudinal axis of the drill bit 411). The longitudinal axis 411LA of the drill bit 411 may be coaxial with the longitudinal axis 410LA of the drill bit device 410 (which may be a central longitudinal axis of the drill bit device 410). The drill bit device 410 may include a sheath structure 414 that is fixed (e.g., bonded, adhered, bolted, or attached via any known attachment mechanisms) to the drill bit 411. An exposed portion of the drill bit 411 may protrude from the sheath structure 414 along the longitudinal axis 411LA, 410LA by a particular protrusion distance 452. In some example embodiments, the sheath structure 414 and the drill bit 411 are separate pieces of material (e.g., the sheath structure 414 may be a plastic cylindrical structure attached to the drill bit 411, which may include any known material including any material described herein), but example embodiments are not limited thereto, and in some example embodiments the drill bit 411 and the sheath structure 414 may be separate portions of a single, unitary piece of material.

In some example embodiments, and as shown, the drill bit 411 may include a body 412 extending to a point 412P and having a land with flutes 412F in the body 412 of the drill bit 411 as shown. A portion of the body 412 of the drill bit 411 including the flutes 412F and the point 412P may comprise the exposed portion 412E of the drill bit body 412, and a remainder of the body 412 may be surrounded in directions perpendicular to the longitudinal axis 410LA, 411LA by the sheath structure 414. As shown in at least FIG. 9C, the drill bit body 412 is configured to drill a hole, conduit or the like having a particular diameter, referred to herein as the drill bit size 412D, which may be the same as the outer or maximum diameter of the exposed portion 412E of the drill bit body 412. The drill bit 411 may further include a shank 416 and tang 418 (although at least one thereof may be omitted) extending from an opposite end of the drill bit 411 from the point 412P of the drill bit 411 and configured to engage and thus mechanically couple with a drilling machine (e.g., a handheld drill device) referred to herein as a driver device and which may be any known drilling machine and/or driver to enable the drill bit 411, and thus the drill bit device 410, to be rotated around the longitudinal axis 410LA, 411LA based on operation of the driver device mechanically coupled with the shank 416 and tang 418 of the drill bit device 410. The driver device may further impart a force on the drill bit device 410 to cause the drill bit device 410 to move longitudinally, along the longitudinal axis 410LA, 411LA of the drill bit device 410 and/or of the drill bit 411.

The installation guide device 400 may include a guide device 420 having one or more inner surfaces 420S defining a guide conduit 422 having at least a lower guide opening 422O having a particular diameter 422OD. The guide conduit 422 may have a longitudinal axis 422LA, which may be a central longitudinal axis of the guide conduit 422. As shown, the guide conduit 422 may extend between opposite upper and lower guide openings 422I and 422O, but example embodiments are not limited thereto and in some example embodiments the upper guide opening 422I may be omitted. As shown, the installation guide device 400 may be configured to enable longitudinal movement of the drill bit device 410 (e.g., along the longitudinal axis 410LA of the drill bit device 410, which may be paraxial (e.g., coaxial) with the longitudinal axis 422LA of the guide conduit 422) in relation to the guide conduit 422, for example such that the drill bit device 410 moves longitudinal at least partially through the guide conduit 422 and at least partially through the lower guide opening 422O. Accordingly, the guide device 420 may be configured to restrict and guide the translation movements of the drill bit device 410 (and thus the drill bit 411) in relation to the guide device 420 to longitudinal movements of the drill bit device 410 in relation to the guide conduit 422 to cause the drill bit device 410 to adjustably protrude from through the lower guide opening 422O of the guide device 420 along the longitudinal axis 410LA, 411LA, and/or 422LA.

As shown, the sheath structure 414 of the drill bit device 410 may provide clearance and protection to the drill bit 411 within the guide conduit 422 and may be configured to at least partially align the longitudinal axis 411LA of the drill bit 411 with the longitudinal axis 422LA of the guide conduit 422 to thereby "center" the drill bit 411 in the guide conduit 422. However, as shown, the diameter of the sheath structure 414 may be smaller than that of the guide conduit 422, to provide clearance margins for ease of operation and to enable longitudinal movement of at least a portion of the drill bit device through one or more openings that are smaller in diameter than the diameter of the guide conduit 422 (which may be the same as or different from the diameter 422OD of the lower guide opening 422O).

Still referring to FIGS. 7B-7D and 9A-9B, the installation guide device 400 may include, as part of the guide device 420, a guide connector 440 that is configured to couple at least the guide device 420 of the installation guide device to the conduit section 184. As shown, the guide connector 440 may include a flexible clamp device having one or more inner surfaces 440IS that are configured to flex around the conduit section sidewall 186 and engage (e.g., directly engage) and clamp the conduit section outer sidewall surface 186OS such that the flexible clamp may exert a clamping force (e.g., compressive force) on the conduit section sidewall 186 of the conduit section 184 to couple at least the guide device 420 to the conduit section 184 and which may, in some example embodiments, "grip" the conduit section sidewall 186 to hold at least the guide device 420 in place in relation to the conduit section 184. The guide connector 440 (e.g., the clamp device) may be flexible to enable "snap-on" connection of the guide connector 440 to the conduit section sidewall 186, and thus to enable "snap-on" connection of the installation guide device 400 to the conduit section 184. In some example embodiments, the guide connector 440 (e.g., a flexible clamp device) is configured to detach from the conduit section 184 to enable disconnection of the installation guide device 400 from the conduit section 184. As shown, the guide connector 440 and the guide device 420 may be integral with each other so as to be separate portions of a single, unitary piece of material (e.g., any plastic material), but example embodiments are not limited thereto and in some example embodiments the guide device 420 and the guide connector may include separate pieces of material that are coupled together. As shown, the guide connector 440 may include a clamp device, but example embodiments are not limited thereto, and the guide connector 440 may be any device, material, or the like which may engage the conduit section 184 to hold at least the guide device 420 in place in relation to the conduit section 184 to at least partially align the lower guide opening 422O with at least a particular location on the outer sidewall surface 186OS of the conduit section 184. For example, in some example embodiments the guide connector 440 may be an adhesive material on the lower end of the guide device 420 that is configured to adhere or bond with the outer sidewall surface 186OS of the conduit section 184 to couple the guide device 420 to the conduit section 184. In some example embodiments the guide connector 440 may be omitted.

Still referring to FIGS. 7B-7D and 9A-9B, the installation guide device 400 may include a protrusion stop structure 430 that is configured to limit longitudinal protrusion of the drill bit device 410 along one or more of the longitudinal axis 410LA, 411LA, 422LA, and particularly longitudinal protrusion of at least the exposed portion 412E of the drill bit body 412, at least partially out of the guide conduit 422 via the lower guide opening 422O to a particular protrusion distance 452. The protrusion stop structure 430 may be a structure that is configured to engage (e.g., contact) another surface based on longitudinal movement of the drill bit device 410 along the longitudinal axis 410LA, 411LA, and/or 422LA at least partially though the lower guide opening 422O, where the protrusion stop structure 430 is configured to engage (e.g., contact) the other surface to stop (e.g., inhibit the longitudinal movement of the drill bit device 410 out of the lower guide opening 422O beyond the particular protrusion distance 452. Thus the protrusion stop structure 430 may be configured to prevent the drill bit device 410 from over-drilling beyond a certain distance from the lower guide opening 422O.

In some example embodiments, including the example embodiments shown in FIGS. 7B-7D and 9A-9B, the protrusion stop structure 430 is fixed in relation to the drill bit device 410 such that the protrusion stop structure 430 is configured to move with the drill bit device 410 in relation to the guide conduit 422 and inhibit protrusion of the drill bit device 410 beyond the particular protrusion distance 452 from the lower guide opening 422O while the installation guide device 400 is coupled to the conduit section 184, based on a lower surface 430LS of the protrusion stop structure 430 contacting an outer sidewall surface 186OS of the conduit section 184. For example, as shown, the protrusion stop structure 430 may include a cylindrical collar device that is fixed to and/or part of the sheath structure 414 that surrounds at least a portion of the drill bit 411. Such a protrusion stop structure 430 and the sheath structure 414 may be separate portions of a single, unitary piece of material. As shown, the protrusion stop structure 430 may be a cylindrical collar device that is proximate to the point 412P of the drill bit body 412 and positioned to define the longitudinal (e.g., axial) length of the exposed portion 412E of the drill bit body 412 that includes the point 412P and flutes 412F to be the particular protrusion distance 452. As described herein, the sheath structure 414 (and the cylindrical collar device of the protrusion stop structure 430 as shown) may be fixed to the drill bit 411 to be configured to move with the drill bit 411.

As further shown, the cylindrical collar device of the protrusion stop structure 430 may have an outer diameter 430D that is greater than the drill bit size 412D that may be the maximum outer diameter of the exposed portion 412E of the drill bit body 412. As a result, based on the drill bit device 410 moving through the guide conduit 422 and further moving through the lower guide opening 422O to cause the exposed portion 412E of the drill bit 411 to drill a hole (e.g., an access point opening 140) through a material (e.g., through the conduit section sidewall 186 of a conduit section coupled to the guide device 420), the hole may have a diameter (e.g., access point opening diameter 140W) equal to the drill bit size 412D and smaller than the diameter 430D of the protrusion stop structure 430, such that upon the exposed portion 412E of the drill bit 411 extending at least the particular protrusion distance 452 from the outer surface (e.g., the outer sidewall surface 186OS) of the material into which the hole is being drilled (e.g., the conduit section sidewall 186), the lower surface 430LS of the protrusion stop structure 430 may engage (e.g., directly contact) portions of the outer surface (e.g., the outer sidewall surface 186OS) that are adjacent to the hole (e.g., the access point opening 140) being drilled. The protrusion stop structure 430 may thus inhibit (halt) further longitudinal movement of the drill bit device 410 from the outer sidewall surface 186OS of the conduit section 184 into the conduit section interior 184I based on the lower surface 430LS engaging the portions of the outer sidewall surface 186OS that are adjacent to the hole being drilled and axially overlapping at least a portion of the lower surface 430LS along the longitudinal axis 410LA, 411LA, and thus resisting further longitudinal movement of the drill bit device 410 into the conduit section 184 through the conduit section sidewall 186, thereby preventing the drill bit 411 from drilling any further than the particular protrusion distance 452 into the conduit section 184. As a result, the installation guide device 400 may be configured to prevent over-drilling by the drill bit device 410 into the conduit section 184 through the conduit section sidewall 186 beyond the particular protrusion distance 452, thereby preventing damage to conduit section 184 that might otherwise occur due to over-drilling by the drill bit device 410 (e.g., drilling beyond the particular protrusion distance into the conduit section). In some example embodiments, the particular protrusion distance 452 may be configured to be equal to or less than a particular proportion of the inner diameter defined by the inner sidewall surface 186IS of the conduit section sidewall 186, (e.g., equal to or less than ¾" with regard to a ¾" PVC conduit section) to reduce, minimize, or prevent the likelihood that the drill bit device 410 may drill the access point opening 140 into the conduit section interior 184I and continue further through the conduit section interior 184I to start drilling an opposing portion of the inner sidewall surface 186IS at an opposite side of the conduit section interior 184I from the access point opening 140.

As shown, the guide connector 440 may be configured to couple the guide device 420 to the conduit section 184 so that the lower guide opening 422O is directly adjacent to a particular location on the outer sidewall surface 186OS of the coupled conduit section, such that the particular protrusion distance 452 is a distance that the exposed portion 412E of the drill bit body 412 protrudes into the conduit section 184 from the outer sidewall surface 186OS and through the conduit section sidewall 186 into the conduit section interior 184I based on the lower surface 430LS of the protrusion stop structure 430 directly engaging the outer sidewall surface 186OS. However, example embodiments are not limited thereto, and the lower guide opening 422O may be spaced apart from the outer sidewall surface 186OS in the direction of the longitudinal axis 422LA based on the guide connector 440 coupling the guide device 420 to the conduit section 184.

As further shown, the outer diameter 430D of the cylindrical collar device defined by the protrusion stop structure 430 may be smaller than the diameter of the guide conduit and/or the diameter 422OD of the lower guide opening 422O, and an additional spacer 432 may protrude radially from the cylindrical collar device of the protrusion stop structure 430 to an outer diameter that more closely approximates and/or is equal or substantially equal to the diameter of the guide conduit 422 to improve alignment and centering of the drill bit 411 within the guide conduit 422. However, example embodiments are not limited thereto. For example, in some example embodiments the outer diameter 430D of the protrusion stop structure 430 may be equal or substantially equal to the diameters and 422OD, and the spacer 432 may be omitted. As shown, the diameter 430D of the protrusion stop structure 430 may be configured to be equal to or smaller than the diameter 422OD of the lower guide opening 422O to enable the lower surface 430LS of the protrusion stop structure 430 to directly engage the outer sidewall surface 186OS during longitudinal movement of the drill bit device 410 in relation to the guide device 320 to drill an access point opening 140. However, example embodiments are not limited thereto, and the protrusion stop structure 430 may be configured to engage a portion of the guide device 420 to inhibit further longitudinal movement (e.g., downward movement) of the drill bit device 410 through the lower guide opening 422O based on the diameter 430D of the protrusion stop structure 430 being smaller than the diameter 422OD of the lower guide opening 422O.

Still referring to FIGS. 7B-7D and 9A-9B, the installation guide device 400 may include a distal stop structure 424 that is configured to inhibit longitudinal movement of the drill bit device 410 away from the lower guide opening 422O and at least partially through the guide conduit 422 (e.g., movement along the longitudinal axis 410LA, 411LA, and/or 422LA). As shown, the distal stop structure 424 may be a part of the guide device 420 and/or may be integral to the guide device 420 such that the distal stop structure 424 and the guide device 420 are separate portions of a single, unitary piece of material, but example embodiments are not limited thereto. As shown, the distal stop device may define an upper guide opening 422I of the guide conduit 422, where the upper guide opening 422I has a diameter which may be smaller than the outer diameter 430D of the protrusion stop structure 430 (or at least one structure of the drill bit device 410), such that a surface of the distal stop structure 424 may axially overlap at least a portion of the protrusion stop structure 430 and enable the longitudinal movement of the drill bit device 410 away from the lower guide opening 422O and at least partially through the guide conduit 422 to be inhibited based on the upper surface 430US of the protrusion stop structure engaging (e.g., directly contacting the exposed lower surface of the distal stop structure 424 that faces the upper surface 430US and axially overlaps the upper surface 430US. As a result, when the installation guide device 400 is coupled to the conduit section 184, and the protrusion stop structure inhibits (e.g., limits) longitudinal movement of the drill bit device 410 through the lower guide opening 422O (e.g., limits downward longitudinal movement in relation to the guide device 420), the distal stop structure 424 may inhibit (e.g., limit) longitudinal movement of the drill bit device 410 through the upper guide opening 422I (e.g., limits upward longitudinal movement in relation to the guide device 420), thereby keeping the drill bit device 410 at least partially within the guide conduit 422 while at least the guide device 420 is coupled to the conduit section 184. As a result, premature or accidental removal of the drill bit device 410 from the guide device 420 (e.g., due to accidental excessive withdrawing force being applied on the drill bit device by a mechanically coupled driver device) to reduce, minimize, or prevent the risk of injury to an operator of the driver device or nearby equipment, or loss of the drill bit device 410 due to the drill bit device 410 being moved longitudinal upwards through the guide conduit 422 (e.g., withdrawn from a drilled access point opening 140).

Figure 7B:
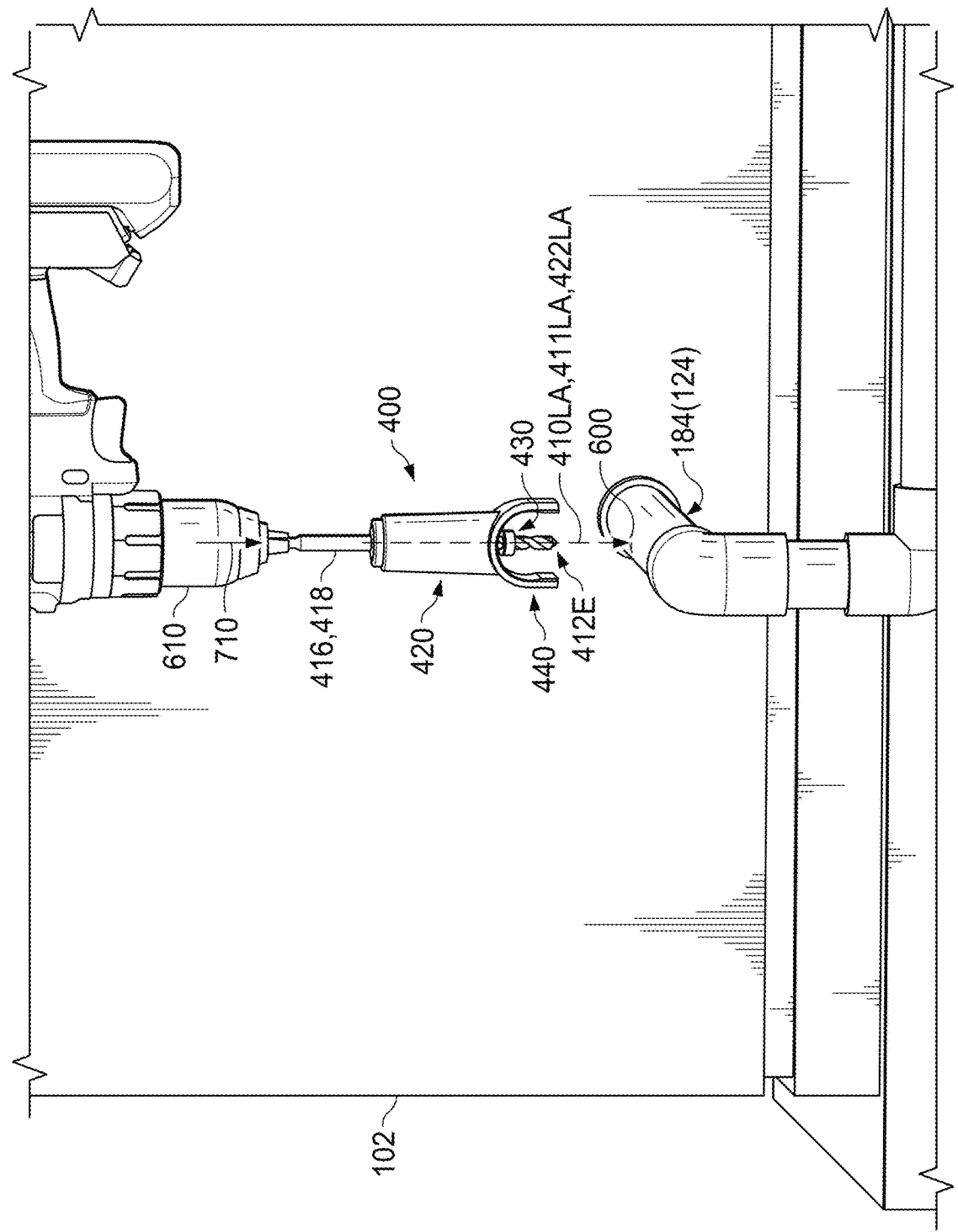
Figure 8A:
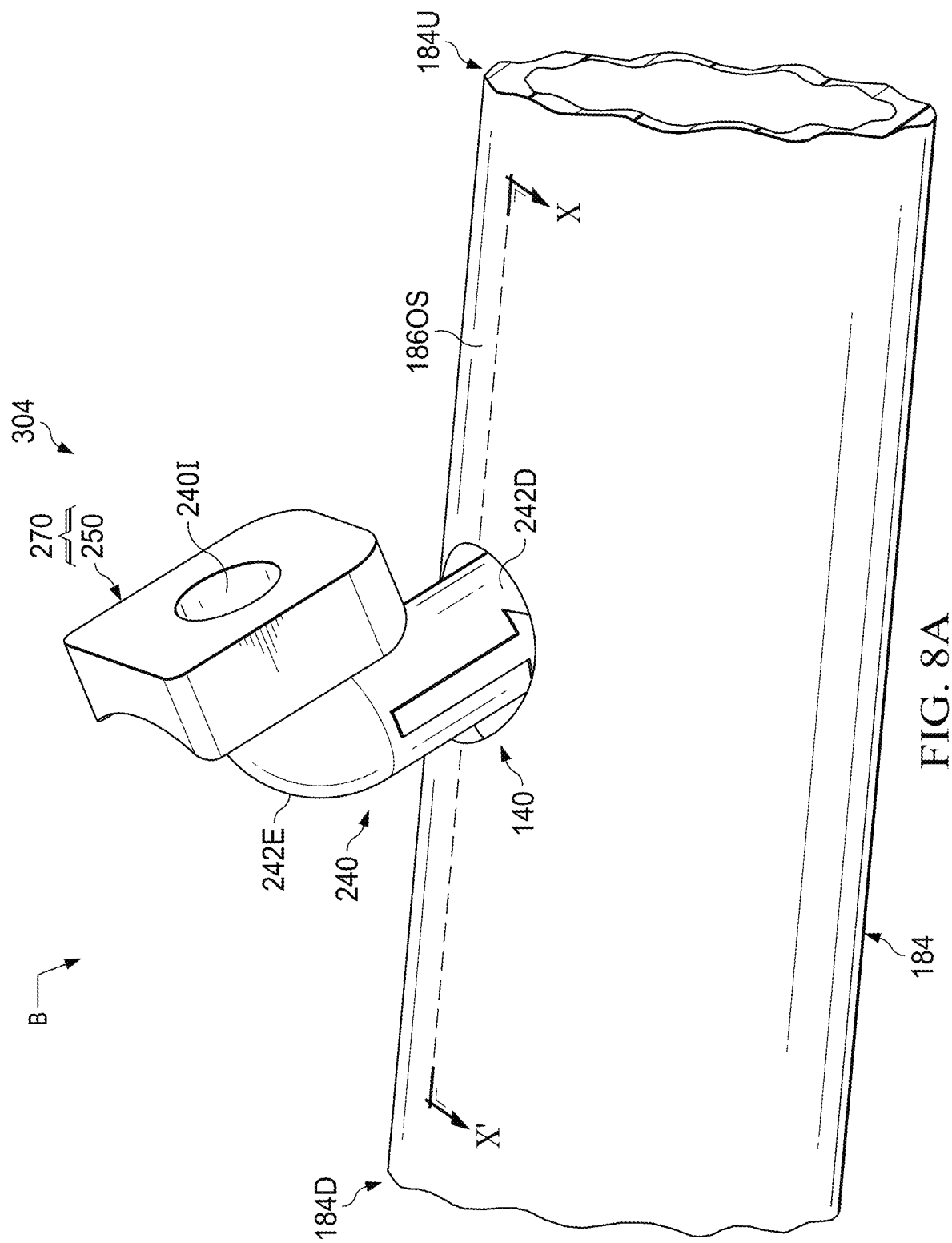
FIGS. 8A, 8B, and 8C are perspective views of region B of FIG. 7G with regard to separate operations of the method shown in FIG. 6, according to some example embodiments.
Figure 8B:
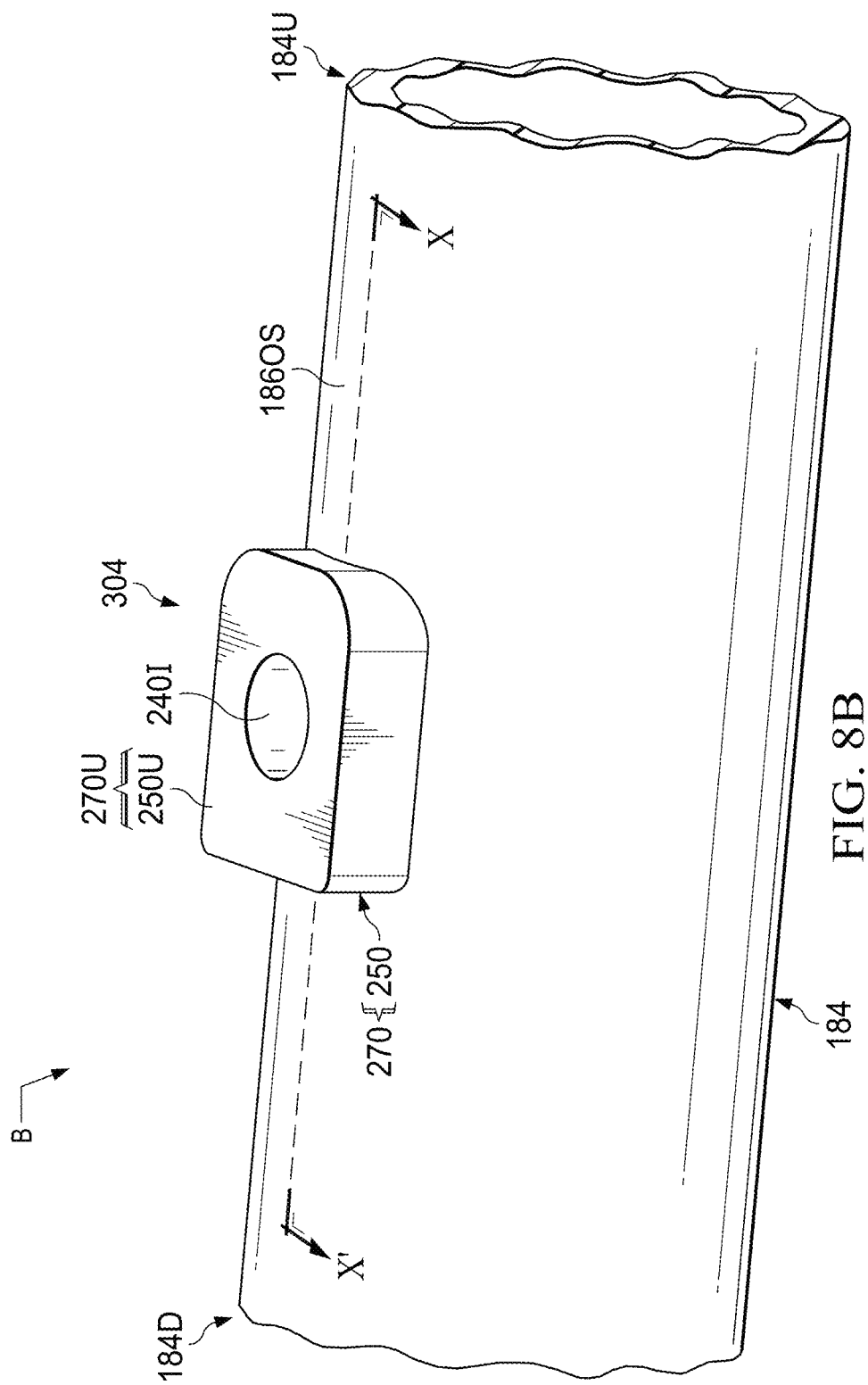
Figure 8C:
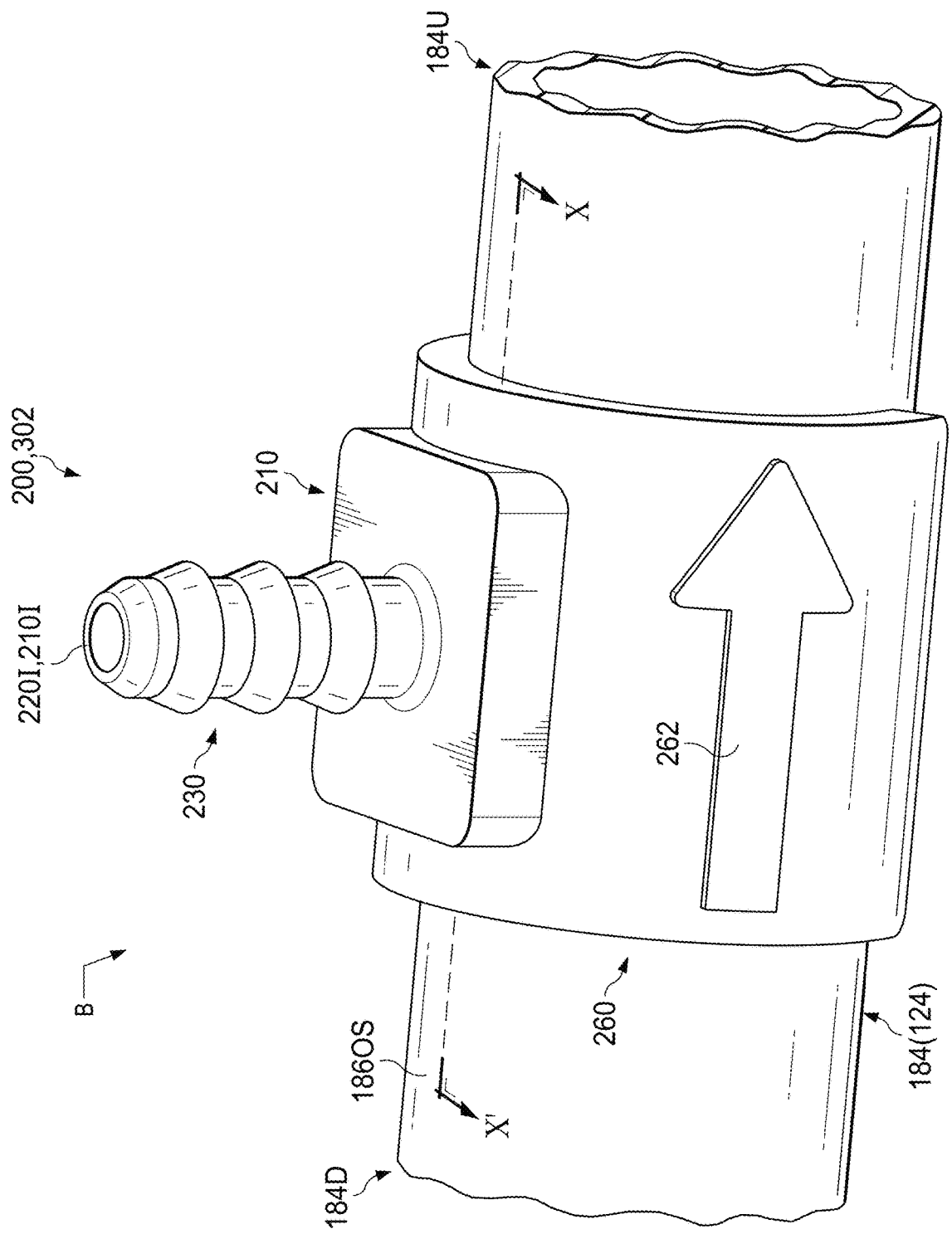
Figure 9A:
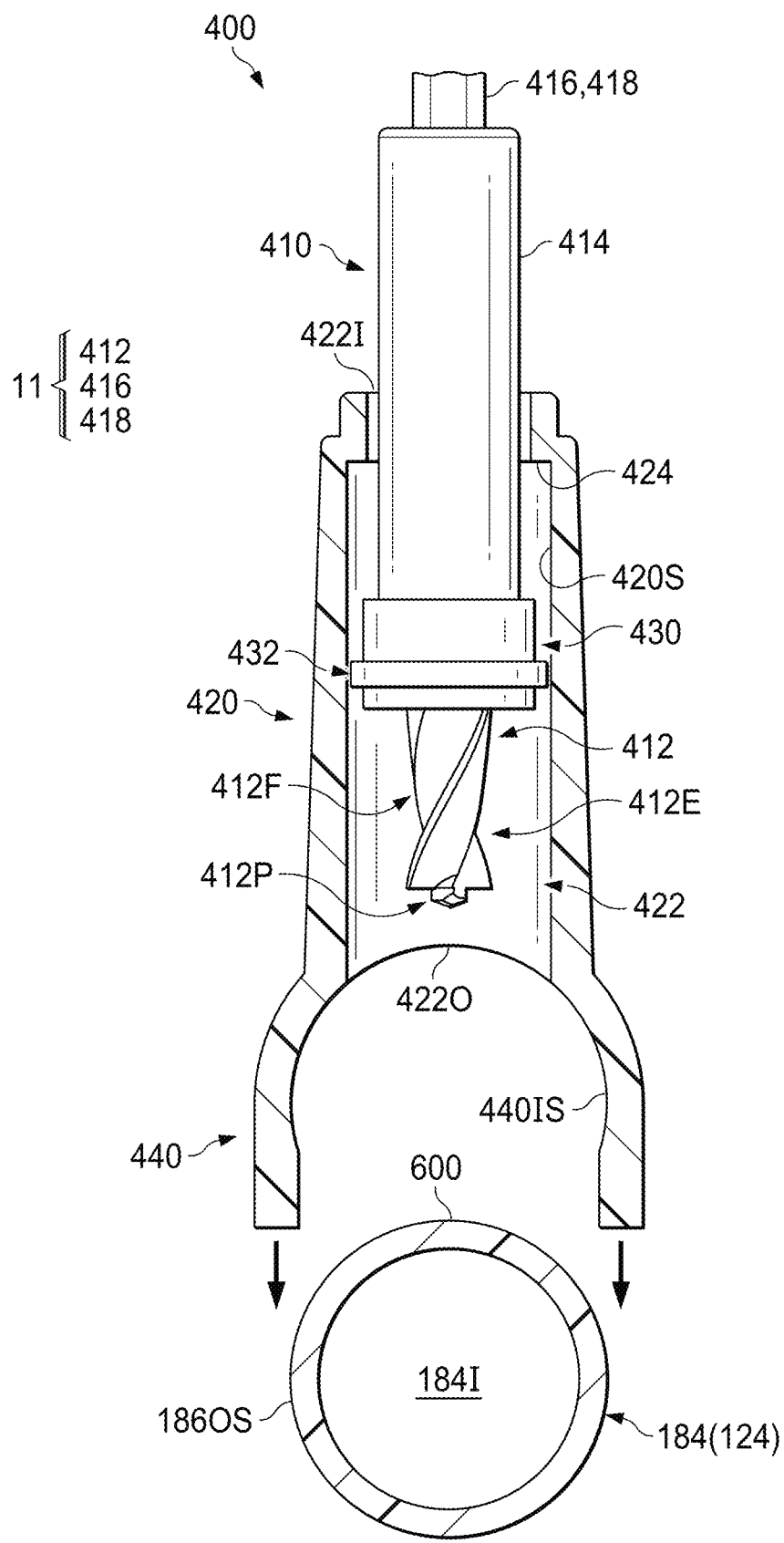
FIGS. 9A, 9B, 9C, 9D, and 9E are cross-sectional elevation views, along the cross-sectional view line IX-IX' shown in FIGS. 7C-7G, of separate operations of the method shown in FIG. 6, according to some example embodiments.
Figure 9B:
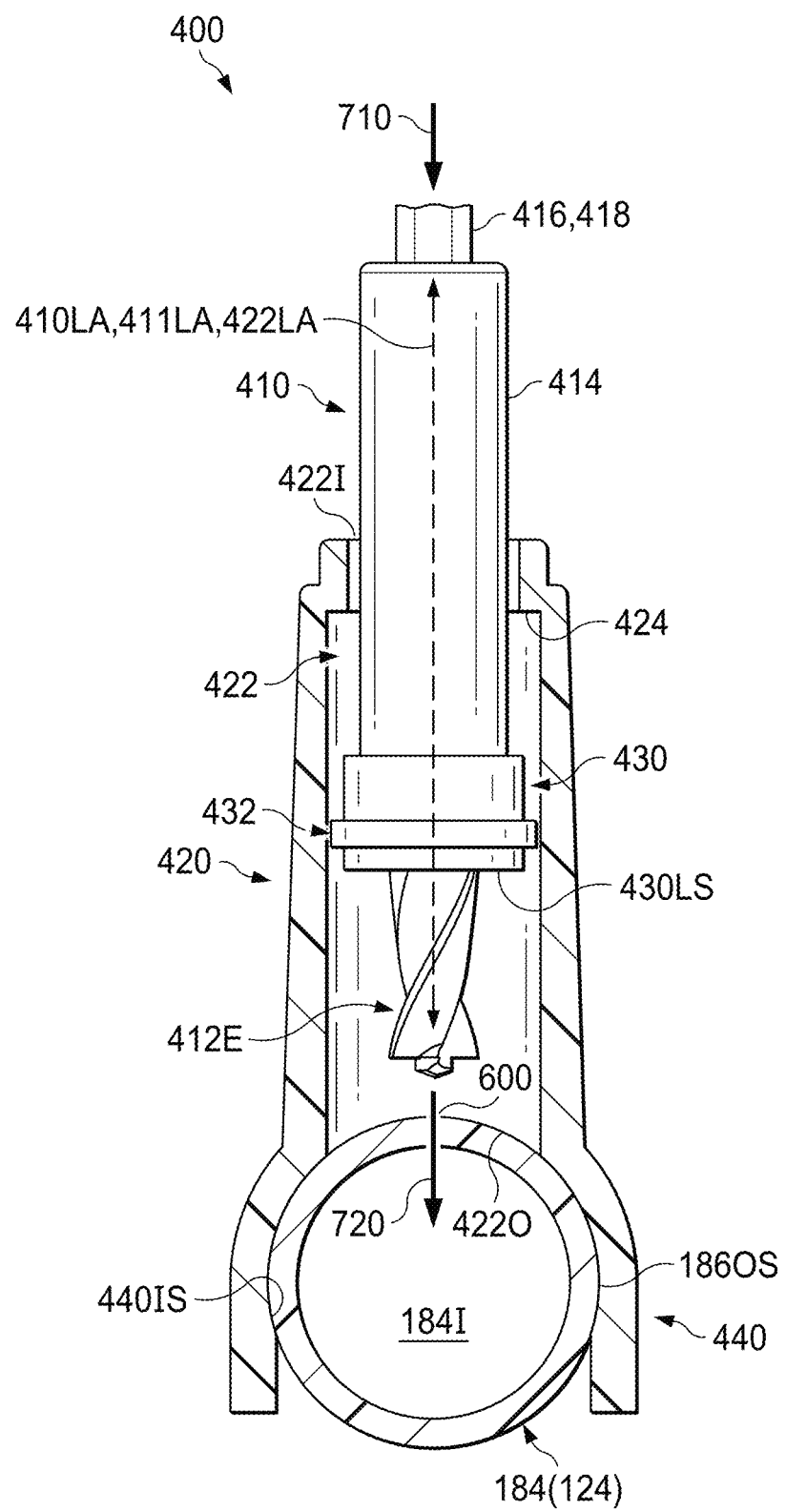

As further shown in FIGS. 6, 7B, and 9A, the coupling the installation guide device 400 to the conduit section 184 at S604 may include, at S606 aligning the lower guide opening 422O of the installation guide device with the access point location 600 on the outer sidewall surface 186OS of the conduit section 184, for example to cause the longitudinal axis 422LA of the lower guide opening 422O to axially overlap the access point location 600, for example to intersect the access point location 600 in a direction that is perpendicular to the outer sidewall surface 186OS at the access point location 600.

As further shown in FIGS. 6, 7B-7D, and 9A-9B, the coupling the installation guide device 400 to the conduit section 184 at S604 may include, at S608 aligning the drill bit device 410 with the access point location 600 on the outer sidewall surface 186OS of the conduit section 184, for example to cause the longitudinal axis 410LA of the drill bit device 410 and/or the longitudinal axis 411LA of the drill bit 411 to axially overlap the access point location 600, for example to intersect the access point location 600 in a direction that is perpendicular to the outer sidewall surface 186OS at the access point location 600.

In some example embodiments, and as shown, the installation guide device 400 may include a guide connector 440 that is configured to couple the installation guide device 400 to the conduit section. As shown, the guide connector 440 may be connected to and/or a part of the guide device 420, but example embodiments are not limited thereto. The guide connector may engage (e.g., clamp) the conduit section sidewall 186 at the outer sidewall surface 186OS (e.g., directly engage and clamp the outer sidewall surface 186OS) to couple the installation guide device 400 to the conduit section 184. As shown, where the guide connector 440 is connected to the guide device 420, and where installation guide device 400 includes a distal stop structure 424 that is configured to inhibit longitudinal movement of the drill bit device 410 away from the lower guide opening 422O and at least partially through the guide conduit 422, the coupling at S604 may include aligning the guide connector 440 with the conduit section 184 to align the guide conduit 422 with the access point location 600 before, during, or after manipulating the guide connector 440 to engage and couple with (e.g., clamp) the conduit section 184 (e.g., the outer sidewall surface 186OS thereof). Such aligning and coupling may simultaneously align the drill bit device 410 with the access point location 600, based on the drill bit device being located within the guide conduit 422, but example embodiments are not limited thereto.

Figure 7C:
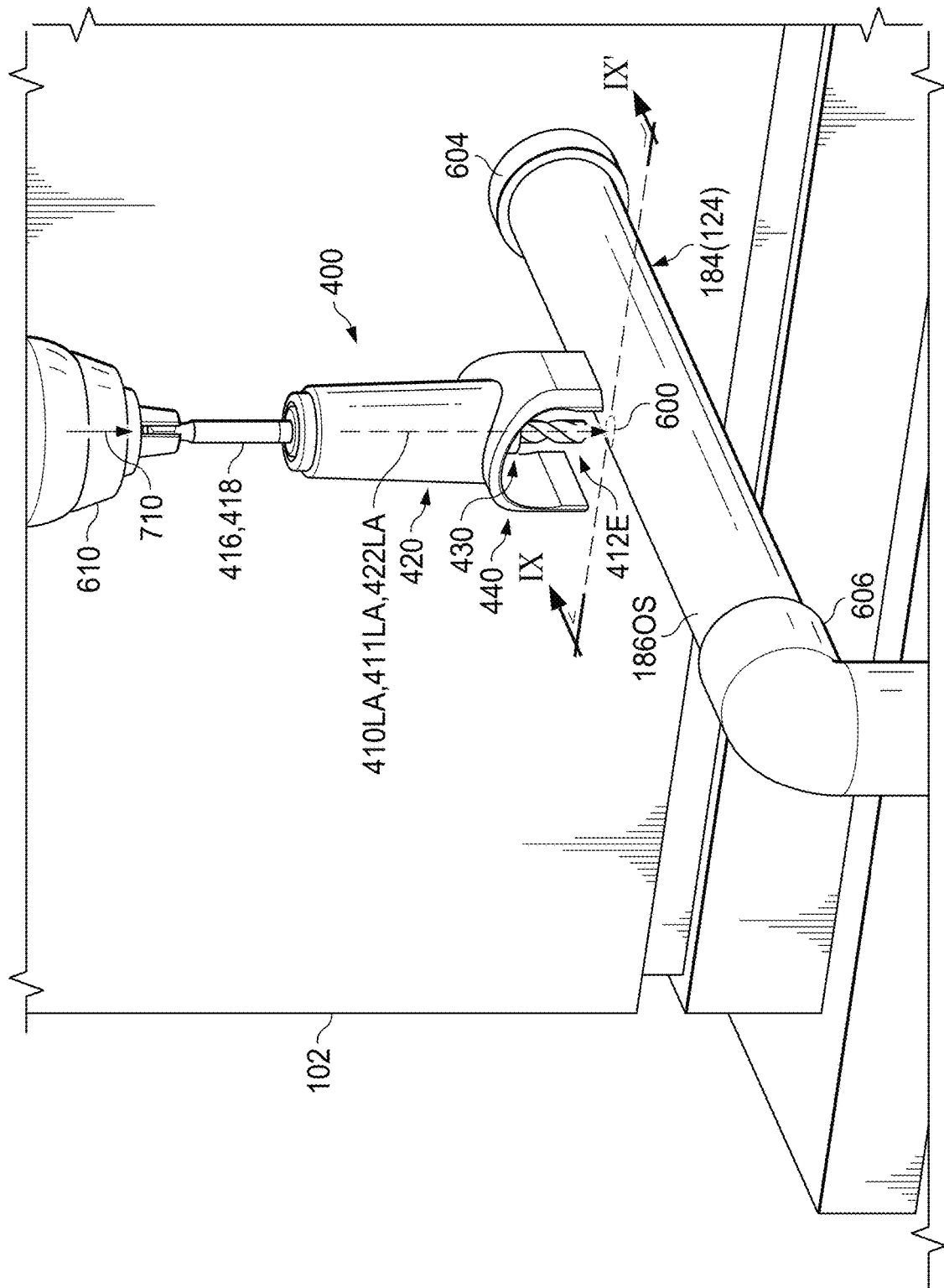
Figure 7D:
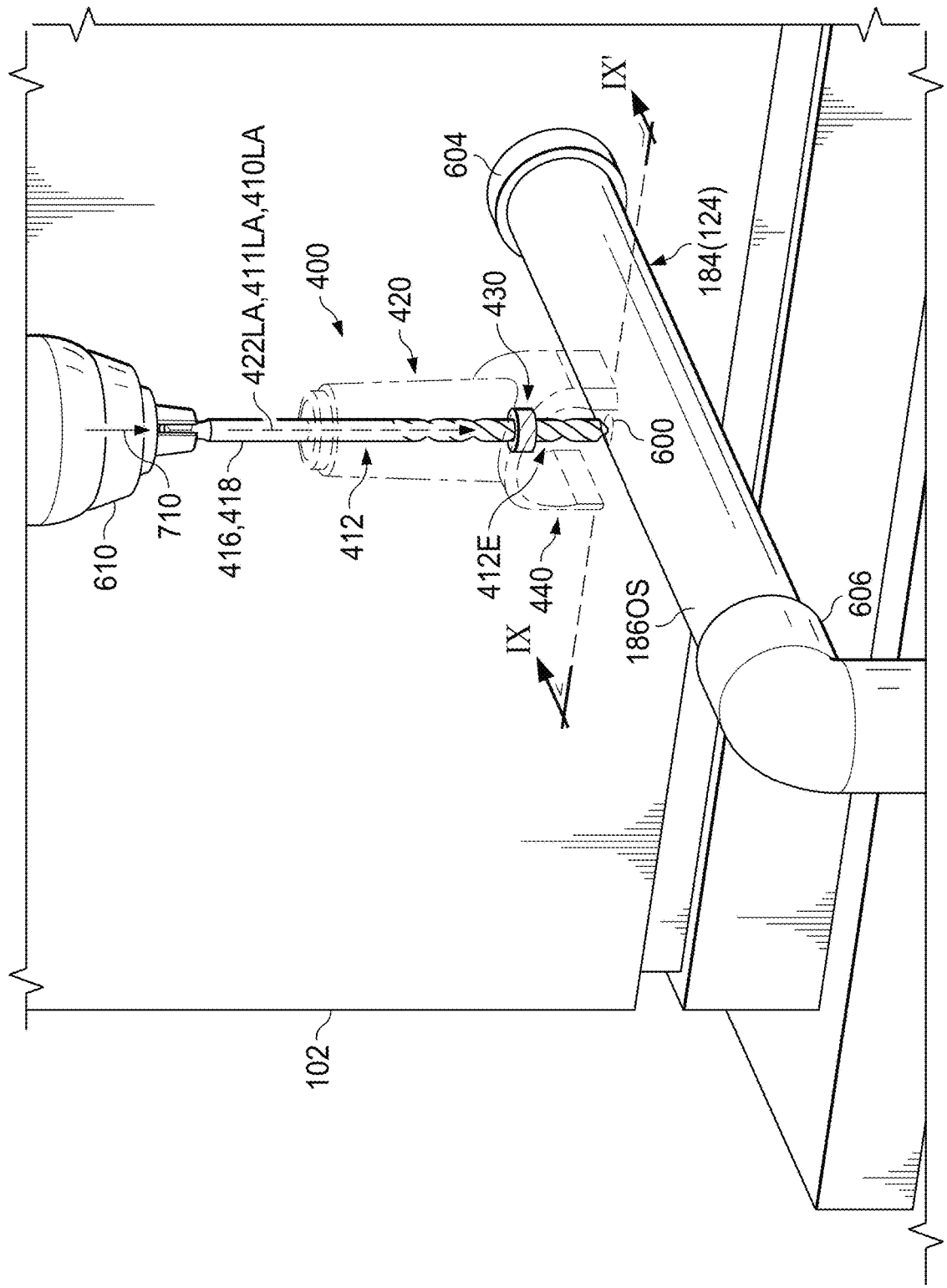

For example, as shown in at least FIGS. 7B-7C, the distal end of the drill bit device 410, including for example the shank 416 and tang 418 of the drill bit 411, may be mechanically coupled to a driver device 610 (e.g., a handheld drill) prior to coupling the installation guide device 400 with the conduit section 184, although example embodiments are not limited thereto and the driver device 610 may be mechanically coupled with the drill bit 411 subsequently to the installation guide device 400 coupling with the conduit section 184. As shown, the installation guide device 400 may be oriented in a vertical orientation above the access point location 600 where the longitudinal axes 410LA, 411LA, 422LA are approximately aligned with (e.g., axially aligned with and/or overlapping) the access point location 600, and the guide device 420 may be movable in relation to the drill bit device 410 and may fall under gravity so that the drill bit device 410 is withdrawn from the guide conduit 422 via the upper guide opening 422I until the drill bit device 410 and/or a protrusion stop structure 430 engages a distal stop structure 424 to inhibit further movement of the drill bit device 410 out of the guide conduit 422 via the upper guide opening 422I. The guide device 420 may then be coupled to the conduit section 184 based on the guide connector 440 engaging the outer sidewall surface 186OS, and the drill bit device 410 may then be moved longitudinally downwards, or inserted, further into the guide conduit 422 via the upper guide opening 422I based on longitudinal force 710 applied on the drill bit device 410 by the driver device 610 while the guide device is coupled to the conduit section 184.

As shown in FIG. 6, 7E, and 9C-9D, at S610 the drill bit device 410 is operated, for example based on operating the driver device 610, to cause the drill bit device 410 and the drill bit 411 thereof to rotate around the longitudinal axis 410LA, 411LA thereof, while the installation guide device 400 is coupled to the conduit to cause the drill bit device 410 to move longitudinally 720 at least partially through the lower guide opening 422O to a protrusion distance that is equal to or less than the particular protrusion distance, such that the drill bit device 410 (e.g., the exposed portion 412E of the drill bit body 412) drills through the sidewall thickness 186T of the conduit section 184 from the access point location 600 to form an access point opening 140 through the sidewall thickness 186T of the conduit section 184 into a conduit section interior 184I of the conduit section.

Figure 7E:
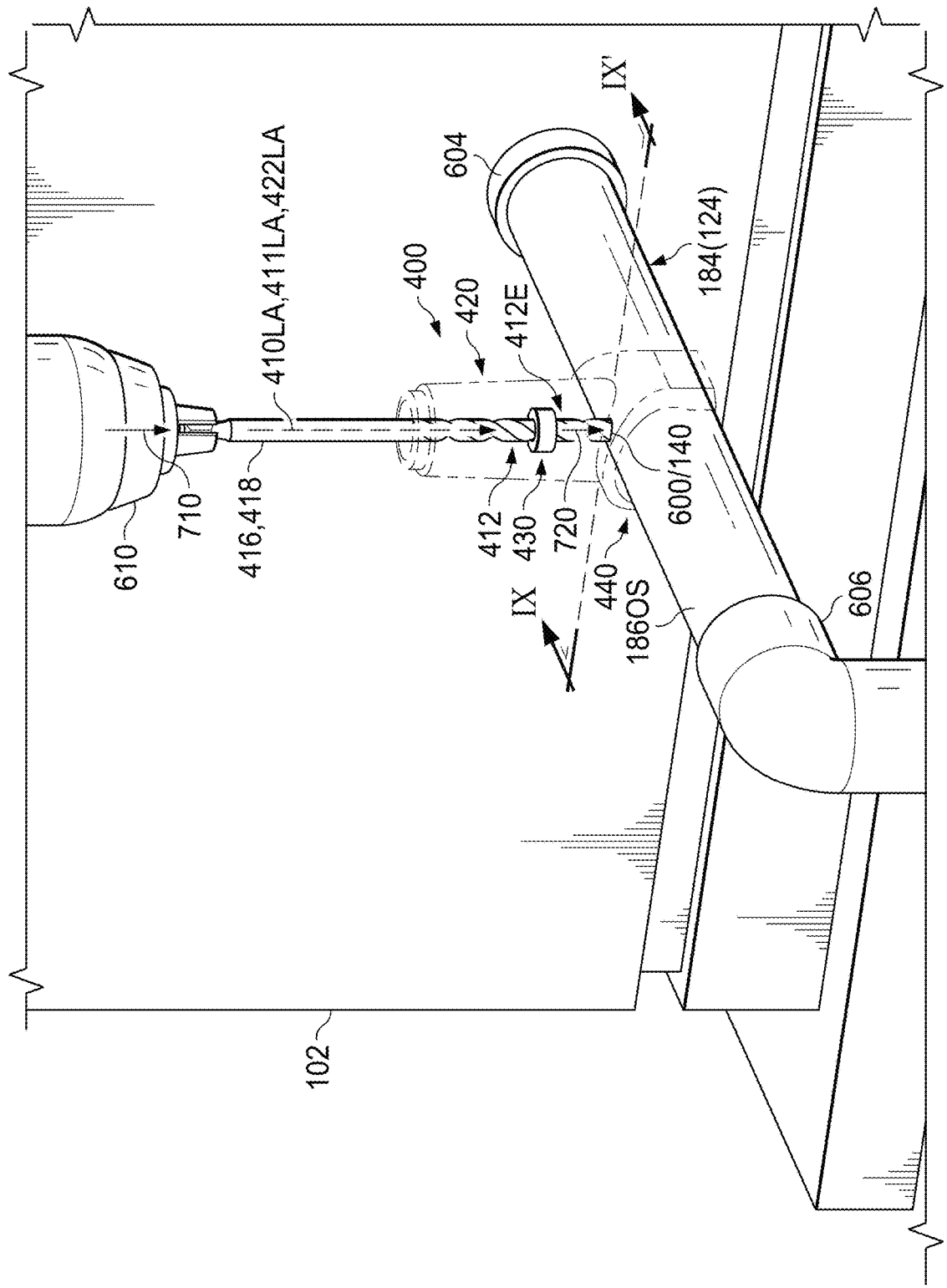
Figure 7F:
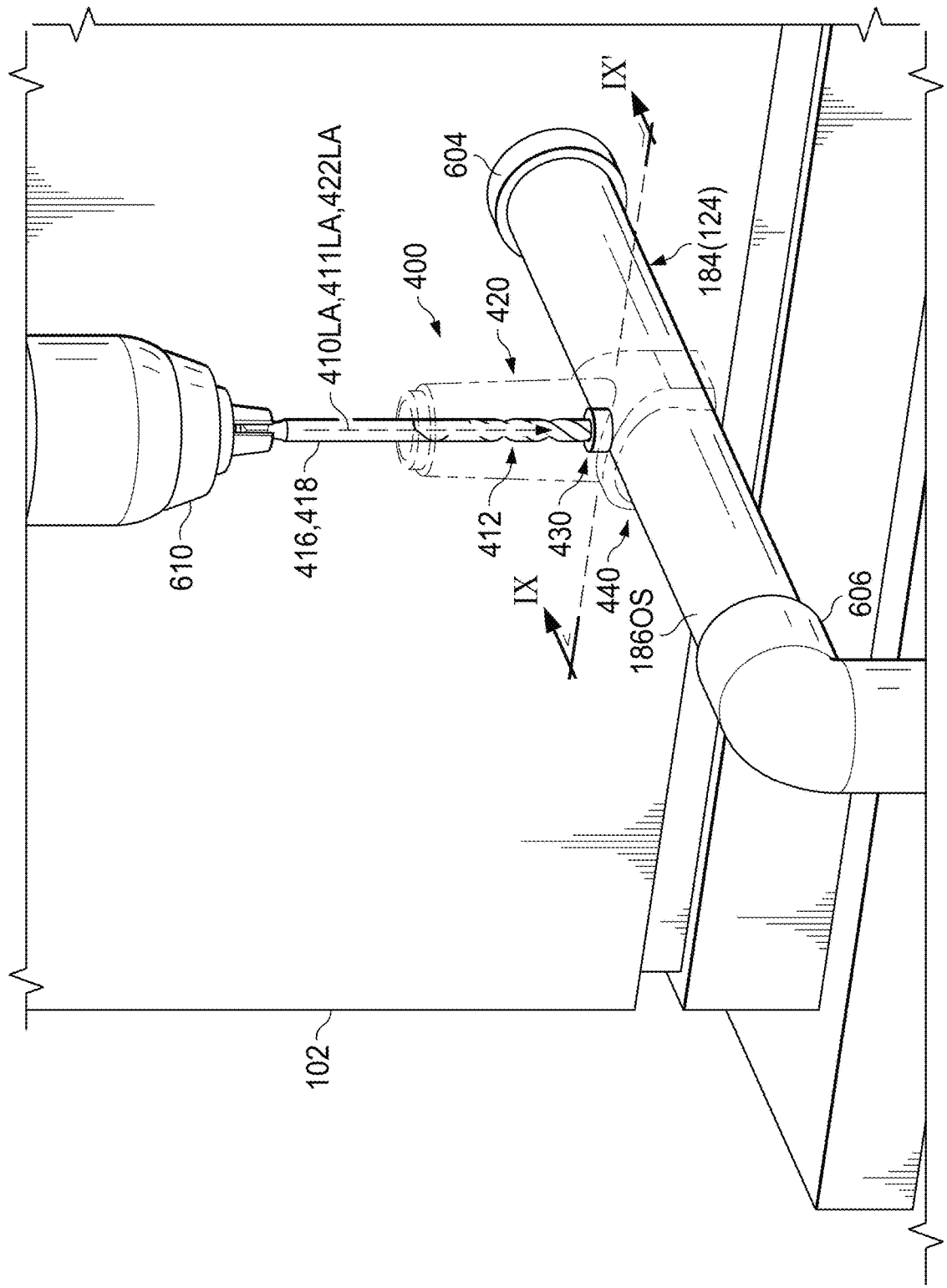
Figure 9C:
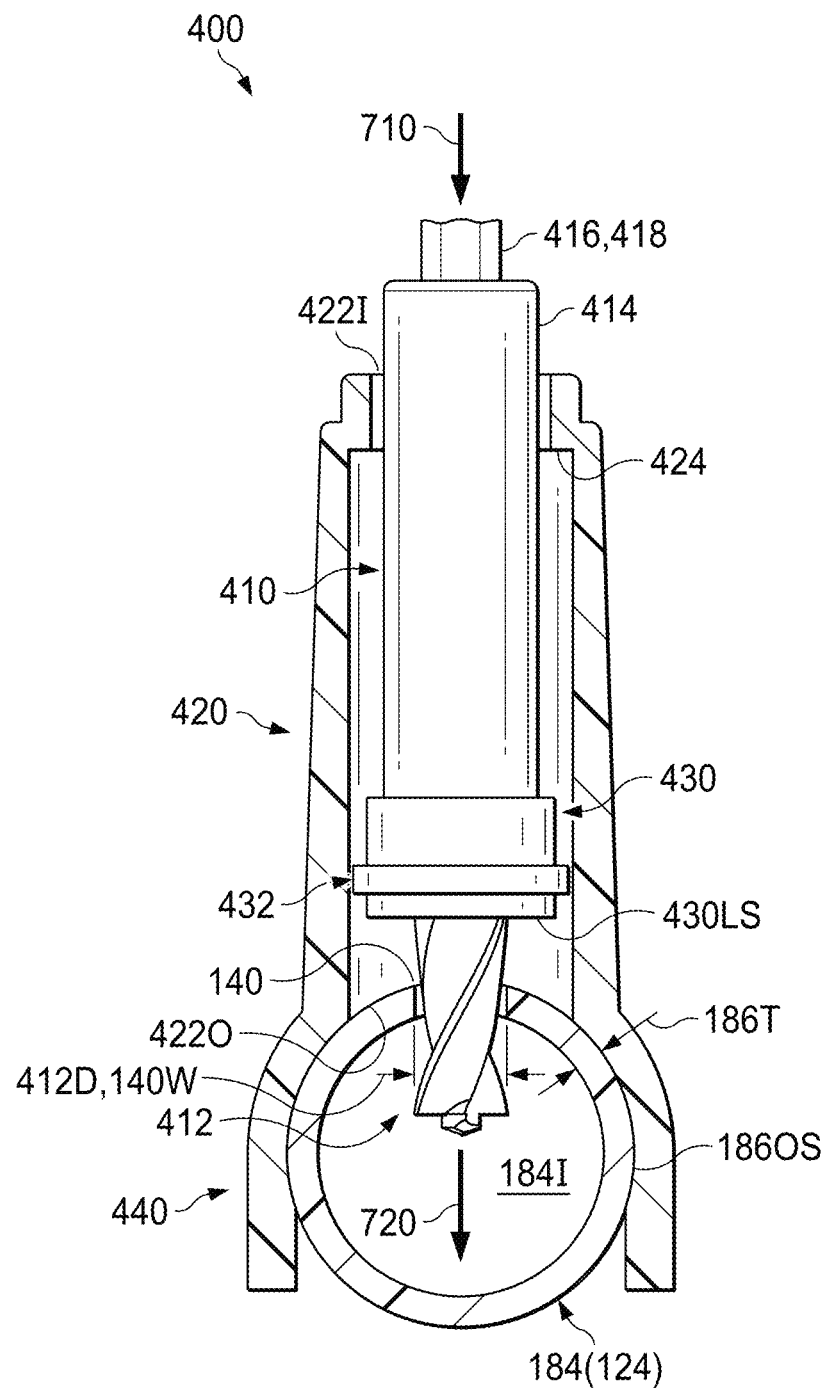
Figure 9D:
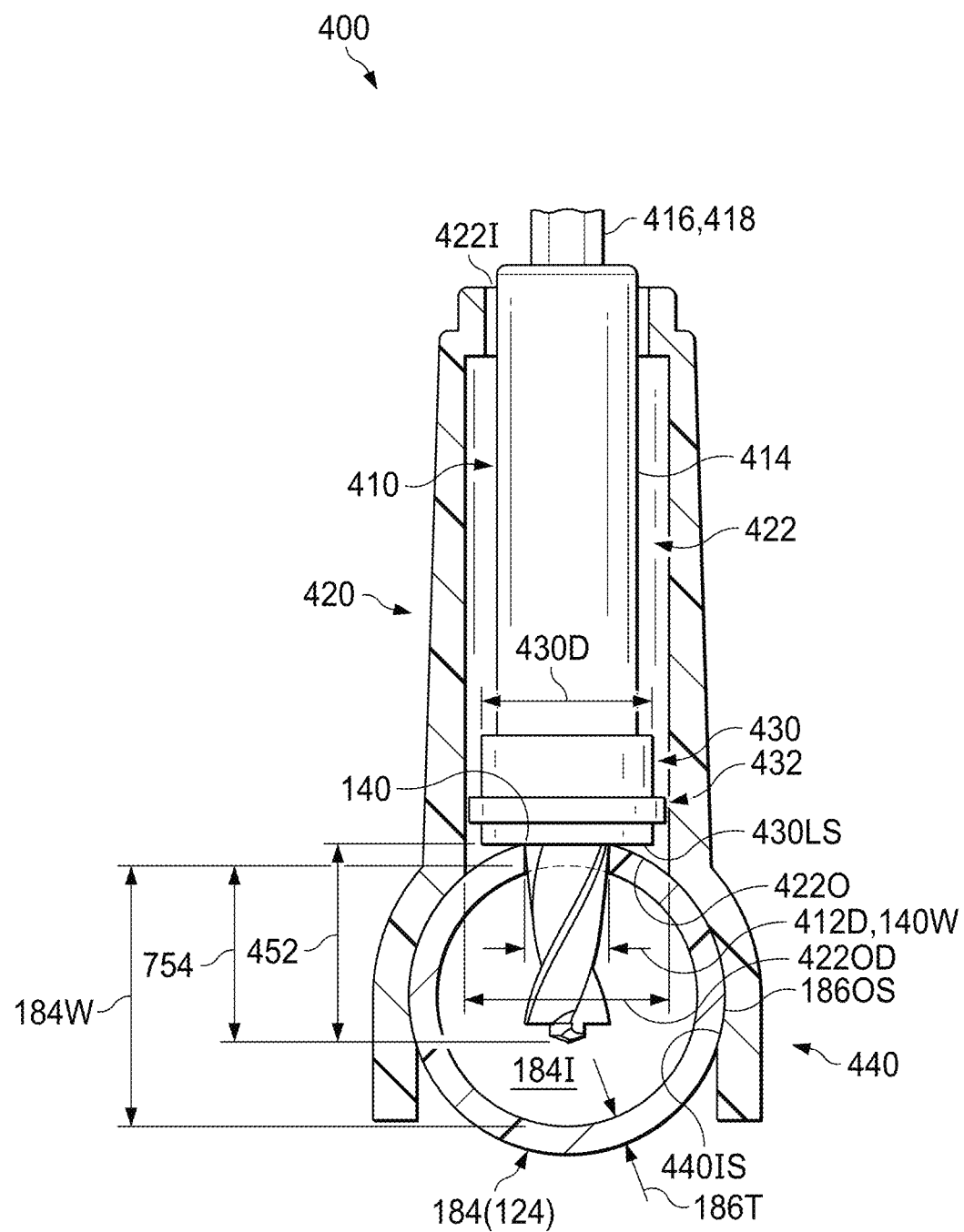

As shown, the drill bit device 410 may move longitudinally 720 into the conduit section 184 from the outer sidewall surface 186OS to cause a surface 430LS of the protrusion stop structure 430 to approach an axially overlapping portion of the outer sidewall surface 186OS, based on the protrusion stop structure 430 having a diameter 430D that is greater than the drill bit size 412D and thus greater than the diameter 140W of the access point opening 140 that is formed. As a result, and as shown in FIGS. 7F and 9D, the protrusion stop structure 430 may engage the axially overlapping portions of the outer sidewall surface 186OS to inhibit further longitudinal movement 720 of the drill bit device 410 into the conduit section interior 184I and thus limit the longitudinal protrusion of the exposed portion 412E of the drill bit body 412 into the conduit section 184 from the outer sidewall surface 186OS to be equal to or greater than the particular protrusion distance 452 and thus to cause the protrusion of the exposed portion 412E of the drill bit body 412 into the conduit section interior 184I from the inner sidewall surface 186IS to be an inner protrusion distance 754 which may be a particular proportion of the inner diameter 184W of the conduit section interior 184I defined by the inner sidewall surface 186IS. In some example embodiments, the inner diameter 184W of the conduit section 184 as defined by the conduit section sidewall 186 (e.g., the inner sidewall surface 186IS) may be 1", ¾", or the like, but example embodiments are not limited thereto. In some example embodiments, the outer diameter of the conduit section 184 as defined by the conduit section sidewall 186 (e.g., the outer sidewall surface 186OS) may be 2", 1.5", 1.25", 1", ¾", or the like, but example embodiments are not limited thereto.

As a result, and as shown at S612, a determination may be made whether the protrusion stop structure 430 has engaged (contacted) the outer sidewall surface 186OS of the conduit section 184. If not (S612=NO), the drilling through the sidewall thickness 186T of the conduit section sidewall 186 at the access point location 600 may, at S614, continue as shown in FIGS. 7E and 9C may continue. If so (S612=YES), as shown in FIGS. 7F and 9D, at S616 the operation (e.g., at least the longitudinal movement 720) of the drill bit device 410 through the lower guide opening 422O towards the conduit section interior 184I may be stopped. The rotation of the drill bit device 410 around the longitudinal axis 410LA thereof may also be stopped at S616, but example embodiments are not limited thereto.

As shown in FIGS. 7F and 9C-9D, the protrusion stop structure 430 may be fixed in relation to the drill bit device 410 (e.g., integrated into the sheath structure 414 of the drill bit device 410) such that the protrusion stop structure 430 is configured to move with the drill bit device 410 in relation to the guide conduit 422 and inhibit protrusion of the drill bit device 410 beyond the particular protrusion distance 452 from the lower guide opening 422O while the installation guide device 400 is coupled to the conduit section based on a lower surface 430LS of the protrusion stop structure 430 contacting (e.g., engaging) the outer sidewall surface 186OS of the conduit section 184. However, example embodiments are not limited thereto.

Figure 7G:
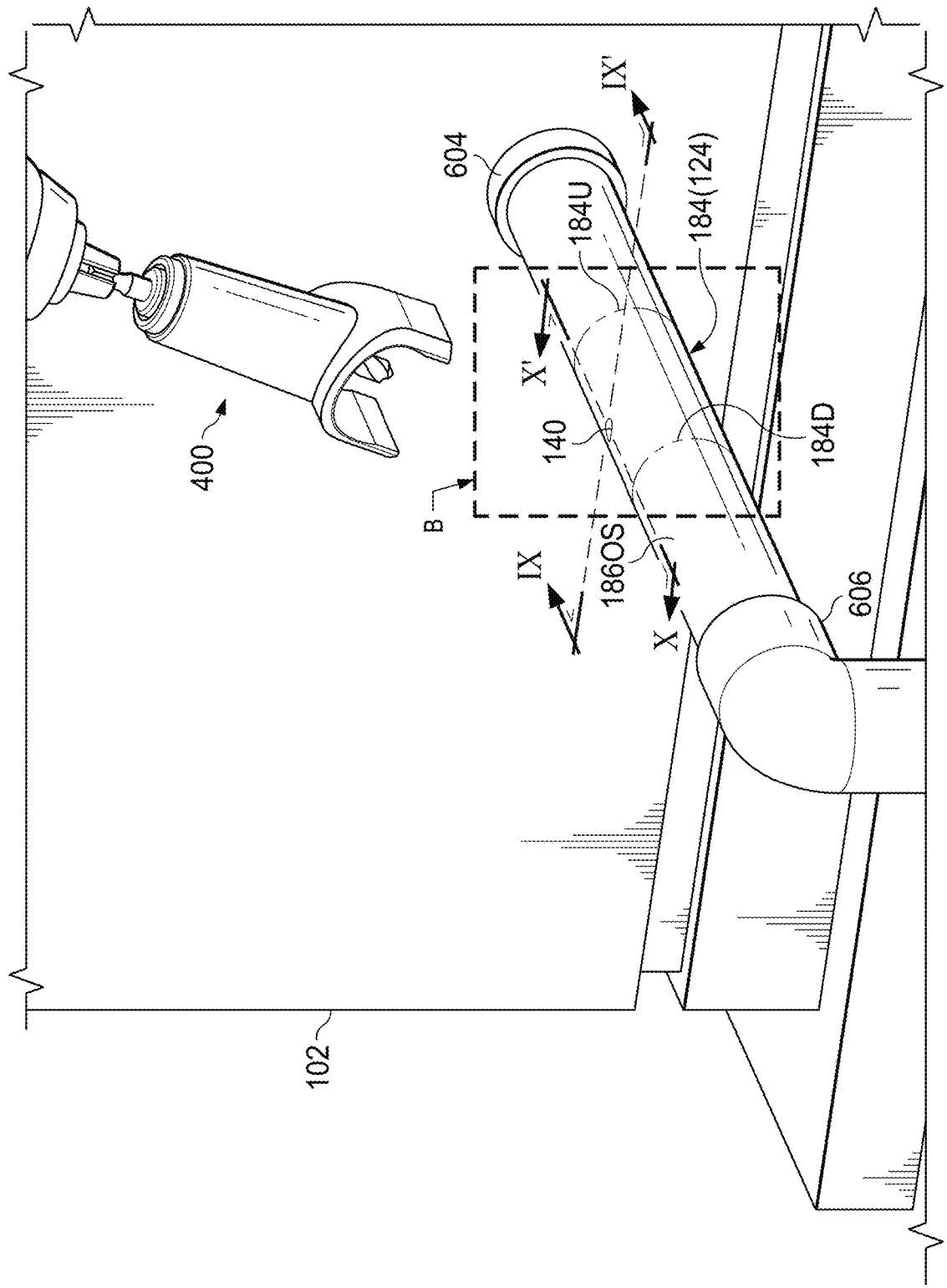
Figure 9E:
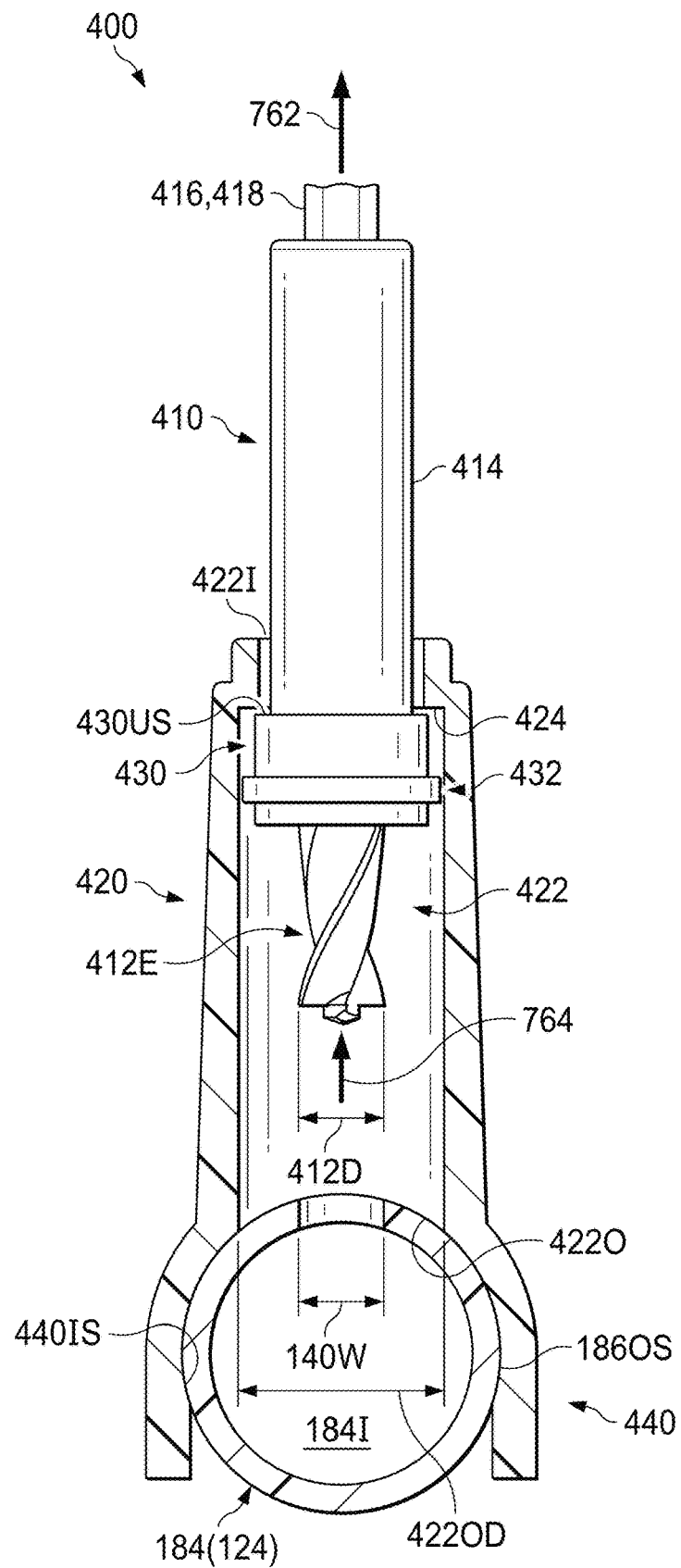

As shown in FIGS. 6, 7G, and 9E, at S618 the installation guide device 400 is decoupled from the conduit section 184 to expose the access point opening 140. The decoupling may include applying a withdrawing (upward) force 762 on the drill bit device 410 (e.g., via the driver device 610 mechanically coupled to the drill bit 411) to withdraw the drill bit device 410 from the access point opening 140 and to move through the guide conduit 422 and at least partially through the upper guide opening 422I. As shown in FIG. 9E, the installation guide device 400 may include a distal stop structure 424 that is configured to inhibit longitudinal movement of the drill bit device 410 away from the lower guide opening 422O and at least partially through the guide conduit 422 so as to prevent complete removal of the drill bit device 410 from the guide conduit 422, which may reduce, minimize, or prevent accidents or loss of the drill bit device 410.

As further shown, the decoupling at S618 may include causing the guide connector 440 to disengage from the outer sidewall surface 186OS of the conduit section 184 to enable the installation guide device 400 to be removed from the conduit section 184 to expose the access point opening 140.

While some example embodiments provide for forming the access point opening via coupling, operating, and decoupling an installation guide device 400 at S604-S618 as described herein and as shown in FIGS. 6, 7A-7G, and 9A-9E, example embodiments are not limited thereto. In some example embodiments, the access point opening 140 may be pre-existing such that the determining at S602 includes determining the access point opening and operations S604-S618 are omitted. In some example embodiments, the access point opening 140 may be formed without use of an installation guide device 400, for example based on operating a driver device 610 to directly drill the access point opening 140 through the sidewall thickness 186T of the conduit section 184.

As shown in FIGS. 6, 8A-8C, and 10A-10E, and 11A-11B, at S620 an adaptor device 200 is coupled to the conduit section 184 at the exposed access point opening 140, which may include aligning the adaptor conduit 220 with the access point opening 140. As described herein, the adaptor conduit 220 may be interchangeably referred to as an adaptor supply conduit. As shown, the adaptor device 200 may be the same as the adaptor device 200 shown in FIGS. 2A-2B and 3A-3H, but example embodiments are not limited thereto.

As shown in FIGS. 6, 8A-8B, and 10A-10D, the coupling the adaptor device 200 at S620 may include, at S622, at least partially inserting an elbow nozzle 240 through the access point opening 140 through the sidewall thickness 186T and into the conduit section interior 184I. As shown, the elbow nozzle 240 may be included in an elbow nozzle structure 304 that includes the elbow nozzle 240 and a base structure 270 defined by at least a portion (e.g., an outer portion) of the proximate nozzle section 242P of the elbow nozzle 240, but example embodiments are not limited thereto. In some example embodiments, the elbow nozzle 240 may comprise a single material, for example silicone. As shown, the distal nozzle section 242D may be inserted 1010 through the access point opening 140 to insert the distal end 240D of the elbow nozzle 240 into the conduit section interior 184I. As shown, the distal nozzle section 242D may be inserted 1010 through the access point opening 140 at an angle to the central axis of the access point opening 140, but example embodiments are not limited thereto, and the distal nozzle section 242D may be inserted through the access point opening 140 at any angle that will enable the distal nozzle section 242D to fit through the access point opening 140 into the conduit section interior 184I.

Figure 10A:
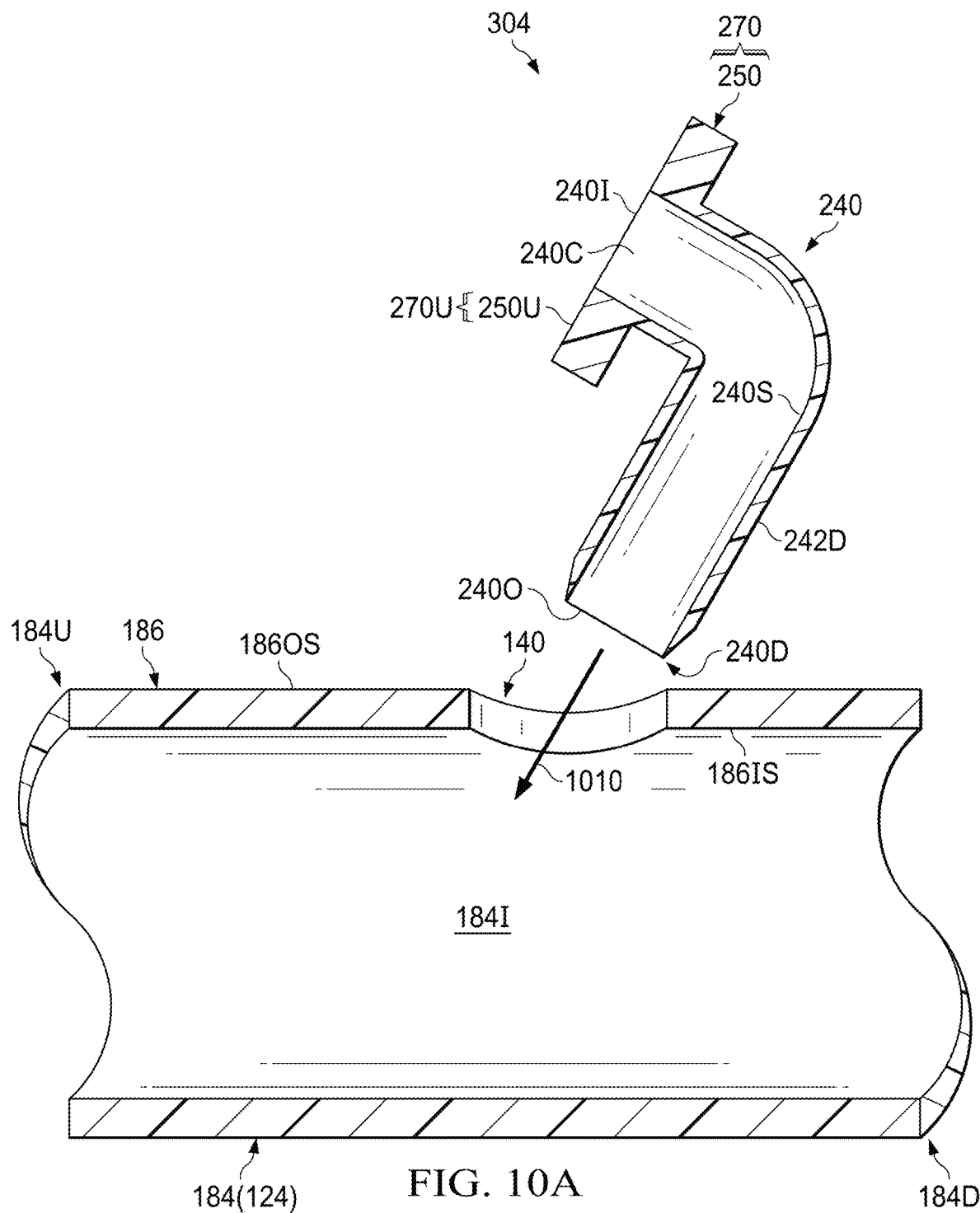
FIGS. 10A, 10B, 10C, 10D, and 10E are cross-sectional views along view line X-X' shown in FIGS. 7G and 8A-8C with regard to separate operations of the method shown in FIG. 6, according to some example embodiments.
Figure 10B:
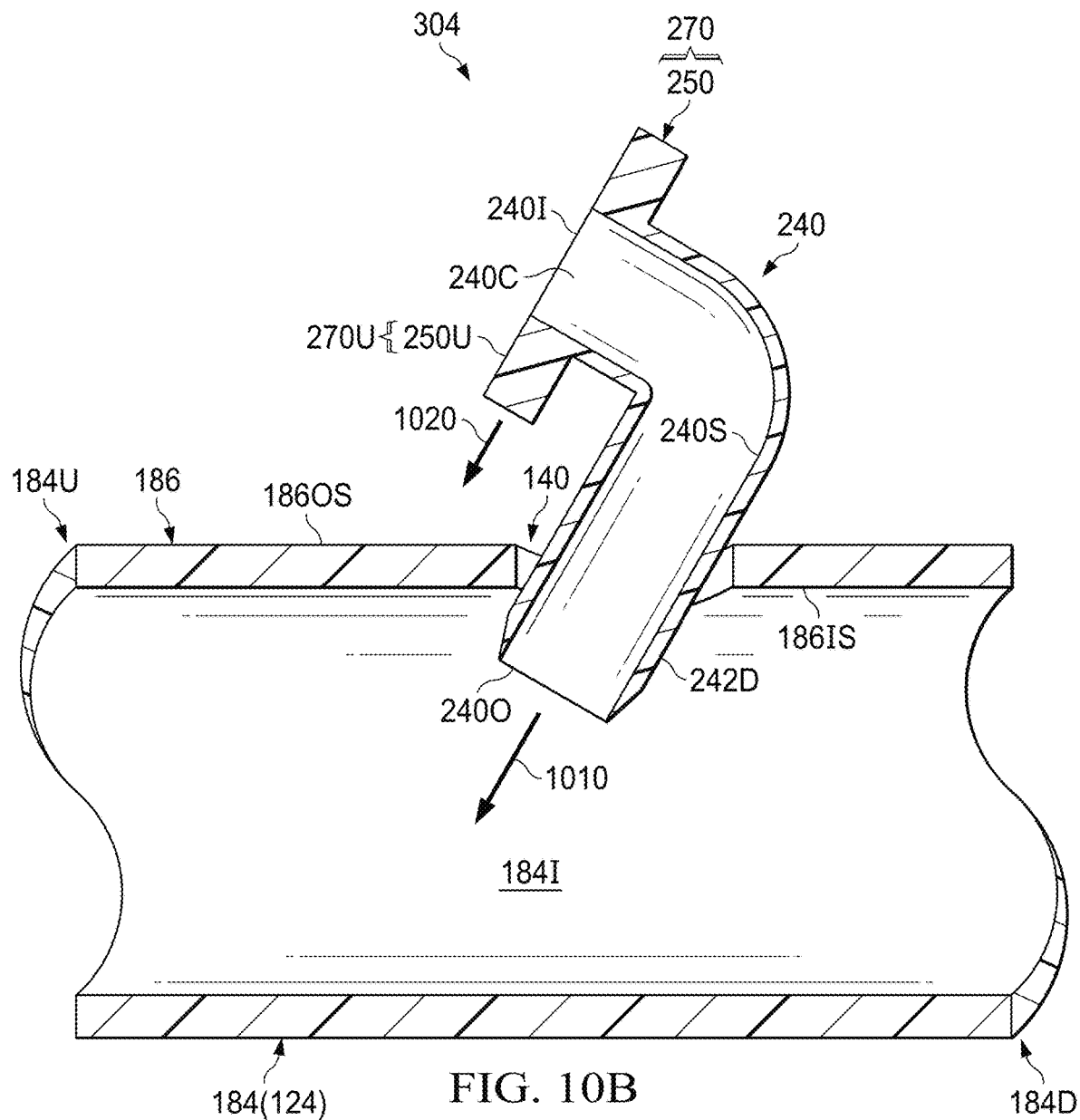
Figure 10C:
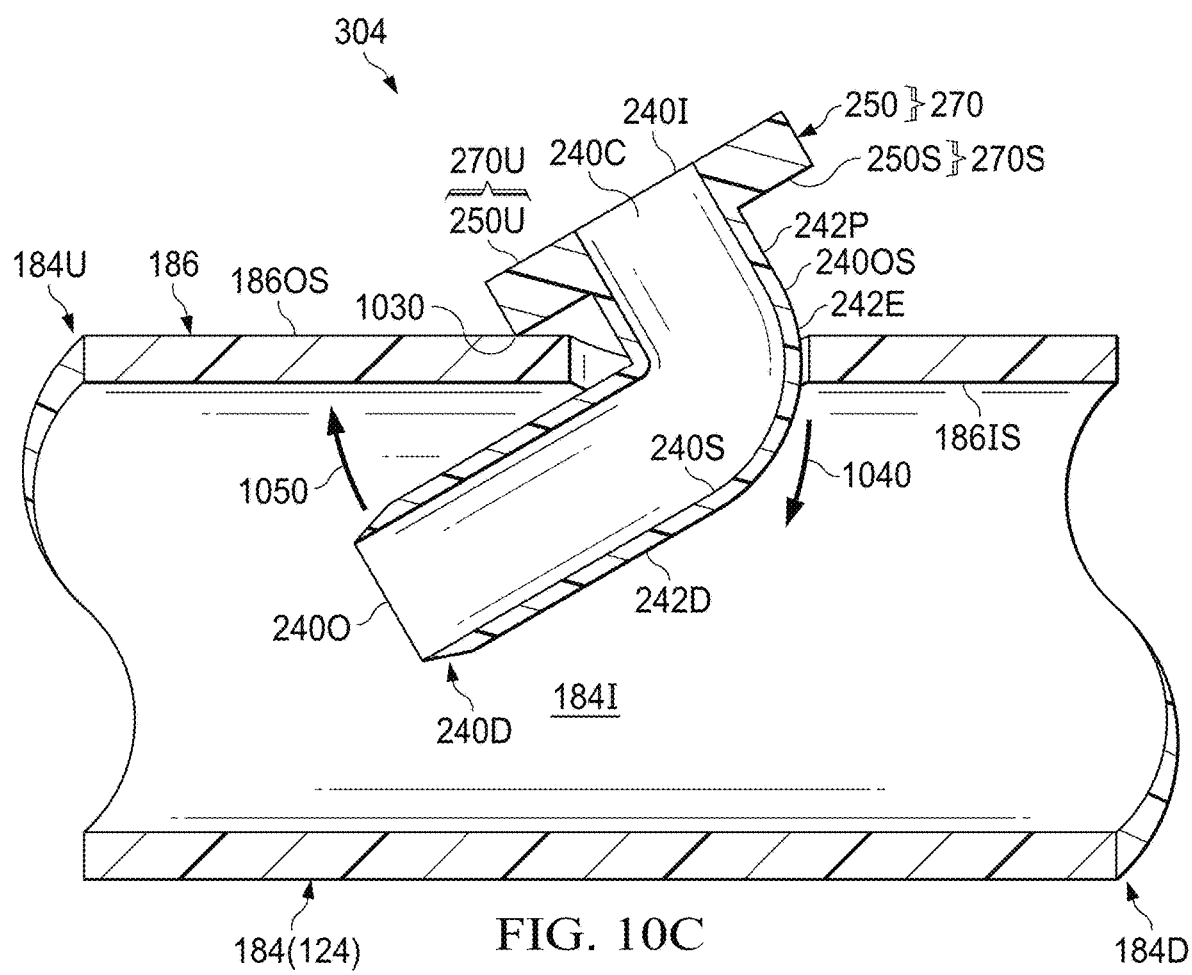
Figure 11A:
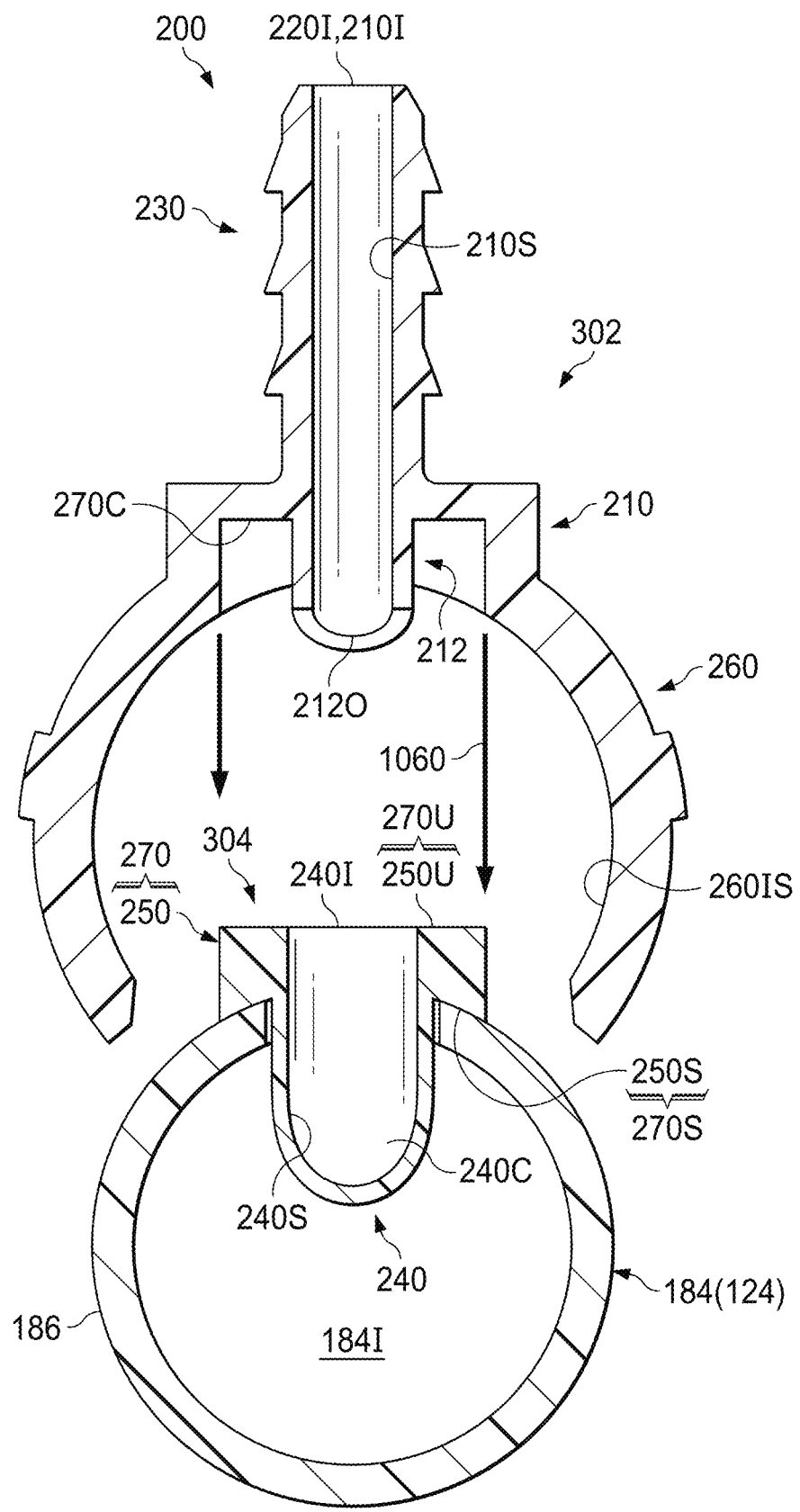
FIG. 11A is an elevation cross-sectional view of a conduit section and adaptor device being coupled thereto along view lines XIA-XIA' in FIG. 10D, according to some example embodiments.
Figure 11B:
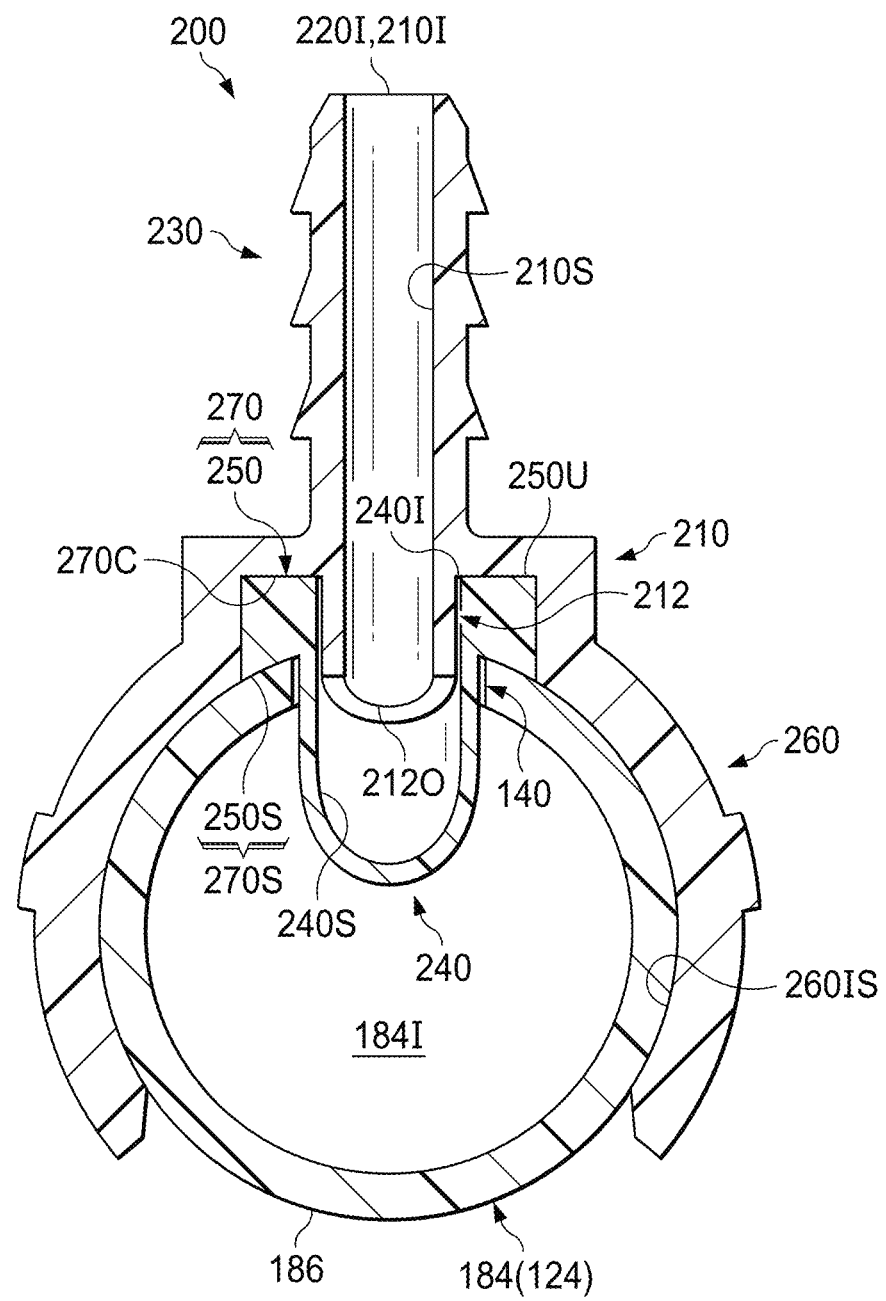
FIG. 11B is an elevation cross-sectional view of a conduit section and adaptor device being coupled thereto along view lines XIB-XIB' in FIG. 10E, according to some example embodiments.

As shown in at least FIGS. 8A and 10B-10C, the inserting the elbow nozzle 240 through the access point opening 140 may include inserting 1010 the distal nozzle section 242D through the access point opening 140 to cause a base structure 270 coupled to and/or defined by the proximate nozzle section 242P of the elbow nozzle 240 to approach 1020 the outer sidewall surface 186OS of the conduit section 184. As shown in FIG. 10C, based on the base structure 270 contacting the outer sidewall surface 186OS at least at a contact point 1030, at least the elbow joint 242E (and in some example embodiments, at least a portion of the proximate nozzle section 242P) may be pivoted 1040 around the contact point 1030 to be lowered through the access point opening 140 and at least partially into the conduit section interior 184I.

The outer diameter and/or curvature of at least the elbow joint 242E may be configured to enable such pivoting of at least the elbow joint 242E through the access point opening 140. For example, the outer diameter 240W of the elbow nozzle 240 along the elbow joint 242E may be less than (e.g., 10% less than, 20% less than, etc.) the diameter 140W of the access point opening 140, and the curvature of the elbow joint 242E between opposite ends thereof may be at least large enough, based on the outer diameter 240W of the elbow nozzle 240 along the elbow joint 242E, to enable the elbow joint 242E to be inserted partially or entirely through the access point opening 140 based at least in part upon being pivoted 1040 to enable the distal end 240D of the elbow nozzle 240 to pivot 1050 upwards to cause the central axis 240LA to extend partially or entirely paraxial to the longitudinal axis 184LA of the conduit section 184.

As further shown in FIG. 10C, such pivoting 1040 may cause the distal end 240D of the elbow nozzle 240 that defines the elbow conduit outlet 240O to pivot 1050 around the contact point 1030 to be raised within the conduit section interior 184I towards the inner sidewall surface 186IS into an upper portion of the conduit section interior 184I (e.g., upper portion 202U as shown in FIG. 2A). As a result, and as shown, the inserting the elbow nozzle 240 through the access point opening 140 at S622 may cause the elbow nozzle 240 to extend through the access point opening 140 and to further extend within the conduit section interior 184I such that the distal nozzle section 242D is between (e.g., entirely between) the longitudinal axis 184LA of the conduit section and an inner sidewall surface 186IS of the conduit section sidewall in a direction extending perpendicular to the longitudinal axis 184LA. As a result, and as shown, the distal nozzle section 242D may be entirely in an upper portion 202U of the conduit section 184 and the elbow nozzle 240 and the adaptor device 200 may be entirely absent from the lower portion 202L of the conduit section 184 to thereby reduce, minimize, or prevent the likelihood that a fluid 120 passing through the conduit 124 (e.g., in the lower portion 202L) may interact with the elbow nozzle 240 and/or the adaptor device 200, thereby reducing, minimizing, or preventing clogging of the adaptor conduit 220 by such fluid 120 and further reducing, minimizing, or preventing obstructions to the flow of the fluid 120 through the conduit 124 by the adaptor device 200.

Figure 10D:
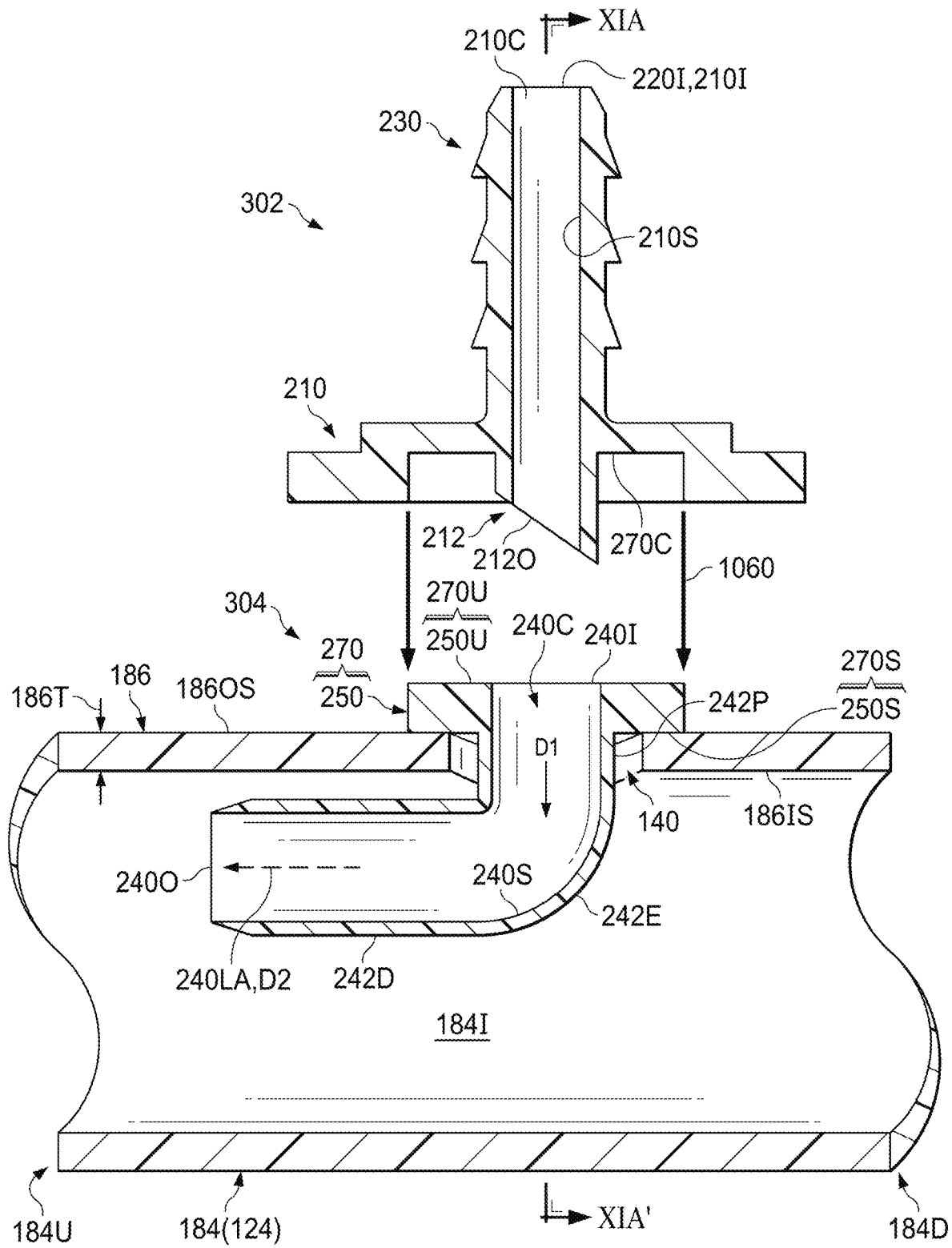
Figure 10E:
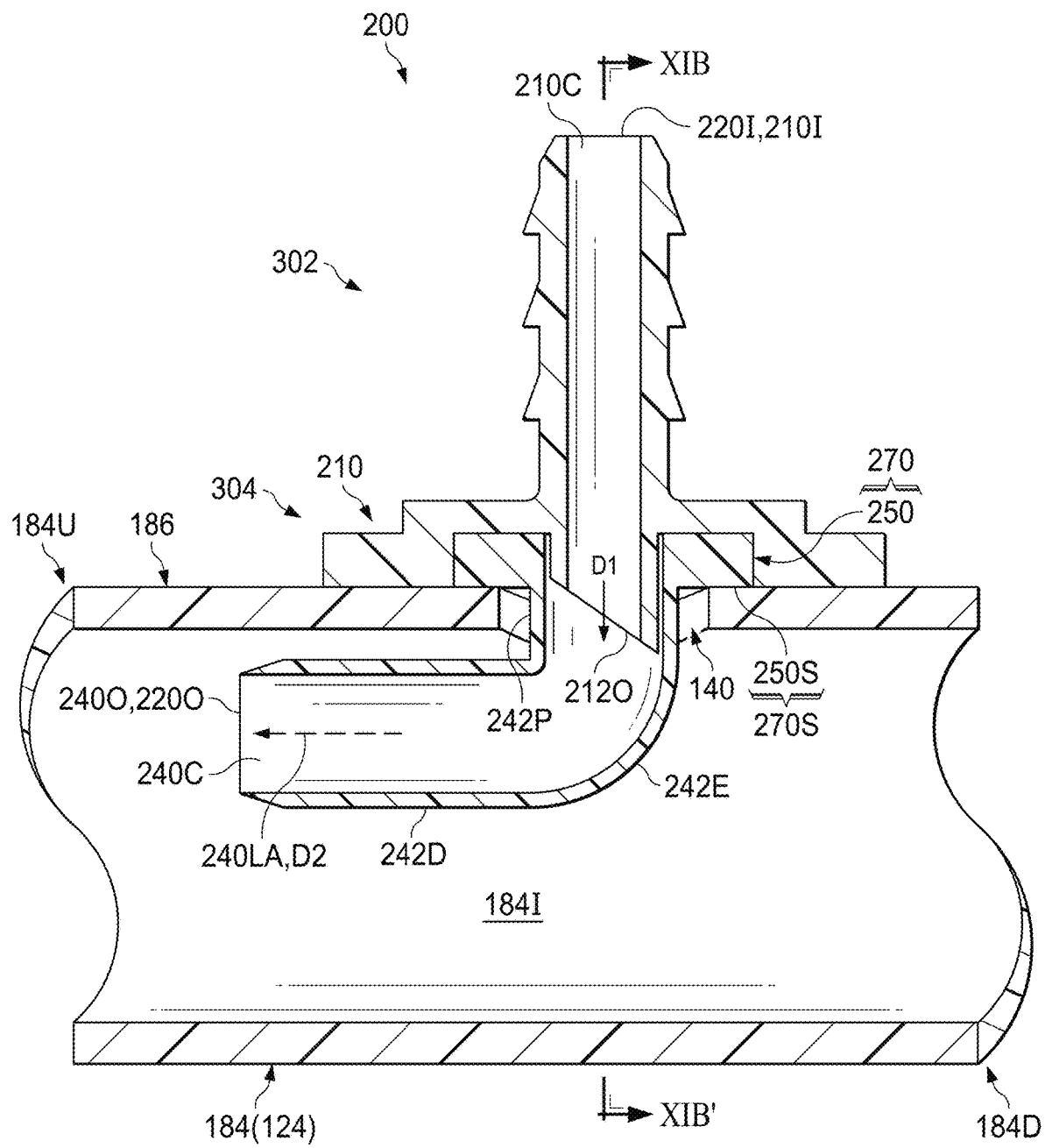

As further shown in FIGS. 8B, 10D, and 11A, the elbow nozzle 240 may be pivoted around the contact point 1030 until the lower surface 270S of the base structure 270 (which, in some example embodiments, may also define the lower surface 250S of a sealing member 250) engages the outer sidewall surface 186OS, for example to establish a flush, complementary contact between the lower surface 270S of the base structure 270 and the outer sidewall surface 186OS. As a result of such contact, where the lower surface 270S is curved in a circumferential (e.g., azimuthal) direction corresponding to the cylindrical curvature (e.g., circumferential curvature, azimuthal curvature, etc.) of the outer sidewall surface 186OS and is straight in an axial direction corresponding to the axial extension of the cylindrical outer sidewall surface 186OS, and further where at least the distal nozzle section 242D of the elbow nozzle 240 is configured to define the distal conduit section 244D to extend in the same axial direction perpendicular to the curvature of the lower surface 270S as shown, the engagement (e.g., complementary, flush engagement) of the base structure 270 with the outer sidewall surface 186OS may cause the elbow nozzle 240 to be oriented in relation to the conduit section sidewall 186 within the conduit section interior 184I to cause the central axis 240LA of the elbow conduit outlet 240O (e.g., adaptor outlet 220O) to extend in the axial direction defined by of the cylindrical outer sidewall surface 186OS and thus to extend at least partially (e.g., partially or entirely) paraxial to the longitudinal axis 184LA of the conduit section 184 as defined by the conduit section sidewall 186, such that the elbow nozzle 240 extends through the access point opening 140 in a first direction D1 into the conduit section interior 184I and further extends to the distal end 240D within the conduit section interior 184I in a second direction D2 that is different from the first direction D1 and at least partially paraxial to a longitudinal axis 184LA of the conduit section 184 such that a central axis 240LA of the elbow conduit outlet 240O (and thus the central axis of the adaptor outlet 220O) extends in the second direction D2 within the conduit section interior 184I.

As shown in FIGS. 6, 8C, and 10D-10E, and 11A-11B, the coupling the adaptor device 200 at S620 may include, at S624, coupling an adaptor conduit structure 210 to the conduit section 184. As shown, the adaptor conduit structure 210 may be a part of a base structure 302 that may further include at least a conduit connector 260, an outlet nozzle 212, an inlet nozzle 232, an inlet connector 230, or the like, but example embodiments are not limited thereto.

The coupling at S624 may include engaging a conduit connector 260 of with at least a portion of the conduit section 184 such that the lower end 210L of the adaptor conduit structure 210 is proximate to an outer sidewall surface 186OS of the conduit section sidewall 186 and the upper end 210U of the adaptor conduit structure 210 is distal from the outer sidewall surface 186OS of the conduit section sidewall 186. The coupling at S624 may include coupling the adaptor conduit structure 210 with the elbow nozzle 240. As shown, the adaptor conduit structure 210 and the elbow nozzle 240 may comprise separate pieces of material (e.g., structures 302 and 304, respectively), such that the coupling at S624 may include coupling the base structure 302 with the elbow nozzle structure 304 to couple the adaptor conduit structure 210 to the elbow nozzle 240. Such coupling at S624 may include coupling the adaptor conduit structure 210 to a proximate end 240P of the elbow nozzle 240 such that the conduit connector 260 holds at least the proximate end 240P of the elbow nozzle 240 in place between a portion of the adaptor conduit structure 210 and the outer sidewall surface 186OS of the conduit section 184, and the elbow conduit 240C is connected with the base conduit 210C to define the adaptor conduit 220. The coupling may include coupling the elbow conduit inlet 240I to the base conduit outlet 212O to connect the elbow conduit 240C with the base conduit 210C to define the adaptor conduit 220.

As shown, at least a portion of the elbow nozzle structure 304 (e.g., the base structure 270) may be inserted into a complementary cavity 270C defined in the adaptor conduit structure 210 to couple the adaptor conduit structure 210 to the elbow nozzle 240, for example to establish a friction fit therebetween, but example embodiments are not limited thereto. The cavity 270C and a portion of the elbow nozzle 240 and/or structure 304 including same (e.g., at least the base structure 270) may have complementary, radially asymmetrical shaped portions and/or alignment structures 270N, 210N that cause the elbow nozzle 240 to be oriented in a particular direction in relation to the adaptor conduit structure 210 based on the coupling at S624. For example, such coupling may cause at least the distal conduit section 244D and/or the central axis 240LA of the elbow conduit outlet 240O (and thus the adaptor outlet 220O) to extend in a particular direction in relation to the adaptor conduit structure 210, so that the distal conduit section 244D and/or the central axis 240LA of the elbow conduit outlet 240O extend in a second direction D2 that is partially or entirely paraxial to the longitudinal axis 264LA of the cylindrical gap space 264 at least partially defined by the lower end 210L of the adaptor conduit structure 210 and the inner surface(s) 260IS of the conduit connector 260. In some example embodiments, the conduit connector 260 may, based on coupling with the conduit section 184, cause the adaptor conduit structure 210 to exert a compression force on the elbow nozzle structure 304 (e.g., on the base structure 270) to hold at least a portion of the elbow nozzle structure 304 between the adaptor conduit structure 210 and the outer sidewall surface 186OS of the conduit section 184.

As shown, based on the adaptor conduit structure 210 being coupled with the elbow nozzle 240, the base conduit 210C may be coupled to and/or directly exposed to the elbow conduit 240C such that the adaptor conduit structure 210 and the elbow nozzle 240 collectively define an adaptor conduit 220C that includes the base conduit 210C and the elbow conduit 240C and extends from the adaptor inlet 220I of the adaptor conduit structure 210, which is external to the conduit section 184, to the adaptor outlet 220O, defined by the elbow conduit outlet 240O, which is facing in the second direction D2 within the conduit section interior 184I (e.g., at least partially paraxial to the longitudinal axis 184LA of the conduit section 184). As shown, the second direction D2 may be perpendicular to the first direction D1 in which at least the proximate conduit section 244P may extend through the access point opening 140 into the conduit section interior 184I, for example such that the second direction D2 (and thus central axis 240LA) may be paraxial to the longitudinal axis 184LA of the conduit section 184, but example embodiments are not limited thereto.

As shown, in some example embodiments the adaptor conduit structure 210 may include an outlet nozzle 212 extending from the lower end 210L of the adaptor conduit structure 210 to define the base conduit outlet 212O and at least a portion of the base conduit 210C adjacent to the base conduit outlet 212O. As shown, in at least FIGS. 10D-10E and 11A-11B, the coupling at S624 may include inserting at least a portion of the outlet nozzle 212 into the elbow conduit 240C through the elbow conduit inlet 240I to thereby establish the adaptor conduit 220C extending through the base conduit 210C and the outlet nozzle 212 into the elbow conduit 240C. As shown, the outlet nozzle 212 may define the base conduit outlet 212O to be angled in relation to a longitudinal axis 212LA of the outlet nozzle 212, but example embodiments are not limited thereto.

Still referring to FIGS. 10D-10E and 11A-11B, the adaptor device 200 may include a sealing member 250 at a lower end 210L of the adaptor conduit structure 210 of the adaptor device (e.g., projecting downwards from the lower end 210L by a protrusion distance 250P). For example, at least the base structure 270 of the elbow nozzle structure 304 (and in some example embodiments, the entire elbow nozzle structure 304 comprising the base structure 270 and the elbow nozzle 240) may comprise a flexible, deformable, and/or elastic material (e.g., silicone) that defines the sealing member 250, such that the lower surface 270S of the base structure 270 defines a lower surface 250S of the sealing member 250. The coupling the adaptor conduit structure 210 (e.g., included in the base structure 302) to the elbow nozzle 240 (e.g., included in the elbow nozzle structure 304) may cause the sealing member 250 to be received at least partially into the cavity 270C of the adaptor conduit structure 210 so that a portion of the sealing member 250 projects out from the lower end 210L of the adaptor conduit structure 210 by a protrusion distance 250P. The coupling the adaptor device 200 to the conduit section 184 may cause the sealing member 250 to seal at least an outer edge 140E of the access point opening 140. For example, based on the sealing member 250 extending (e.g., protruding) from the lower end 210L of the adaptor conduit structure 210 by a protrusion distance 250P and/or based on the sealing member 250 comprising a flexible, deformable, and/or elastic material (e.g., silicone), the coupling of the adaptor device 200 to the conduit section 184 at S620 may cause lower end 210L to come into direct contact with the outer sidewall surface 186OS to thereby cause the protruding portion of the sealing member 250 that protrudes from the lower end 210L by the protrusion distance 250P to be compressed to establish a seal that axially covers and/or surrounds the outer edge 140E of the access point opening 140 and may further or alternatively cause the sealing member 250 to move at least partially into the access point opening 140 from the outer end thereof to thereby improve the sealing of the outer edge 140E of the access point opening 140.

As shown in at least FIGS. 10D and 11A, the inserting the elbow nozzle into the access point opening 140 at S622 may cause the sealing member 250 to cover at least the outer edge 140E of the access point opening 140. As shown in at least FIGS. 10E and 11B, the coupling the adaptor conduit structure 210 to the conduit section 184 at S624 so as to be coupled to the elbow nozzle 240 may the sealing member 250 to be at least partially compressed towards the outer sidewall surface 186OS of the conduit section 184. For example, the conduit connector 260 may, based on coupling with the conduit section 184, cause the adaptor conduit structure 210 to exert a force on the upper surface 250U of the sealing member 250 to compress the sealing member 250 between the adaptor conduit structure 210 and the outer sidewall surface 186OS of the conduit section 184, which may improve the quality of the seal of the outer edge 140E of the access point opening 140 by the sealing member 250.

In some example embodiments, the adaptor device 200 may include an inlet connector 230 that is configured to couple with a fluid supply source 150 (e.g., via coupling with a fluid supply conduit 170) to cause the adaptor inlet 220I of the adaptor device 200 to be in fluid communication with the fluid supply source 150. Accordingly, and as shown in FIGS. 6 and 2A-2B, at S626 the inlet connector 230 of the adaptor device 200 may be coupled to the inlet connector to the fluid supply source 150 (e.g., based on coupling with an end of the fluid supply conduit 170 that is coupled at an opposite end of the fluid supply conduit 170 to an outlet 152 of the fluid supply source 150) to establish fluid communication between the fluid supply source 150 and the conduit section interior through at least the adaptor conduit 220C and the access point opening 140.

At S628, the method may include operating the fluid supply source 150 (e.g., based on a processor (e.g., central processing unit or CPU) of the fluid supply source 150 executing a program of instructions stored on a memory (e.g., solid state drive storage device)) to supply (e.g., discharge, dispense, supply, etc.) an amount of the fluid 160 from the outlet 152 such that the fluid 160 is received at the adaptor inlet 220I from the fluid supply source 150 (e.g., via the fluid supply conduit 170) and the adaptor device 200 directs the received fluid 160 to flow through the adaptor conduit 220C and into the conduit section interior 184I in a fluid stream 160S in a particular flow direction 160D at least partially defined by the direction of the central axis of the adaptor outlet 220O (e.g., 240LA) in the conduit section interior 184I and/or the second direction D2 in which at least the distal nozzle section 242D of the elbow nozzle 240 extends within the conduit section interior 184I.

In some example embodiments, and as shown in FIG. 1, the system 100 may be an air conditioning system, the process unit 102 may be an air handler of the air conditioning system, the conduit 124 may be a condensate drain line of the air conditioning system which is configured to direct condensate from a drip pan of the air handler of the air conditioning system to a condensate drain outlet (e.g., conduit outlet 130) through at least the conduit section interior 184I, the fluid 160 may be a cleaning composition configured to remove, clean, mitigate, break down, etc. biological substances, the fluid supply source 150 may be a cleaner dispensing system that is configured to operate to dispense an amount of the cleaning composition (e.g., at a fixed time interval), and the method may include, at S628, operating the cleaner dispensing system to dispense the cleaning composition, such that the adaptor device 200 directs the cleaning composition dispensed by the cleaner dispensing system through the adaptor conduit and into the conduit section interior in a particular flow direction 160D that is directed "upstream" within the conduit 124, opposite to the flow direction 120D of condensate fluid 120 out of the drip pan 122 of the air handler process unit 102, so that the cleaning composition fluid 160 may be directed by the adaptor device 200 to flow in the fluid stream 160S through the upstream end 184U of the conduit section 184, through at least an upstream conduit portion 124U of the conduit 124 and at least partially into the drip pan 122 of the air handler process unit 102 to at least partially mitigate biological material accumulation in the drip pan 122 and/or in the upstream conduit portion 124U of the condensate drain line conduit 124 and to further subsequently flow along the flow direction 120D through some or all of the length of the conduit 124 from the conduit inlet 128 to the conduit outlet 130 to at least partially mitigate biological material accumulation in the downstream conduit portion 124D of the conduit 124. As a result, the operating at S628 may enable at least partial mitigation of biological material accumulation throughout potentially an entire length of the condensate drain line conduit 124 between the conduit inlet 128 and the conduit outlet 130 and to further enable at least partial mitigation of biological material accumulation in at least a portion of the air handler drip pan 122 via an upstream flow of the cleaning composition fluid 160 through the conduit 124 from an access point opening 140 that is downstream of the conduit inlet 128 and the drip pan 122. Accordingly, the adaptor device 200 may enable biological material mitigation in an air conditioning system, for example along the entirety of the length of the condensate drain line conduit 124 between the conduit inlet 127 and conduit outlet 130 and further in the drip pan 122, without requiring a direct fluid supply access point opening into the air handler process unit 102 at a point that is upstream of the drip pan 122 to facilitate fluid 160 supply into the drip pan 122 from an upstream location. Thus, the adaptor device 200 may enable reduced installation and operating costs and complexity to provide such biological material accumulation mitigation in the air conditioning system to improve performance of the system based on mitigating the risk of damage due to condensate fluid 120 backflow through the conduit 124 and/or the drip pan 122 due to biological material accumulation therein.

As described herein, any portion of the adaptor device 200 and/or the installation guide device 400, including the adaptor conduit structure 210, the conduit connector 260, the outlet nozzle 212, the inlet nozzle 232, the base structure 302, the elbow nozzle structure 304, the base structure 270, the elbow nozzle 240, the drill bit device 410, the sheath structure 414, the guide device 420, the protrusion stop structure 430, the guide connector 440, any combination thereof, or the like may at least partially comprise include any material, including any plastic material, any polymer material, any metal material, or the like, including for example any molded plastic material, polyvinyl chloride (PVC), polypropylene (PP), polyethylene terephthalate (PET), polymethyl methacrylate (PMMA), high density polyethylene (HDPE), low density polyethylene (LDPE), acrylonitrile butadiene styrene (ABS), styrene acrylonitrile (SAN), steel, silicone, any combination thereof, or the like.

As described herein, a single, unitary piece of material that may at least partially comprise any portions, sections, structures, any combination thereof, or the like of the adaptor device 200, the installation guide device 400, or any combination thereof may include any material, including any plastic material, any polymer material, any metal material, or the like, including for example any molded plastic material, polyvinyl chloride (PVC), polypropylene (PP), polyethylene terephthalate (PET), polymethyl methacrylate (PMMA), high density polyethylene (HDPE), low density polyethylene (LDPE), acrylonitrile butadiene styrene (ABS), styrene acrylonitrile (SAN), steel, silicone, any combination thereof, or the like.

It will be understood that the adaptor device 200 according to any of the example embodiments, and the installation guide device 400 according to any of the example embodiments may collectively comprise a system for providing a fluid connection into a conduit section interior 184I of a conduit section 184 of a conduit 124 through a sidewall thickness 186T of a conduit section sidewall 186 of the conduit section 184.

Some Example Embodiments of the inventive concepts are as follows below:

Example Embodiment 1: An adaptor device (200) configured to establish a fluid connection between a fluid supply source (150) and a conduit section (184) of a conduit (124) through an access point opening (140) into a conduit section interior (184I) of the conduit section, the access point opening extending through a sidewall thickness (186T) of a conduit section sidewall (186) of the conduit section, the adaptor device comprising:
  an adaptor conduit structure (210) having an upper end (210U) and a lower end (210L), the adaptor conduit structure at least partially defining a base conduit (210C) extending from an adaptor inlet (220I) to a base conduit outlet (212O),
  a conduit connector (260) configured to engage at least a portion of the conduit section to couple the adaptor device to the conduit section such that the lower end of the adaptor conduit structure is proximate to an outer sidewall surface (186OS) of the conduit section sidewall and the upper end of the adaptor conduit structure is distal from the outer sidewall surface of the conduit section sidewall; and
  an elbow nozzle (240) configured to extend to a distal end (240D) from the lower end of the adaptor conduit structure, the elbow nozzle defining an adaptor outlet (220O) at the distal end, the elbow nozzle further defining an elbow conduit (240C) extending to the adaptor outlet, the elbow nozzle configured to expose the elbow conduit to the base conduit to collectively define an adaptor conduit (220) extending between the adaptor inlet and the adaptor outlet,
  wherein the elbow nozzle is configured to at least partially extend through the access point opening in a first direction (D1) into the conduit section interior and to further extend to the distal end within the conduit section interior in a second direction (D2) that is different from the first direction and at least partially paraxial to a longitudinal axis (184LA) of the conduit section such that a central axis (240LA) of the adaptor outlet extends in the second direction within the conduit section interior.

Example Embodiment 2: The adaptor device of Example Embodiment 1, wherein
  the conduit includes a condensate drain line (124) of an air conditioning system (100) and is configured to direct condensate from a drip pan (122) of an air handler (102) of the air conditioning system to a condensate drain outlet (130) through at least the conduit section interior;
  the fluid supply source includes a cleaner dispensing system (150) configured to dispense a cleaning composition (160); and the adaptor device is configured to, based on being coupled to both the conduit section and the fluid supply source,
receive the cleaning composition at the adaptor inlet from the cleaner dispensing system based on the cleaner dispensing system dispensing the cleaning composition through an outlet (152) thereof, and
direct the received cleaning composition through the adaptor conduit and into the conduit section interior to be supplied into the condensate drain line to cause at least some biological material to be removed from at least a portion of the condensate drain line.

Example Embodiment 3: The adaptor device of Example Embodiments 1 or 2, wherein
the first direction is perpendicular to the longitudinal axis of the conduit section, and
the second direction is perpendicular to the first direction and is paraxial to the longitudinal axis of the conduit section.

Example Embodiment 4: The adaptor device of any of Example Embodiments 1 to 3, wherein the elbow nozzle includes
a proximate nozzle section (242P) defining a proximate conduit section (244P) extending from an elbow conduit inlet (240I) in the first direction,
a distal nozzle section (242D) defining the distal end of the elbow nozzle, further defining the adaptor outlet, and further defining a distal conduit section (244D) extending to the adaptor outlet in the second direction, and
an elbow joint (242E) connecting the proximate nozzle section and the distal nozzle section, the elbow joint defining an elbow joint conduit section (244E) extending between the proximate conduit section and the distal conduit section such that the proximate conduit section, the elbow joint conduit section, and the distal conduit section collectively define the elbow conduit.

Example Embodiment 5: The adaptor device of any of Example Embodiments 1 to 4, wherein
the elbow nozzle is configured to extend through the access point opening and to further extend within the conduit section interior such that the distal nozzle section is between the longitudinal axis of the conduit section and an inner sidewall surface of the conduit section sidewall.

Example Embodiment 6: The adaptor device of any of Example Embodiments 1 to 5, wherein the elbow nozzle and the adaptor conduit structure comprise separate pieces of material, the elbow nozzle configured to be coupled to the adaptor conduit structure to connect the base conduit and the elbow conduit to collectively define the adaptor conduit.

Example Embodiment 7: The adaptor device of any of Example Embodiments 1 to 6, wherein the elbow nozzle comprises silicone.

Example Embodiment 8: The adaptor device of any of Example Embodiments 1 to 7, further comprising:
an inlet connector (230) configured to couple with the fluid supply source externally to the conduit to cause the adaptor inlet to be in fluid communication with the fluid supply source.

Example Embodiment 9: The adaptor device of any of Example Embodiments 1 to 8, wherein the inlet connector is a fitting configured to engage an inner surface (170IS) of a fluid supply conduit (170) based on being inserted into the fluid supply conduit.

Example Embodiment 10: The adaptor device of any of Example Embodiments 1 to 9, wherein the conduit connector includes a clamp (266) that is configured to directly engage and clamp the outer sidewall surface to couple the adaptor device to the conduit.

Example Embodiment 11: The adaptor device of any of Example Embodiments 1 to 10, wherein
the adaptor conduit structure includes an outlet nozzle (212) extending from the lower end of the adaptor conduit structure, the outlet nozzle configured to extend into at least a portion of the elbow nozzle.

Example Embodiment 12: The adaptor device of any of Example Embodiments 1 to 11, wherein the outlet nozzle defines an opening (212O) that is angled in relation to a longitudinal axis (212LA) of the outlet nozzle.

Example Embodiment 13: The adaptor device of any of Example Embodiments 1 to 12, further comprising a sealing member (250) configured to seal at least an outer edge (140E) of the access point opening based on the conduit connector coupling the adaptor device to the conduit.

Example Embodiment 14: The adaptor device of any of Example Embodiments 1 to
13, wherein the sealing member is coupled to the elbow nozzle.

Example Embodiment 15: A system, comprising:
the adaptor device of any of Example Embodiments 1 to 14; and
an installation guide device (400) configured to form the access point opening through the sidewall thickness of the conduit section sidewall, the installation guide device including
a drill bit device (410) configured to drill through the sidewall thickness of the conduit section sidewall,
a guide conduit (422) having at least a lower guide opening (422O), the installation guide device configured to enable longitudinal movement of the drill bit device at least partially through the guide conduit and at least partially through the lower guide opening, and
a protrusion stop structure (430) configured to limit longitudinal protrusion of the drill bit device from the lower guide opening to a particular protrusion distance (452).

Example Embodiment 16: A method to provide a fluid connection into a conduit section interior (184I) of a conduit section (184) of a conduit (124) through a sidewall thickness (186T) of a conduit section sidewall (186) of the conduit section, the method comprising:
inserting an elbow nozzle (240) through an access point opening (140) through the sidewall thickness and into the conduit section interior, the elbow nozzle defining an elbow conduit (240C) extending to an adaptor outlet (220O) at a distal end (240D) of the elbow nozzle, wherein the inserting causes the elbow nozzle to extend through the access point opening in a first direction (D1) into the conduit section interior and to further extend to the distal end within the conduit section interior in a second direction (D2_that is different from the first direction and at least partially paraxial to a longitudinal axis (184LA) of the conduit section such that a central axis (240LA) of the adaptor outlet extends in the second direction within the conduit section interior; and
coupling an adaptor conduit structure (210) to the conduit section, the adaptor conduit structure having an upper end (210U) and a lower end (210L), the adaptor conduit structure defining a base conduit (210C) extending from an adaptor inlet (220I), the coupling including engaging a conduit connector (260) with at least a portion of the conduit section such that
the lower end of the adaptor conduit structure is proximate to an outer sidewall surface (186OS) of the conduit section sidewall and the upper end of the adaptor conduit structure is distal from the outer sidewall surface of the conduit section sidewall, and
the adaptor conduit structure and the elbow nozzle collectively define an adaptor conduit (220) that includes the base conduit and the elbow conduit and extends from the adaptor inlet external to the conduit section to the adaptor outlet facing in the second direction within the conduit section interior.

Example Embodiment 17: The method of Example Embodiment 16, further comprising forming the access point opening prior to inserting the elbow nozzle through the access point opening, the forming the access point opening including
coupling an installation guide device (400) to the conduit, the installation guide device including a drill bit device (410) configured to drill through the sidewall thickness of the conduit, the installation guide device including a guide conduit (422) having at least a lower guide opening (422O), the installation guide device configured to enable longitudinal movement of the drill bit device at least partially through the guide conduit and at least partially through the lower guide opening, the installation guide device including a protrusion stop structure (430) configured to limit longitudinal protrusion of the drill bit device from the lower guide opening to a particular protrusion distance (452), the coupling the installation guide device to the conduit aligns the lower guide opening with an access point location (600) on the outer sidewall surface of the conduit;
operating the drill bit device while the installation guide device is coupled to the conduit to cause the drill bit device to move longitudinally at least partially through the lower guide opening to a protrusion distance that is equal to or less than the particular protrusion distance, such that the drill bit device drills through the sidewall thickness of the conduit from the access point location to form the access point opening; and
decoupling the installation guide device from the conduit to expose the access point opening.

Example Embodiment 18: The method of Example Embodiments 16 or 17, wherein the first direction is perpendicular to the longitudinal axis of the conduit section, and
the second direction is perpendicular to the first direction and is paraxial to the longitudinal axis of the conduit section.

Example Embodiment 19: The method of any of Example Embodiments 16 to 18, wherein the elbow nozzle includes
a proximate nozzle section (242P) defining a proximate conduit section (244P) extending from an elbow conduit inlet (240I) in the first direction,
a distal nozzle section (242D) defining the distal end of the elbow nozzle, further defining the adaptor outlet, and further defining a distal conduit section (244D) extending to the adaptor outlet in the second direction, and
an elbow joint (242E) connecting the proximate nozzle section and the distal nozzle section, the elbow joint defining an elbow joint conduit section (244E) extending between the proximate conduit section and the distal conduit section such that the proximate conduit section, the elbow joint conduit section, and the distal conduit section collectively define the elbow conduit.

Example Embodiment 20: The method of any of Example Embodiments 16 to 19, wherein
the inserting the elbow nozzle through the access point opening causes the elbow nozzle to extend through the access point opening and to further extend within the conduit section interior such that the distal nozzle section is between the longitudinal axis of the conduit section and an inner sidewall surface of the conduit section sidewall.

Example Embodiment 21: The method of any of Example Embodiments 16 to 20, wherein
the elbow nozzle and the adaptor conduit structure comprise separate pieces of material; and
the coupling the adaptor conduit structure to the conduit section includes coupling the adaptor conduit structure to a proximate end (240P) of the elbow nozzle such that the conduit connector holds at least the proximate end of the elbow nozzle in place between a portion of the adaptor conduit structure and the outer sidewall surface of the conduit section, and
the elbow conduit is connected with the base conduit to define the adaptor conduit.

Example Embodiment 22: The method of any of Example Embodiments 16 to 21, wherein
the adaptor conduit structure includes an outlet nozzle (212) extending from the lower end of the adaptor conduit structure, and
the coupling the adaptor conduit structure to the conduit section includes inserting the outlet nozzle into the elbow conduit.

Example Embodiment 23: The method of any of Example Embodiments 16 to 22, wherein the outlet nozzle defines an opening (212O) that is angled in relation to a longitudinal axis (212LA) of the outlet nozzle.

Example Embodiment 24: The method of any of Example Embodiments 16 to 23, wherein the elbow nozzle comprises silicone.

Example Embodiment 25: The method of any of Example Embodiments 16 to 24, wherein
the adaptor conduit structure includes an inlet connector (230) that is configured to couple with a fluid supply source (150) to cause the adaptor inlet to be in fluid communication with the fluid supply source; and
the method further includes coupling the inlet connector to the fluid supply source to establish fluid communication between the fluid supply source and the conduit section interior through at least the adaptor conduit and the access point opening.

Example Embodiment 26: The method of any of Example Embodiments 16 to 25, wherein
the conduit includes a condensate drain line (124) of an air conditioning system (100) and is configured to direct condensate from a drip pan (122) of an air handler (102) of the air conditioning system to a condensate drain outlet (130) through at least the conduit section interior;
the fluid supply source includes a cleaner dispensing system (150) configured to dispense a cleaning composition; and
the method further includes operating the cleaner dispensing system to dispense the cleaning composition, such that the cleaning composition dispensed by the cleaner dispensing system is directed through the adaptor conduit and into the conduit section interior to be supplied into the condensate drain line to cause at least some biological material to be removed from at least a portion of the condensate drain line.

Example Embodiment 27: The method of any of Example Embodiments 16 to 26, wherein the conduit connector includes a clamp (266), and the coupling the adaptor conduit structure to the conduit includes causing the clamp to directly engage and clamp the outer sidewall surface of the conduit section.

Example Embodiment 28: The method of any of Example Embodiments 16 to 27, wherein the coupling the adaptor conduit structure to the conduit includes causing a sealing member (250) to seal at least an outer edge (140E) of the access point opening.

Example Embodiment 29: The method of any of Example Embodiments 16 to 28, wherein the sealing member is coupled to the elbow nozzle, such that
the inserting the elbow nozzle into the access point opening causes the sealing member to cover at least the outer edge of the access point opening, and
the coupling the adaptor conduit structure to the conduit section causes the sealing member to be at least partially compressed towards the outer sidewall surface of the conduit section.

Some example embodiments have been disclosed herein; it should be understood that other variations may be possible. Such variations are not to be regarded as a departure from the spirit and scope of the present inventive concepts, and all such modifications as would be obvious to one skilled in the art are intended to be included within the scope of the following claims.

What is claimed is:

1. An adaptor device configured to establish a fluid connection through an access point opening into a conduit section interior of a conduit section of a conduit, the access point opening extending through a sidewall thickness of a conduit section sidewall of the conduit section, the adaptor device comprising:
    an adaptor conduit structure at least partially defining a base conduit extending from an adaptor inlet;
    a conduit connector, the conduit connector configured to engage at least a portion of the conduit section to couple the adaptor conduit structure to the conduit section such that the adaptor inlet of the adaptor conduit structure is external to the conduit; and
    an elbow nozzle at least partially defining an elbow conduit extending to an adaptor outlet, the elbow nozzle configured to couple with the adaptor conduit structure such that the elbow conduit and the base conduit at least partially collectively define an adaptor conduit extending between the adaptor inlet and the adaptor outlet through both the adaptor conduit structure and the elbow nozzle, the elbow nozzle configured to at least partially extend through the access point opening into the conduit section interior such that the adaptor outlet is within the conduit section interior and a central axis of the adaptor outlet extends at least partially parallel to a longitudinal axis of the conduit section within the conduit section interior,
    wherein the adaptor device is configured to direct a fluid to flow through the adaptor conduit and through the adaptor outlet as a fluid stream directed in a particular flow direction in the conduit section interior, the particular flow direction at least partially parallel to the longitudinal axis of the conduit section within the conduit section interior.

2. The adaptor device of claim 1, wherein
the adaptor device is configured to direct the fluid stream through an upper portion of the conduit section such that the fluid stream is at least partially vertically spaced apart in a vertical direction from a separate, lower portion of the conduit section, the vertical direction opposite to a direction of gravity, wherein
    the upper portion of the conduit section includes a portion of the conduit section interior above the longitudinal axis of the conduit section interior in relation to the direction of gravity, and
    the lower portion of the conduit section interior is a portion of the conduit section interior that is below the longitudinal axis in relation to the direction of gravity.

3. The adaptor device of claim 1, wherein
the conduit includes a condensate drain line of an air conditioning system, the conduit extending from a condensate drain inlet to a condensate drain outlet, the condensate drain line configured to receive condensate from an air handler of the air conditioning system at the condensate drain inlet, the conduit configured to direct the condensate from the condensate drain inlet to the condensate drain outlet through at least the conduit section interior; and
the adaptor device is configured to
    receive the fluid at the adaptor inlet, and
    direct the fluid through the adaptor conduit and into the conduit section interior via the access point opening and through the adaptor outlet in the conduit section interior in the particular flow direction, such that the adaptor device directs the fluid to flow through an interior of the condensate drain line at least partially in an upstream direction from the conduit section toward the condensate drain inlet.

4. The adaptor device of claim 1, wherein
the particular flow direction is parallel to the longitudinal axis of the conduit section.

5. The adaptor device of claim 1, wherein the elbow nozzle comprises silicone.

6. The adaptor device of claim 1, further comprising:
an inlet connector configured to couple with a fluid supply conduit external to the conduit to cause the adaptor inlet to be in fluid communication with the fluid supply conduit.

7. The adaptor device of claim 1, wherein the conduit connector includes a clamp that is configured to directly engage and clamp an outer sidewall surface of the conduit section sidewall to couple the adaptor conduit structure to the conduit section.

8. The adaptor device of claim 1, wherein the adaptor conduit structure includes an outlet nozzle configured to extend into at least a portion of the elbow nozzle.

9. The adaptor device of claim 1, further comprising a sealing member configured to seal at least an outer edge of the access point opening based on the conduit connector coupling the adaptor conduit structure to the conduit section.

10. A system, comprising:
the adaptor device of claim 1; and
an installation guide device configured to form the access point opening through the sidewall thickness of the conduit section sidewall, the installation guide device including
    a drill bit device configured to drill through the sidewall thickness of the conduit section sidewall,
    a guide conduit having at least a lower guide opening, the installation guide device configured to enable longitudinal movement of the drill bit device at least partially through the guide conduit and at least partially through the lower guide opening, and a protrusion stop structure configured to limit longitudinal protrusion of the drill bit device from the lower guide opening to a particular protrusion distance.

11. A method to provide a fluid connection into a conduit section interior of a conduit section of a conduit through a sidewall thickness of a conduit section sidewall of the conduit section, the method comprising:

inserting an elbow nozzle through an access point opening through the sidewall thickness and into the conduit section interior, the elbow nozzle at least partially defining an elbow conduit extending to an adaptor outlet, wherein the inserting causes the elbow nozzle to at least partially extend through the access point opening into the conduit section interior such that the adaptor outlet is within the conduit section interior and a central axis of the adaptor outlet extends at least partially parallel to a longitudinal axis of the conduit section within the conduit section interior; and coupling an adaptor conduit structure to the conduit section such that the adaptor conduit structure couples with the elbow nozzle to form an adaptor device, based on engaging a conduit connector with at least a portion of the conduit section, the adaptor conduit structure defining a base conduit extending from an adaptor inlet, the adaptor inlet external to the conduit, such that the adaptor conduit structure and the elbow nozzle at least partially collectively define an adaptor conduit extending between the adaptor inlet and the adaptor outlet through both the adaptor conduit structure and the elbow nozzle.

12. The method of claim 11, further comprising:

directing a fluid to flow through the adaptor conduit and through the adaptor outlet as a fluid stream directed in a particular flow direction in the conduit section interior, the particular flow direction at least partially parallel to the longitudinal axis of the conduit section within the conduit section interior.

13. The method of claim 12, wherein the fluid stream is directed to flow through an upper portion of the conduit section such that the fluid stream is at least partially vertically spaced apart in a vertical direction from a separate, lower portion of the conduit section, the vertical direction opposite to a direction of gravity, wherein the upper portion of the conduit section includes a portion of the conduit section interior above the longitudinal axis of the conduit section interior in relation to the direction of gravity, and the lower portion of the conduit section interior is a portion of the conduit section interior that is below the longitudinal axis in relation to the direction of gravity.

14. The method of claim 11, wherein the conduit includes a condensate drain line of an air conditioning system, the conduit extending from a condensate drain inlet to a condensate drain outlet, the condensate drain line configured to receive condensate from an air handler of the air conditioning system at the condensate drain inlet, the conduit configured to direct the condensate from the condensate drain inlet to the condensate drain outlet through at least the conduit section interior, and the method further includes coupling the adaptor conduit structure to a fluid supply source to establish fluid communication between the fluid supply source and the conduit section interior through at least the adaptor conduit and the access point opening, and directing a fluid received at the adaptor inlet from the fluid supply source to flow through the adaptor conduit and into the conduit section interior via the access point opening and through the adaptor outlet in the conduit section interior in a particular flow direction, the particular flow direction at least partially parallel to the longitudinal axis of the conduit section within the conduit section interior, such that the adaptor device directs the fluid to flow through an interior of the condensate drain line at least partially in an upstream direction from the conduit section toward the condensate drain inlet.

15. The method of claim 11, wherein the central axis of the adaptor outlet extends parallel to the longitudinal axis of the conduit section within the conduit section interior.

16. The method of claim 11, wherein the elbow nozzle comprises silicone.

17. The method of claim 11, wherein the conduit connector includes a clamp, and the engaging the conduit connector with at least the portion of the conduit section causes the clamp to directly engage and clamp an outer sidewall surface of the conduit section sidewall to couple the adaptor conduit structure to the conduit section.

18. The method of claim 11, wherein the adaptor conduit structure includes an outlet nozzle, and the coupling the adaptor conduit structure to the conduit section includes inserting the outlet nozzle into the elbow conduit.

19. The method of claim 11, wherein the coupling the adaptor conduit structure to the conduit section includes causing a sealing member to seal at least an outer edge of the access point opening.

20. The method of claim 11, further comprising forming the access point opening prior to inserting the elbow nozzle through the access point opening, the forming the access point opening including coupling an installation guide device to the conduit, the installation guide device including a drill bit device configured to drill through the sidewall thickness of the conduit, the installation guide device including a guide conduit having at least a lower guide opening, the installation guide device configured to enable longitudinal movement of the drill bit device at least partially through the guide conduit and at least partially through the lower guide opening, the installation guide device including a protrusion stop structure configured to limit longitudinal protrusion of the drill bit device from the lower guide opening to a particular protrusion distance, the coupling the installation guide device to the conduit aligns the lower guide opening with an access point location on an outer sidewall surface of the conduit;

operating the drill bit device while the installation guide device is coupled to the conduit to cause the drill bit device to move longitudinally at least partially through the lower guide opening to a protrusion distance that is equal to or less than the particular protrusion distance, such that the drill bit device drills through the sidewall thickness of the conduit from the access point location to form the access point opening; and decoupling the installation guide device from the conduit to expose the access point opening.

\* \* \* \* \*